US009657910B2

(12) United States Patent
Patton

(10) Patent No.: US 9,657,910 B2
(45) **Date of Patent: *May 23, 2017**

(54) ELECTRIC LIGHTING DEVICES HAVING A MOVABLE FLAME-SHAPED PIECE WITH A HOLLOW INTERIOR

(71) Applicant: Luminara Worldwide, LLC, Eden Prairie, MN (US)

(72) Inventor: Douglas Patton, Irvine, CA (US)

(73) Assignee: Luminara Worldwide, LLC, Eden Prairie, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 14/985,850

(22) Filed: Dec. 31, 2015

(65) Prior Publication Data

US 2016/0116127 A1 Apr. 28, 2016

Related U.S. Application Data

(62) Division of application No. 14/778,979, filed as application No. PCT/US2014/049819 on Aug. 5, 2014.

(60) Provisional application No. 61/862,407, filed on Aug. 5, 2013.

(51) Int. Cl.

| | |
|---|---|
| ***B60Q 1/14*** | (2006.01) |
| ***F21S 10/04*** | (2006.01) |
| ***F21S 6/00*** | (2006.01) |
| *F21W 121/00* | (2006.01) |

(52) U.S. Cl.
CPC ............ *F21S 10/046* (2013.01); *F21S 6/001* (2013.01); *F21W 2121/00* (2013.01)

(58) Field of Classification Search
CPC ..... F21S 10/046; F21S 6/001; F21W 2121/00
USPC ........................................................ 362/284
See application file for complete search history.

(56) References Cited

U.S. PATENT DOCUMENTS 3,639,749 A 2/1972 Beckman
4,551,794 A 11/1985 Sandell
6,712,493 B2 3/2004 Tell et al.
(Continued)

FOREIGN PATENT DOCUMENTS

CA 2779978 A1 1/2012
CA 2772728 C 2/2013
(Continued)

OTHER PUBLICATIONS

USPTO, Non-Final Rejection, U.S. Appl. No. 14/778979, dated May 5, 2016.

*Primary Examiner* — Bao Q Truong
*Assistant Examiner* — Hana Featherly
(74) *Attorney, Agent, or Firm* — Fish & Tsang LLP

(57) ABSTRACT

Various components for artificial candles and other lighting devices are described that can be used to create a realistic flame effect in the devices. The devices include a flame piece or element that extends upwardly from a body of the device. A light source can be disposed with respect to the flame piece such that the flame piece is illuminated. A variety of drive mechanisms could be disposed within the body of the device that can cause movement of the flame piece with respect to the body or housing. The flame piece can be coupled to a body or housing of the device using various components to suspend at least a portion of the flame piece within the body or housing.

20 Claims, 61 Drawing Sheets

(56) References Cited

U.S. PATENT DOCUMENTS

| | | | | |
|---|---|---|---|---|
| 7,159,994 | B2 * | 1/2007 | Schnuckle | B44C 5/06 362/161 |
| 7,261,455 | B2 | 8/2007 | Schnuckle et al. | |
| 7,350,720 | B2 | 4/2008 | Jaworski et al. | |
| 7,481,571 | B2 | 1/2009 | Bistritzky et al. | |
| 7,503,668 | B2 | 3/2009 | Porchia et al. | |
| 7,824,627 | B2 | 11/2010 | Michaels et al. | |
| 7,837,355 | B2 | 11/2010 | Schnuckle | |
| 8,070,319 | B2 | 12/2011 | Schnuckle et al. | |
| 8,132,936 | B2 | 3/2012 | Patton et al. | |
| 8,342,712 | B2 | 1/2013 | Patton et al. | |
| 8,534,869 | B2 | 9/2013 | Patton et al. | |
| 8,550,660 | B2 | 10/2013 | Patton et al. | |
| 8,646,946 | B2 | 2/2014 | Schnuckle et al. | |
| 8,696,166 | B2 | 4/2014 | Patton et al. | |
| 8,721,118 | B2 | 5/2014 | Patton et al. | |
| 8,727,569 | B2 | 5/2014 | Schnuckle et al. | |
| 8,789,986 | B2 | 7/2014 | Li | |
| 8,926,137 | B2 | 1/2015 | Li | |
| 9,052,078 | B2 | 6/2015 | Sheng | |
| 9,074,759 | B2 | 7/2015 | Lai | |
| 9,133,992 | B2 | 9/2015 | Lee | |
| 2001/0033488 | A1 | 10/2001 | Chliwnyj et al. | |
| 2003/0198045 | A1 | 10/2003 | Kitchen | |
| 2004/0196658 | A1 | 10/2004 | Fung | |
| 2005/0169666 | A1 | 8/2005 | Porchia et al. | |
| 2005/0285538 | A1 | 12/2005 | Jaworski et al. | |
| 2006/0034100 | A1 | 2/2006 | Schnuckle et al. | |
| 2006/0039835 | A1 | 2/2006 | Nottingham et al. | |
| 2006/0125420 | A1 | 6/2006 | Boone et al. | |
| 2006/0146544 | A1 | 7/2006 | Leung | |
| 2007/0127249 | A1 | 6/2007 | Medley et al. | |
| 2008/0031784 | A1 | 2/2008 | Bistritzky et al. | |
| 2008/0038156 | A1 | 2/2008 | Jaramillo | |
| 2008/0130266 | A1 | 6/2008 | DeWitt et al. | |
| 2008/0150453 | A1 | 6/2008 | Medley et al. | |
| 2011/0027124 | A1 | 2/2011 | Albee et al. | |
| 2011/0110073 | A1 | 5/2011 | Schnuckle et al. | |
| 2011/0127914 | A1 | 6/2011 | Patton et al. | |
| 2011/0134628 | A1 | 6/2011 | Pestl et al. | |
| 2011/0317403 | A1 | 12/2011 | Fournier et al. | |
| 2012/0020052 | A1 | 1/2012 | McCavit et al. | |
| 2012/0024837 | A1 | 2/2012 | Thompson | |
| 2012/0093491 | A1 | 4/2012 | Browder et al. | |
| 2012/0134157 | A1 | 5/2012 | Li | |
| 2013/0005212 | A1 | 1/2013 | Scolari | |
| 2013/0050985 | A1 | 2/2013 | Kwok et al. | |
| 2013/0148353 | A1 | 6/2013 | Patton et al. | |
| 2013/0258648 | A1 | 10/2013 | Ding | |
| 2013/0286642 | A1 | 10/2013 | Patton | |
| 2014/0218903 | A1 * | 8/2014 | Sheng | F21S 10/04 362/190 |
| 2014/0218929 | A1 | 8/2014 | Schnuckle et al. | |
| 2014/0241004 | A1 | 8/2014 | Chen | |
| 2014/0362592 | A1 | 12/2014 | Lee | |
| 2015/0109786 | A1 | 4/2015 | Li | |
| 2015/0233538 | A1 | 8/2015 | Sheng | |
| 2015/0285453 | A1 | 10/2015 | Schnuckle et al. | |
| 2015/0292698 | A1 | 10/2015 | Schnuckle et al. | |
| 2016/0047517 | A1 | 2/2016 | Li | |
| 2016/0109082 | A1 | 4/2016 | Li | |
| 2016/0109083 | A1 | 4/2016 | Li | |

FOREIGN PATENT DOCUMENTS

| | | | |
|---|---|---|---|
| CN | 2924266 | Y | 7/2007 |
| CN | 201724143 | U | 1/2011 |
| CN | 202188437 | U | 4/2012 |
| CN | 202215951 | U | 5/2012 |
| CN | 101918755 | B | 8/2012 |
| CN | 102734740 | A | 10/2012 |
| CN | 20647570 | U | 1/2013 |
| CN | 202708605 | U | 1/2013 |
| CN | 202747231 | U | 2/2013 |
| CN | 102352966 | B | 4/2013 |
| CN | 103047604 | A | 4/2013 |
| CN | 103196094 | A | 7/2013 |
| CN | 203115826 | U | 8/2013 |
| CN | 203147617 | U | 8/2013 |
| CN | 203273669 | U | 11/2013 |
| CN | 203298181 | U | 11/2013 |
| CN | 203431703 | U | 2/2014 |
| CN | 102721002 | B | 6/2014 |
| DE | 202012102347 | U1 | 9/2012 |
| DE | 202012104217 | U1 | 1/2013 |
| EP | 2546571 | A1 | 1/2013 |
| EP | 2232128 | B1 | 2/2013 |
| EP | 2565518 | A1 | 3/2013 |
| EP | 2587127 | A1 | 5/2013 |
| GB | 2323159 | A | 9/1998 |
| GB | 2379731 | A | 3/2003 |
| WO | 01/92780 | A1 | 12/2001 |
| WO | 2013/189187 | A1 | 12/2013 |
| WO | 2014/036968 | A1 | 3/2014 |
| WO | 2014/169809 | A1 | 10/2014 |

* cited by examiner

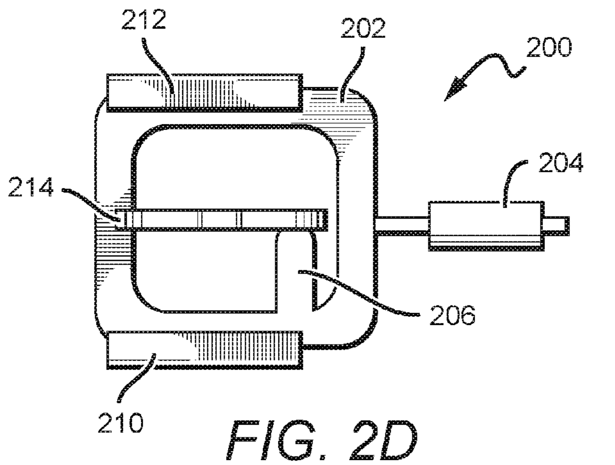
FIG. 2D
FIG. 3A
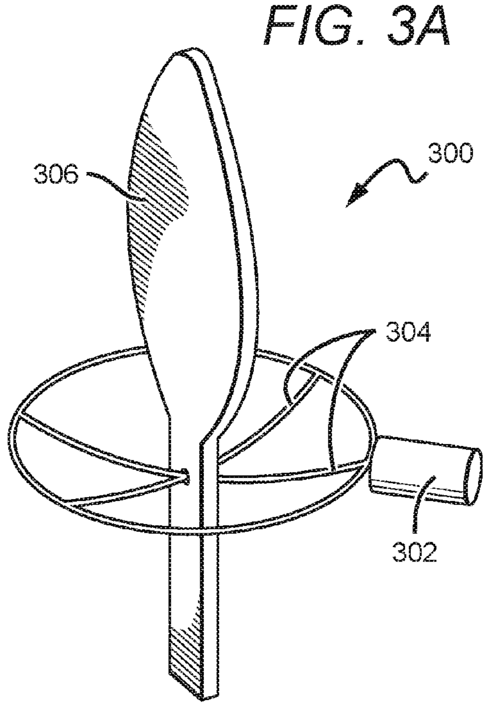
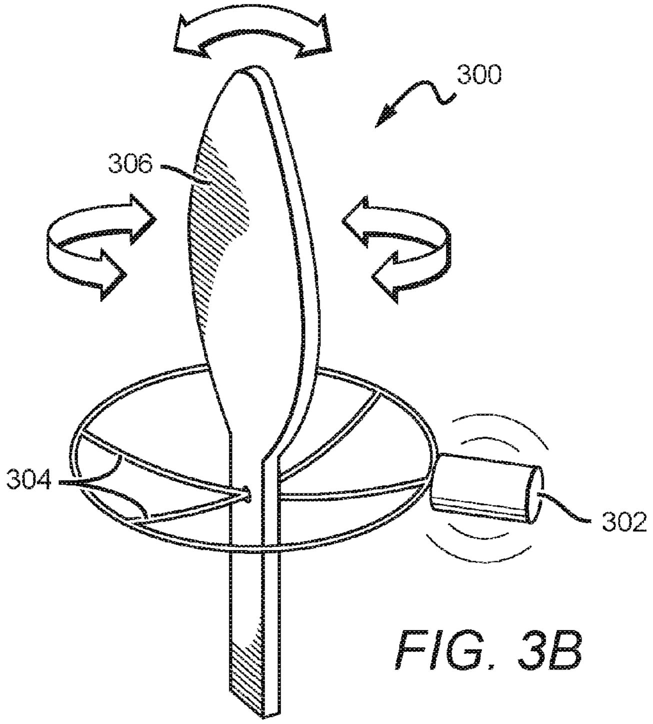
FIG. 3B

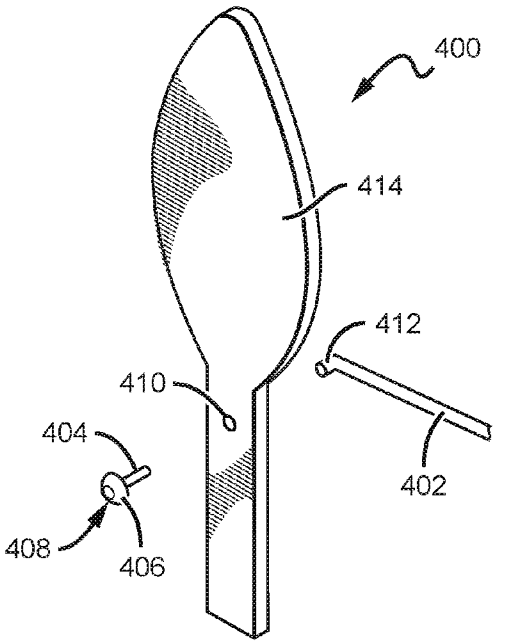
FIG. 4A
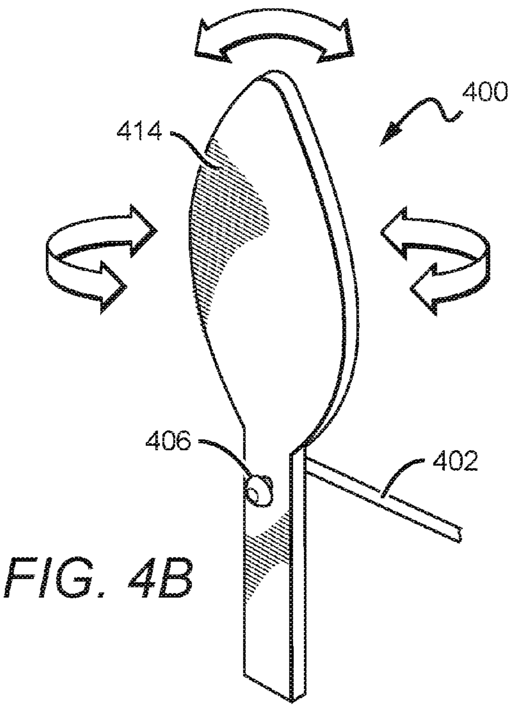
FIG. 4B
FIG. 4C
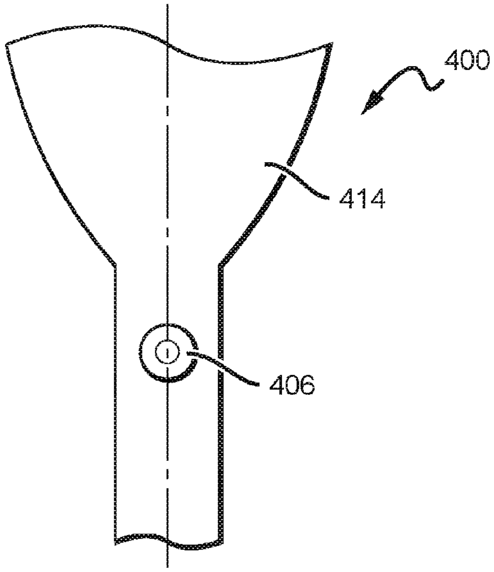
FIG. 4D
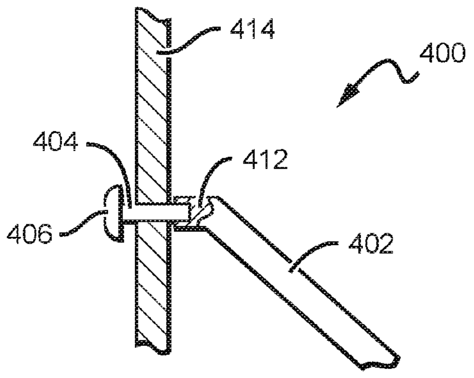

FIG. 11A
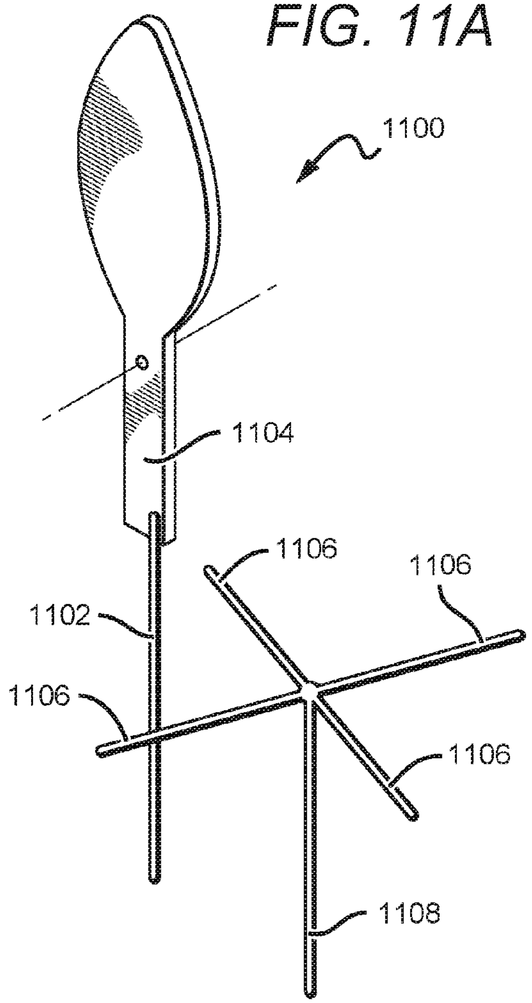
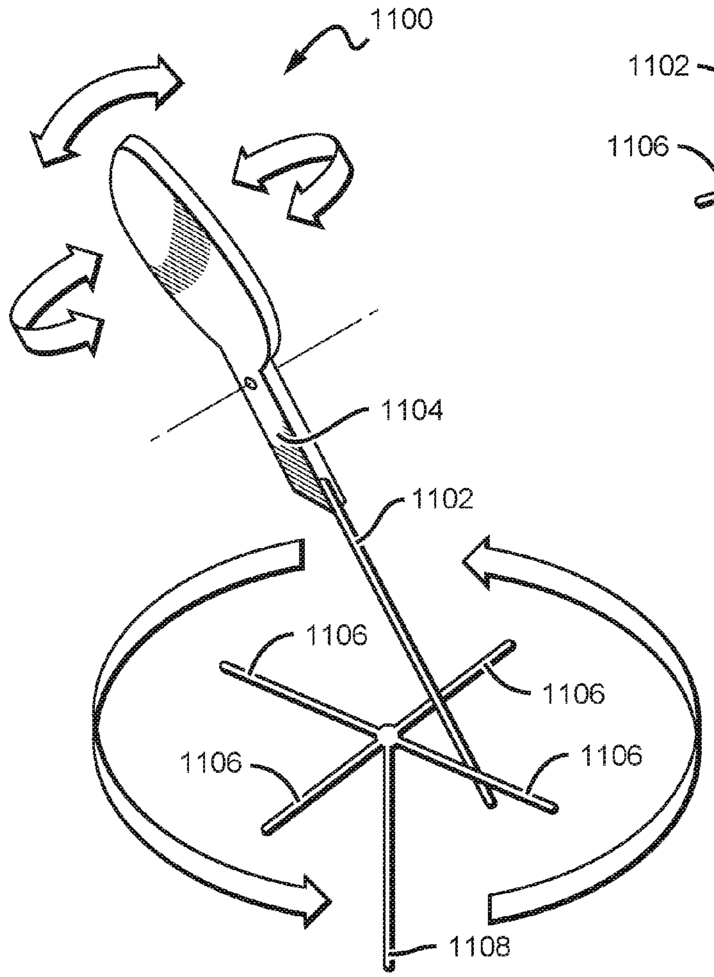
FIG. 11B

FIG. 11C
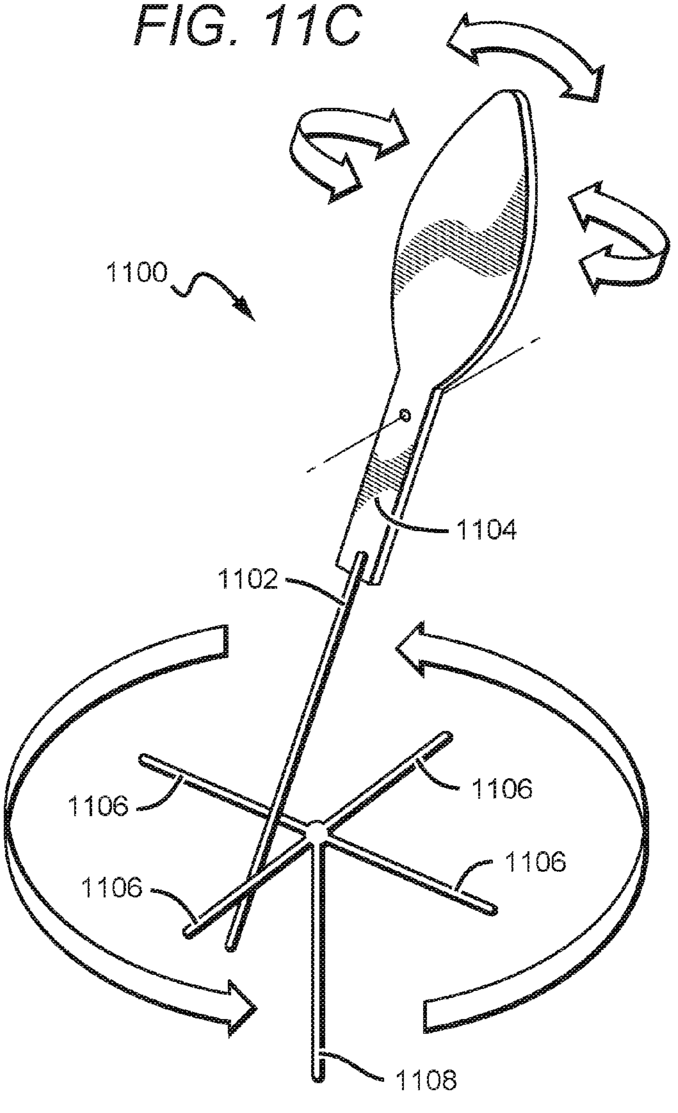
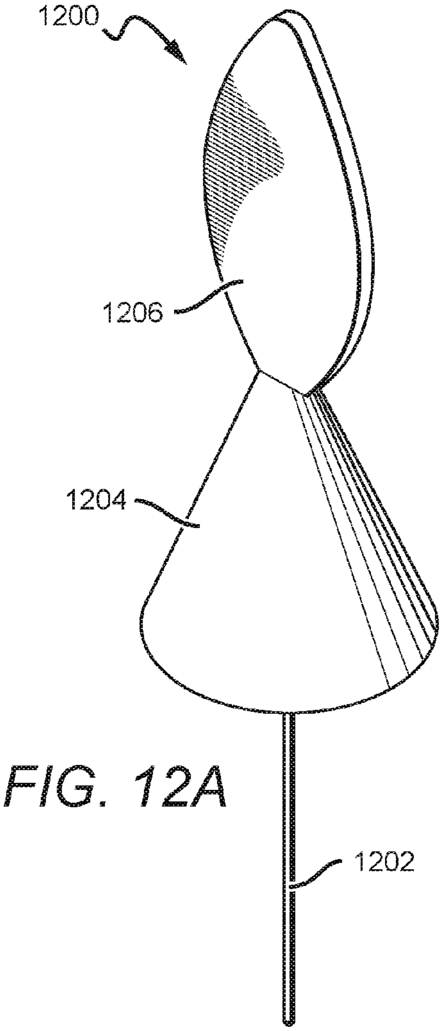
FIG. 12A

FIG. 13A
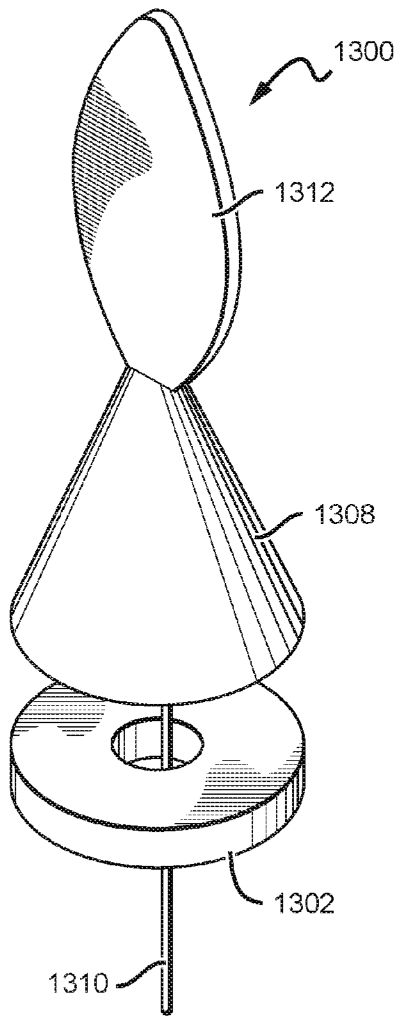
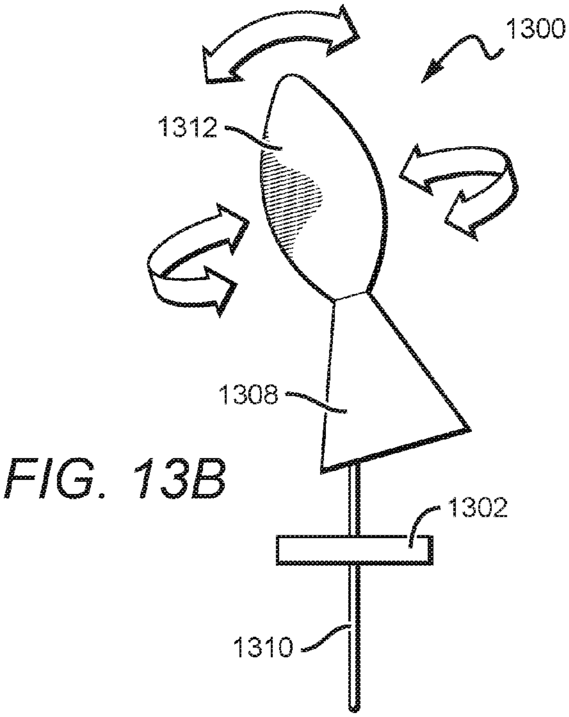
FIG. 13B
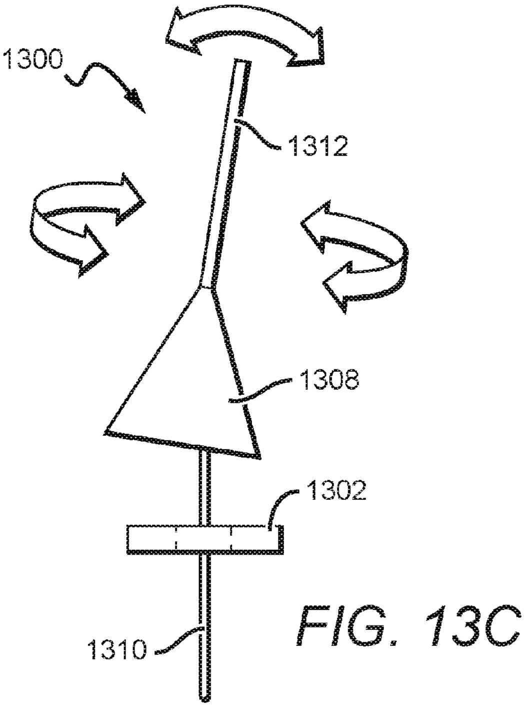
FIG. 13C

FIG. 16A
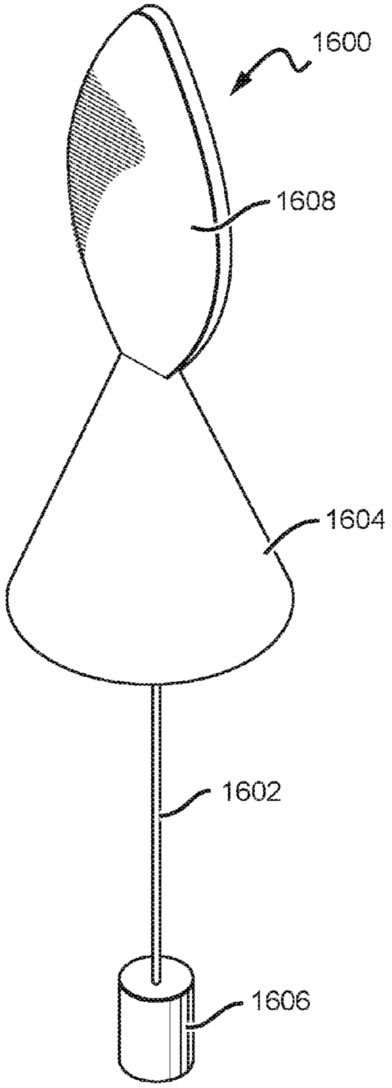
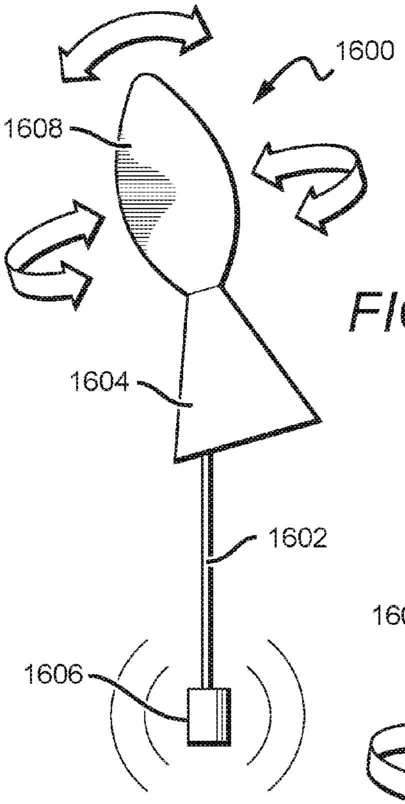
FIG. 16B
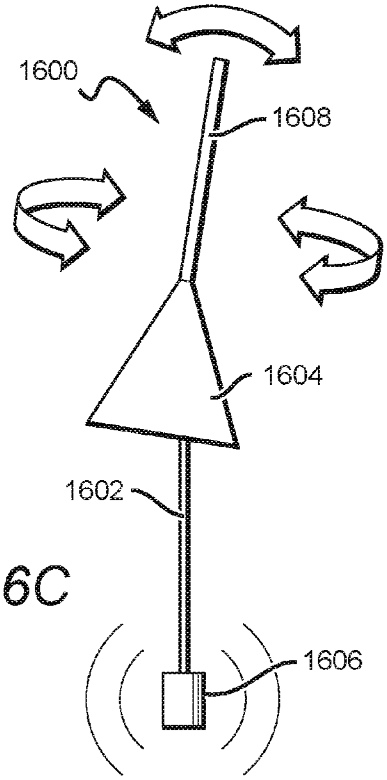
FIG. 16C

FIG. 16D
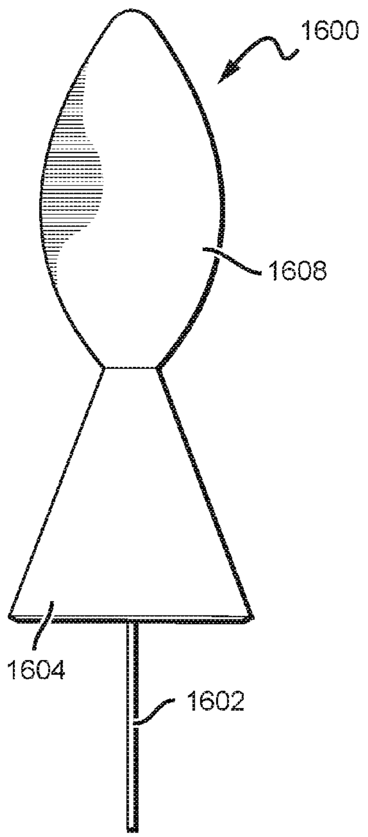
FIG. 16E
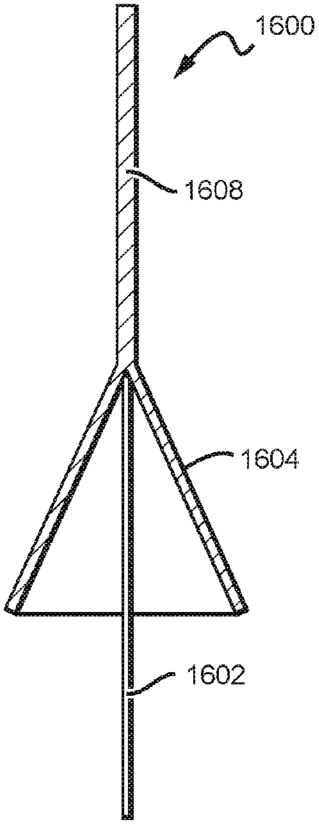
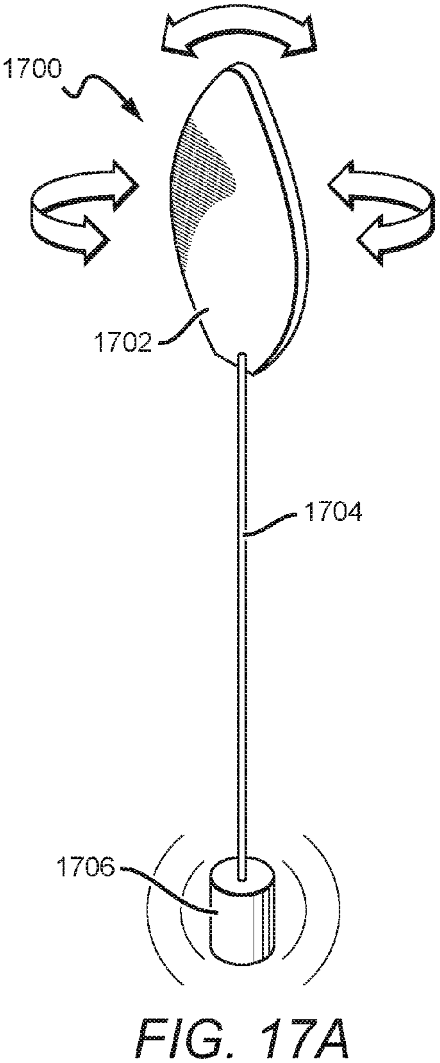
FIG. 17A

FIG. 18B
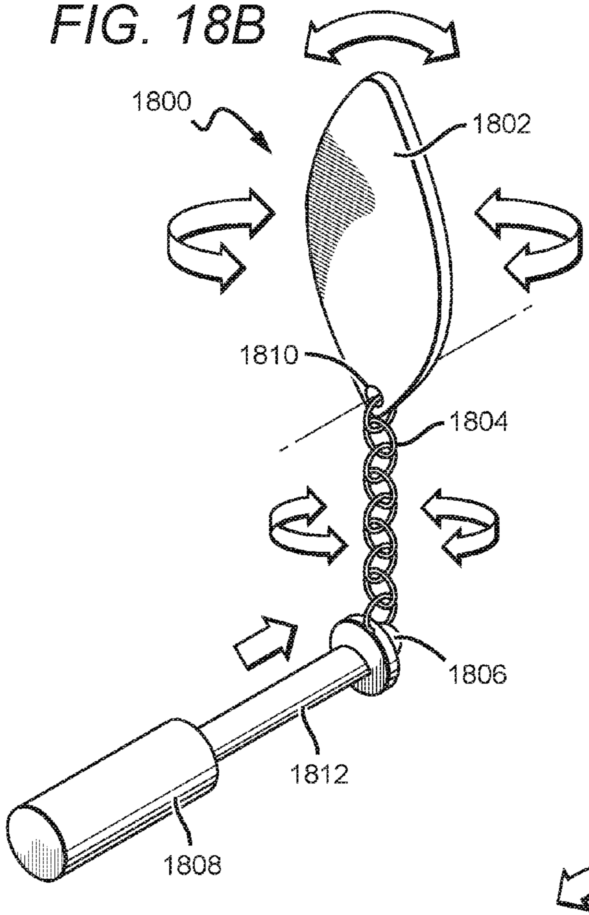
FIG. 19A
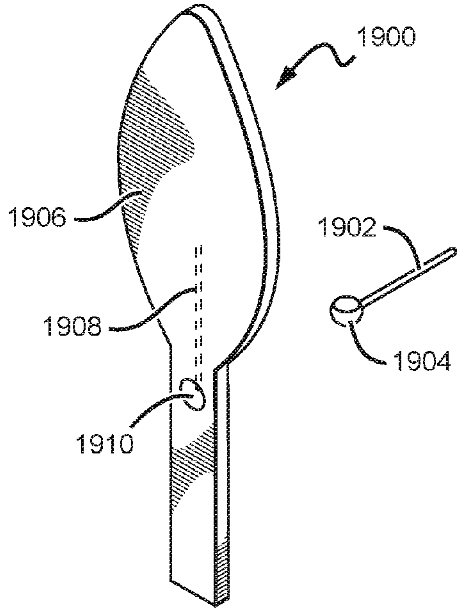
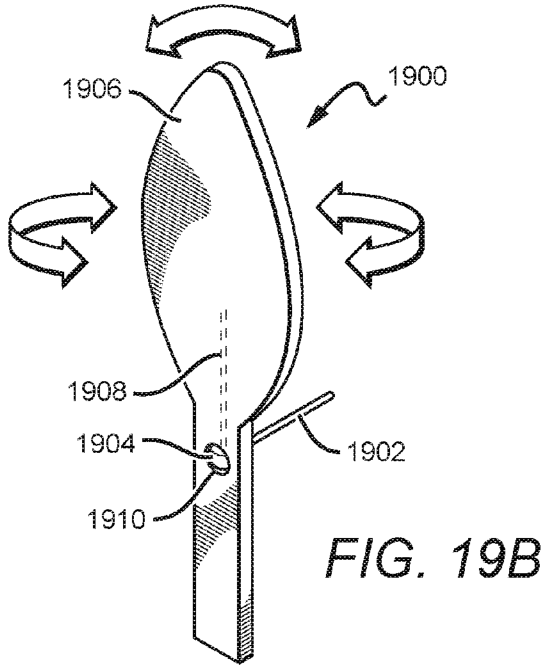
FIG. 19B

FIG. 20C
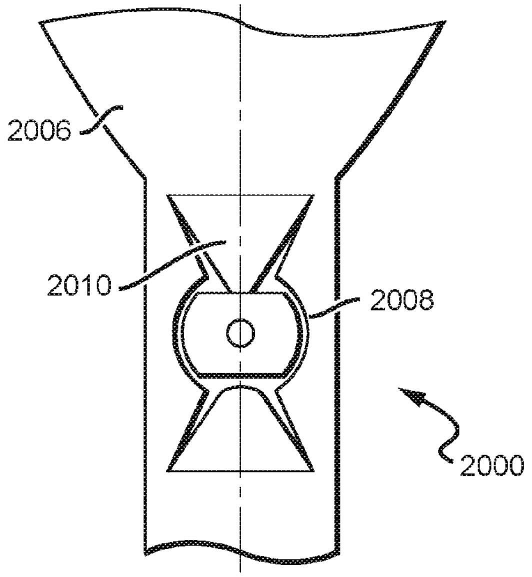
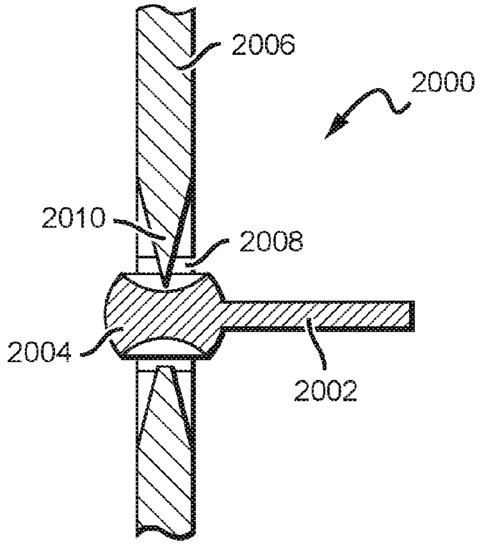
FIG. 20D
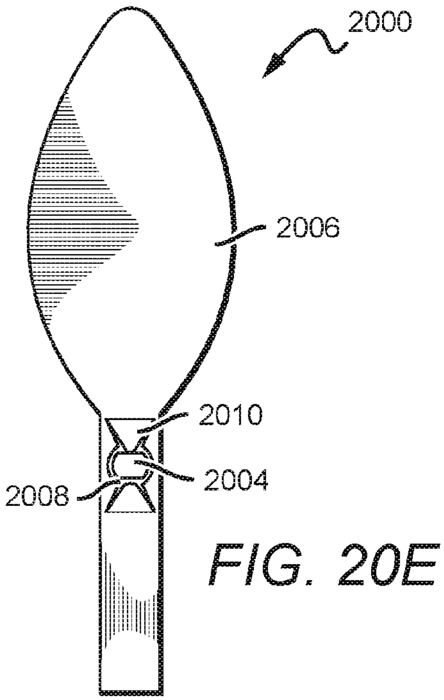
FIG. 20E
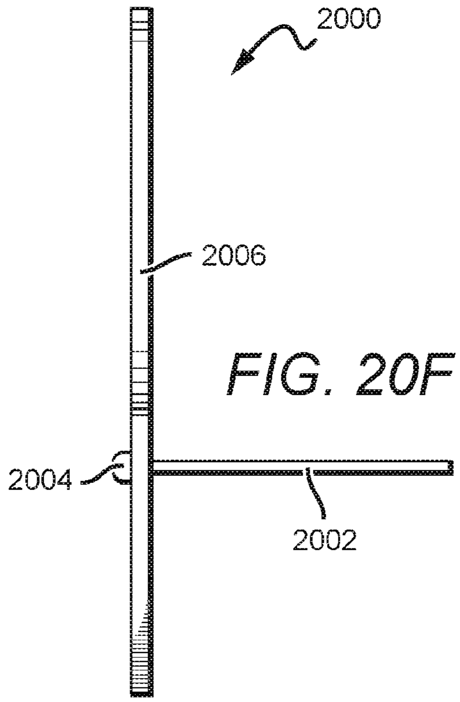
FIG. 20F

FIG. 21A
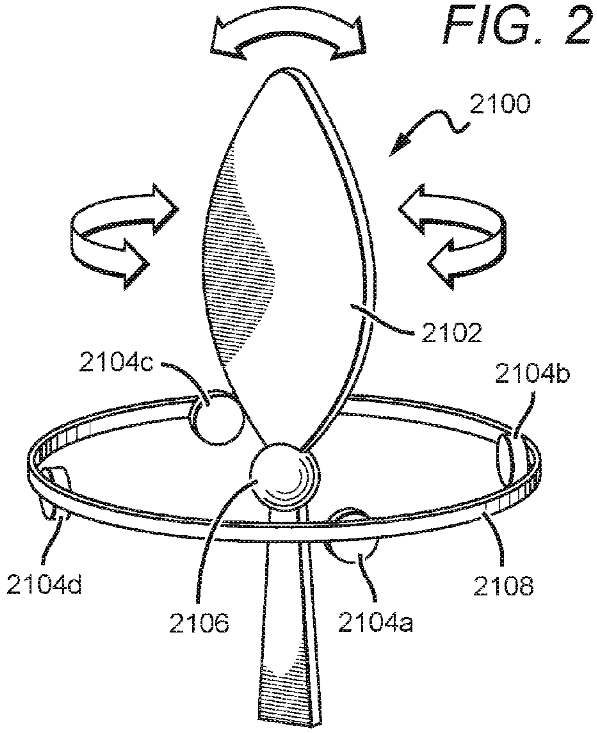
FIG. 21B
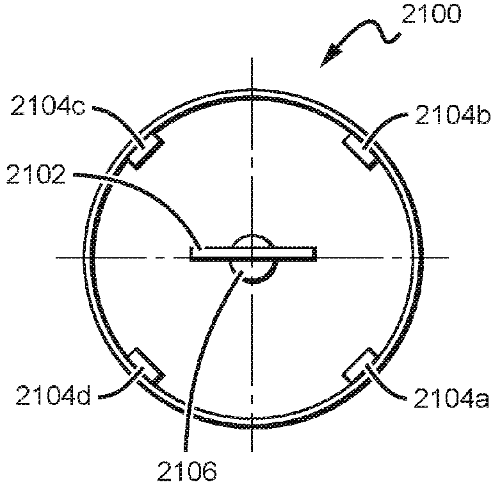
FIG. 21C
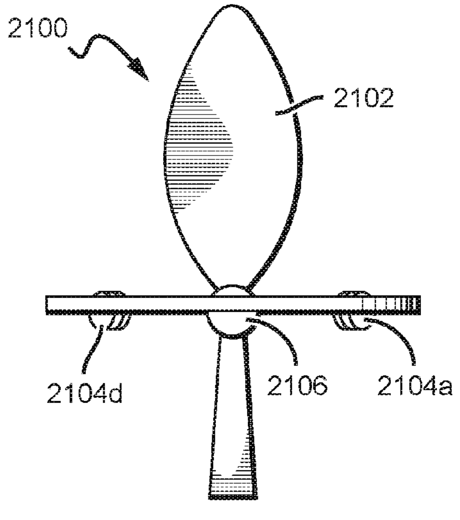
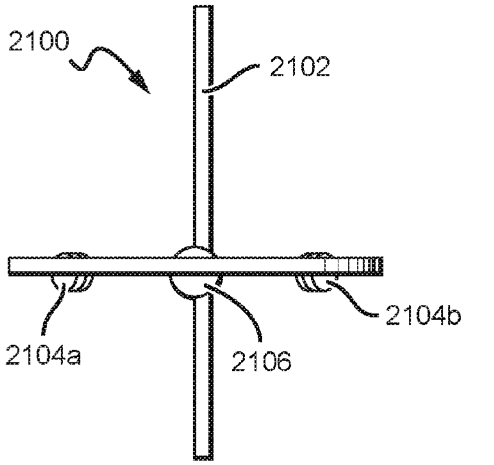
FIG. 21D

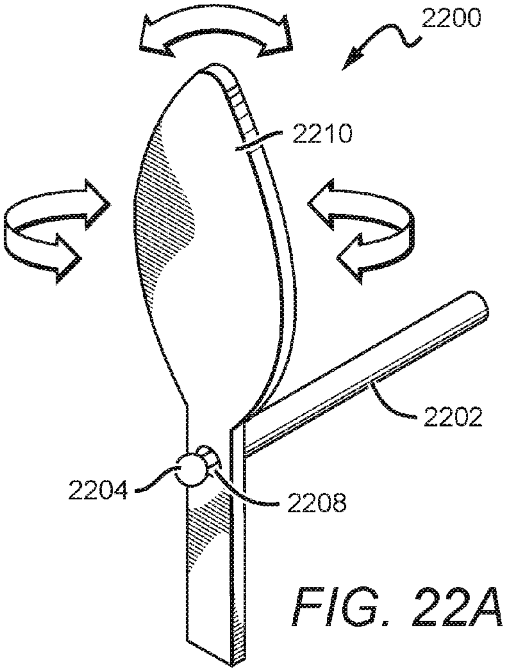
FIG. 22A
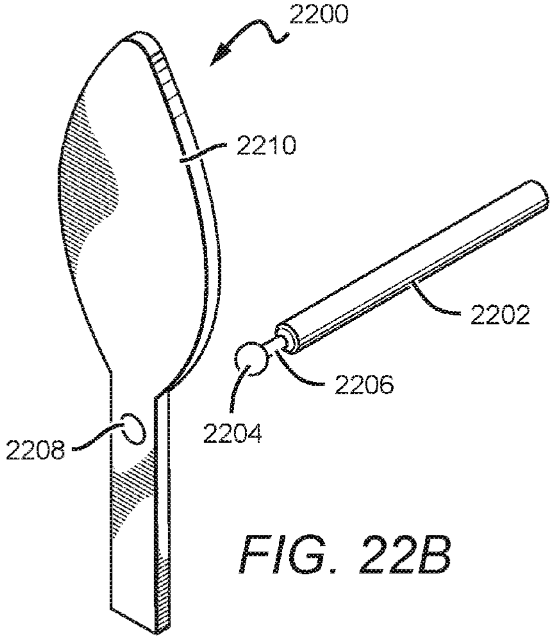
FIG. 22B
FIG. 22C
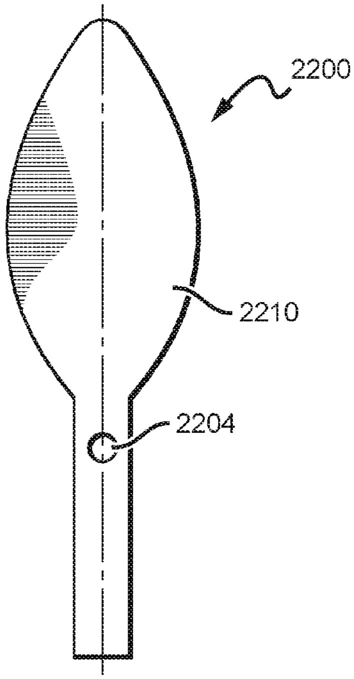
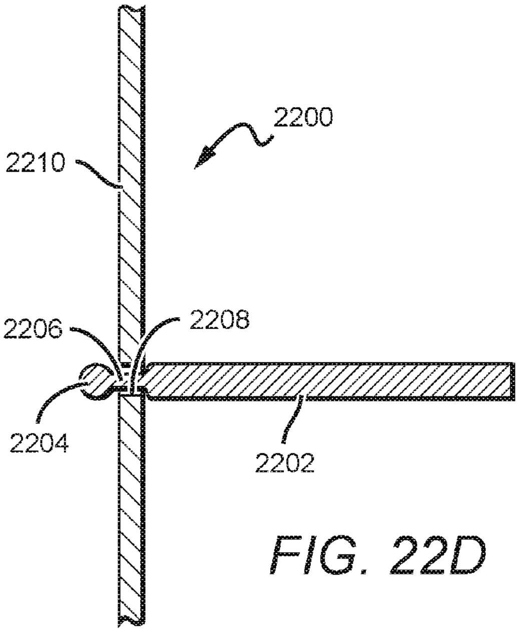
FIG. 22D

FIG. 23A
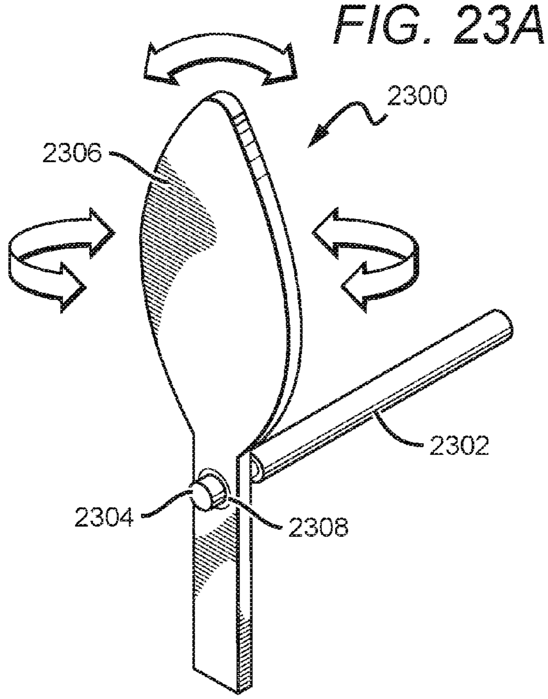
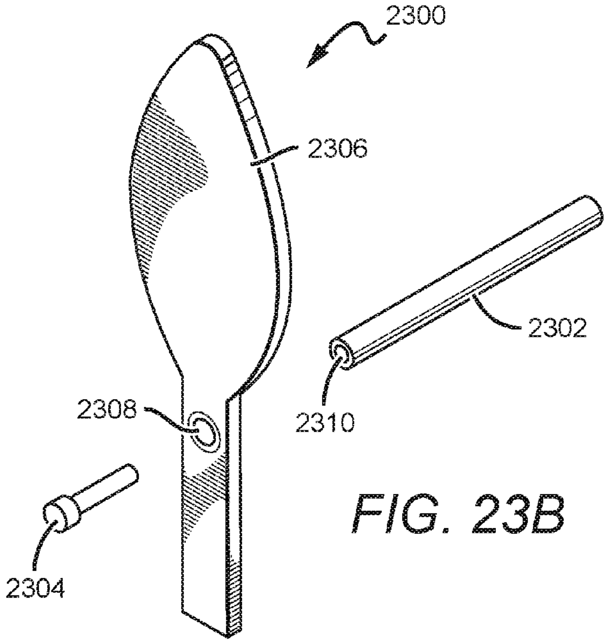
FIG. 23B
FIG. 23C
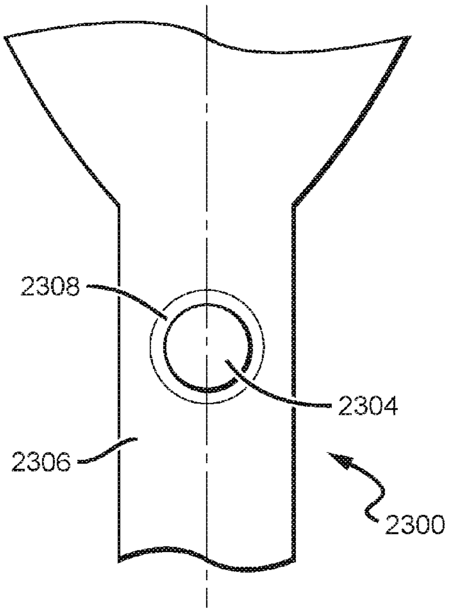
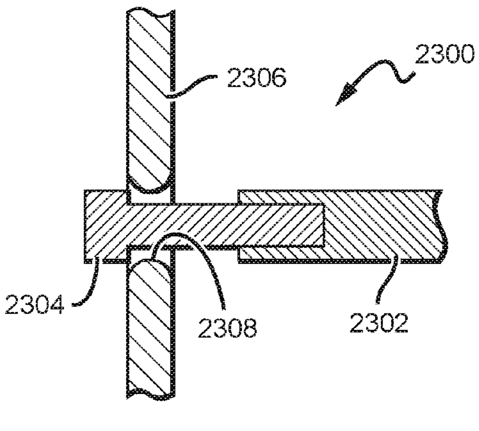
FIG. 23D

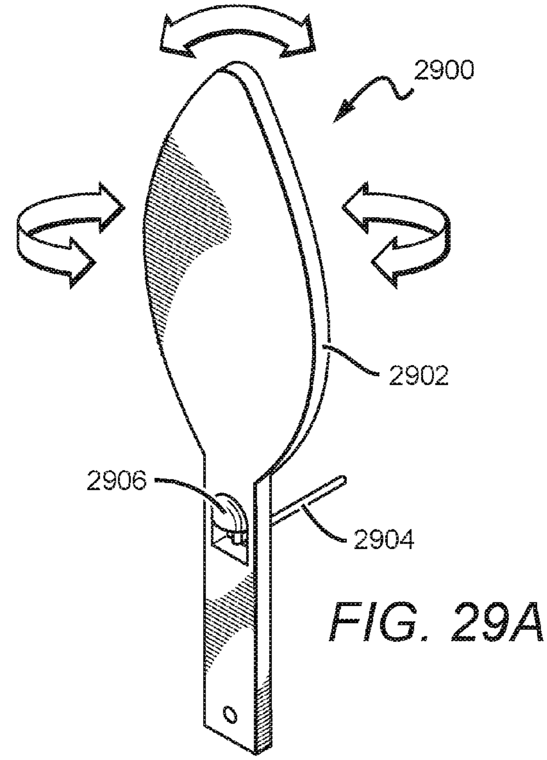
FIG. 29A
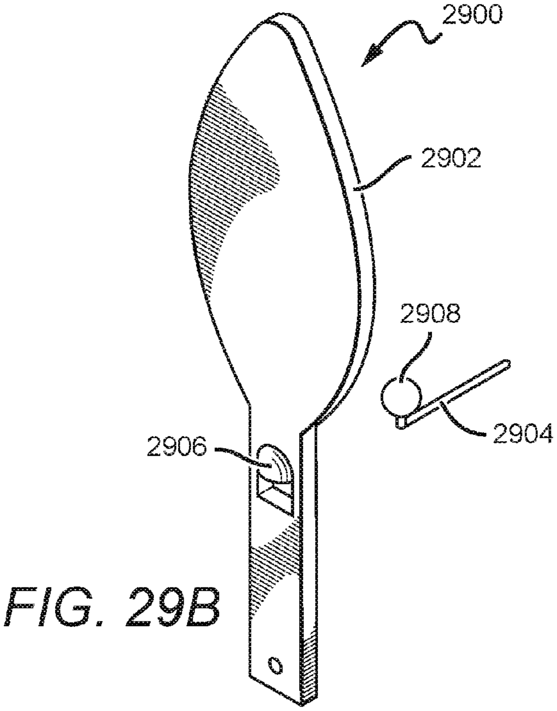
FIG. 29B
FIG. 29C
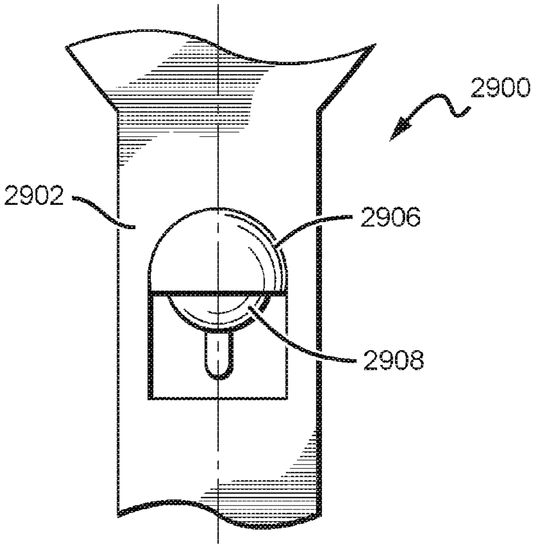
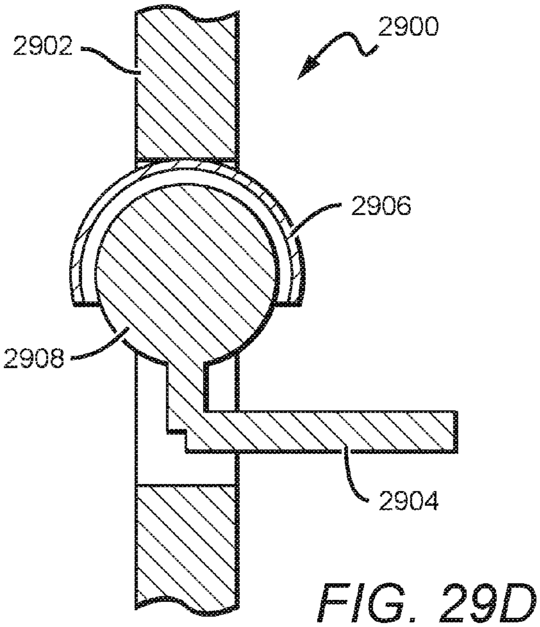
FIG. 29D

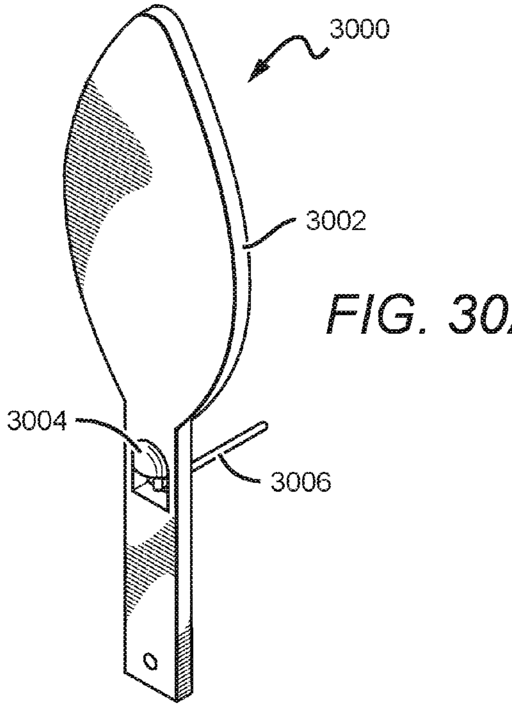
FIG. 30A
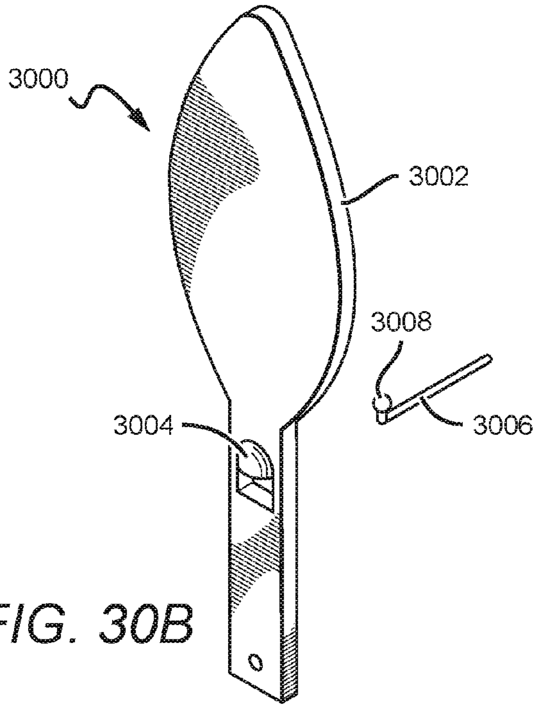
FIG. 30B
FIG. 30C
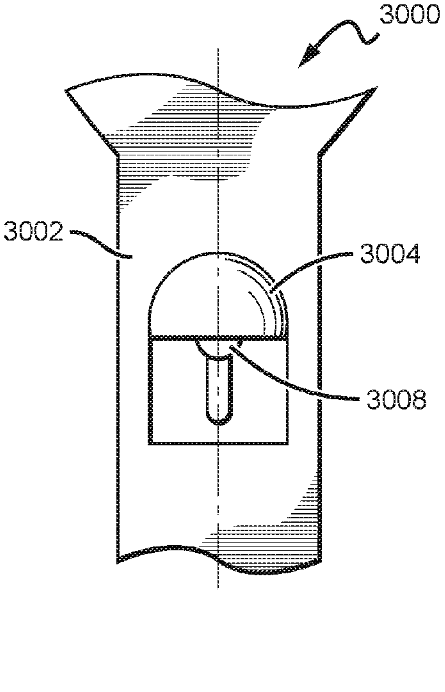
FIG. 30D
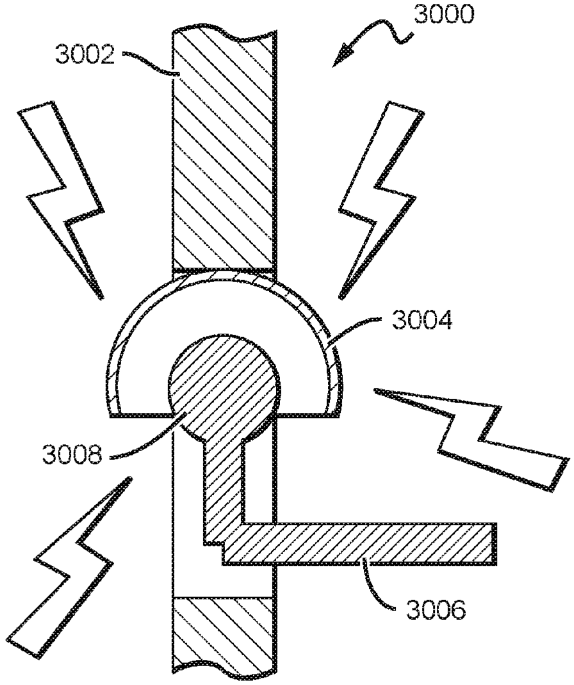

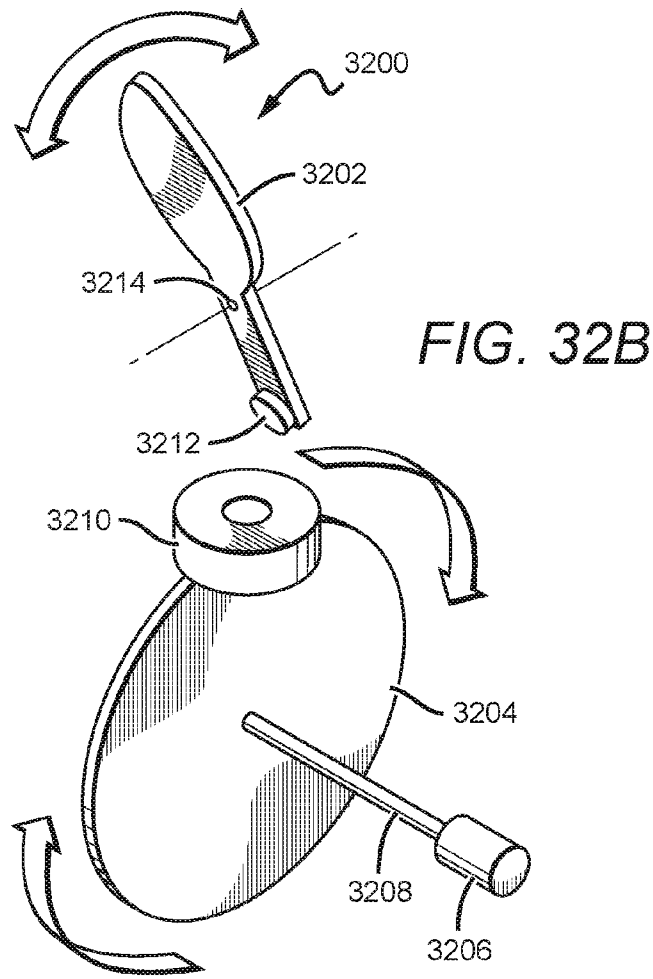
FIG. 32B
FIG. 32C
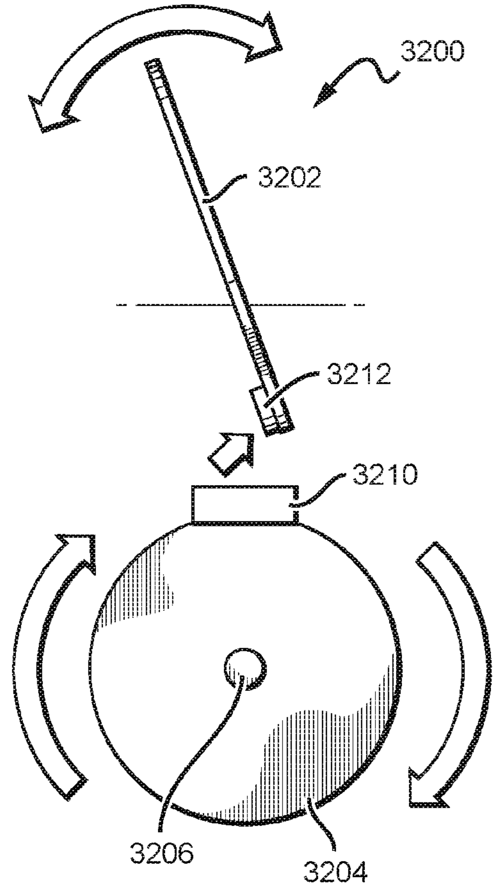

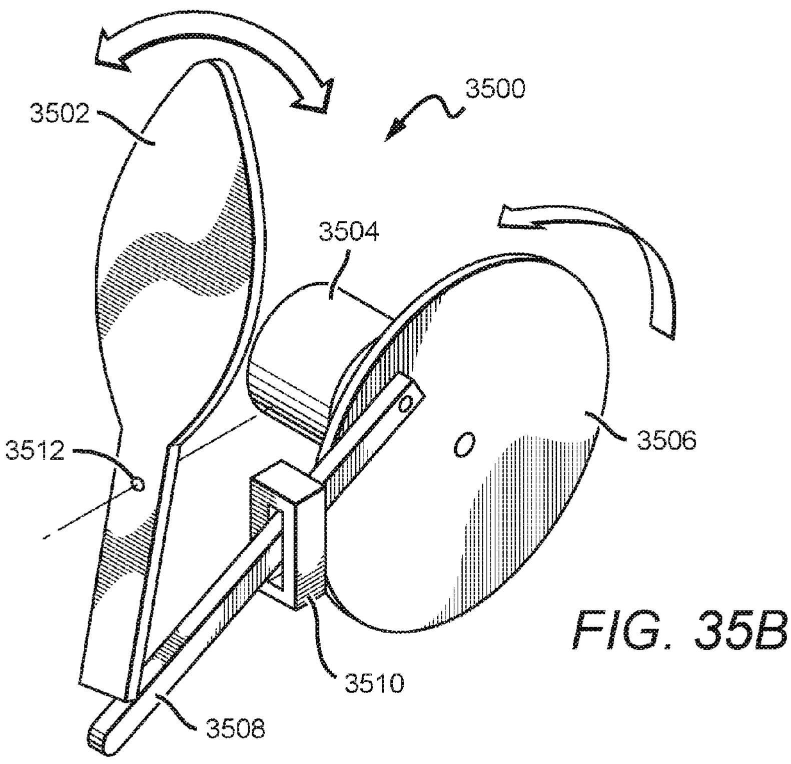
FIG. 35B
FIG. 35C
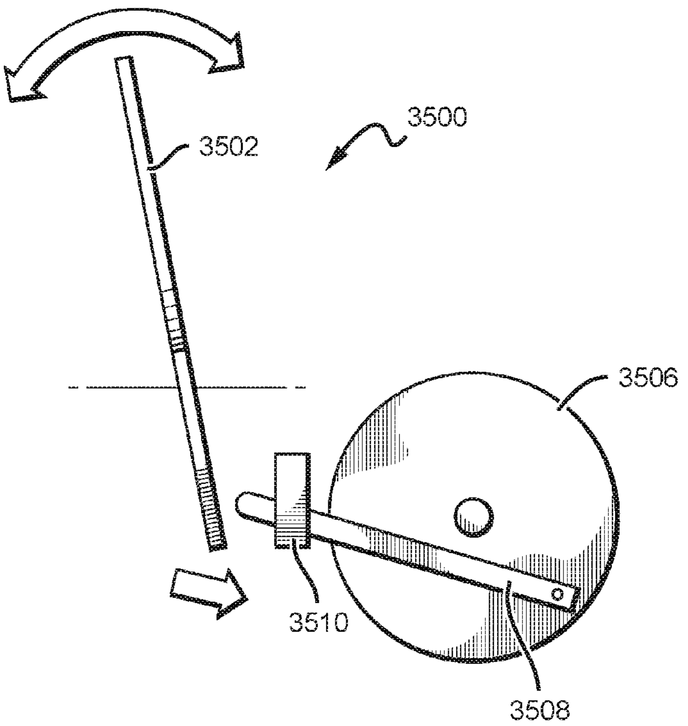

FIG. 35D
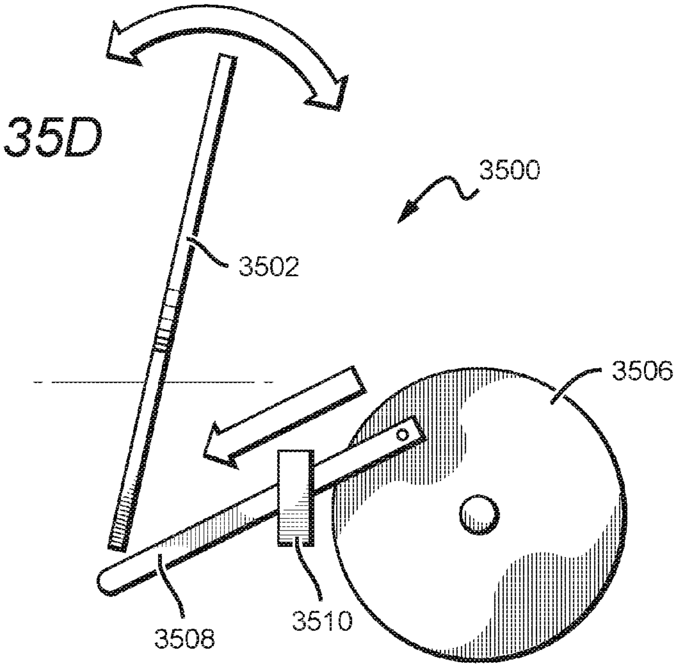
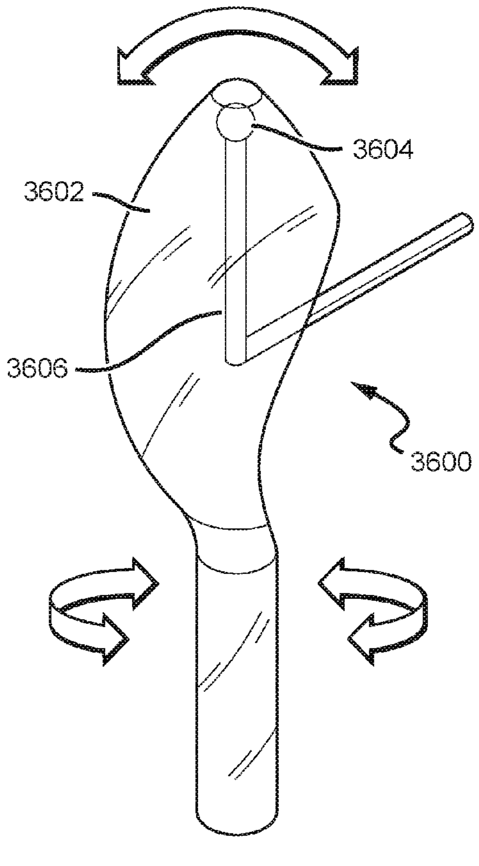
FIG. 36A
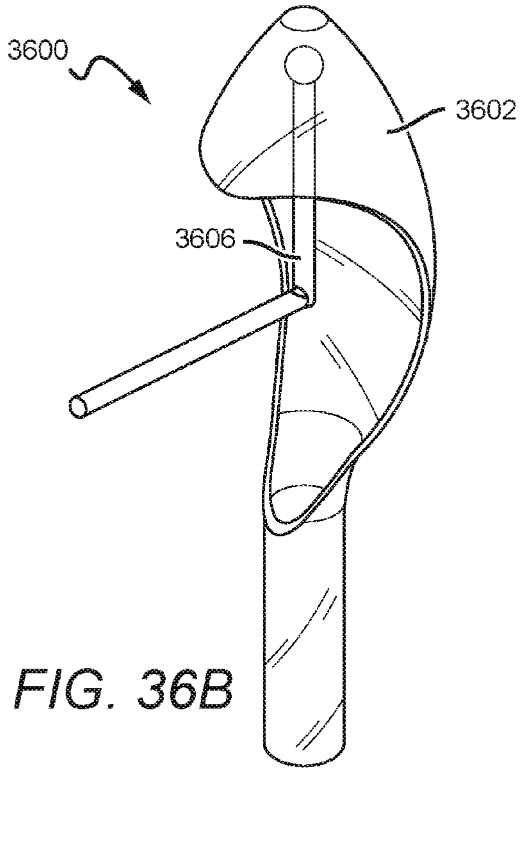
FIG. 36B

FIG. 36C
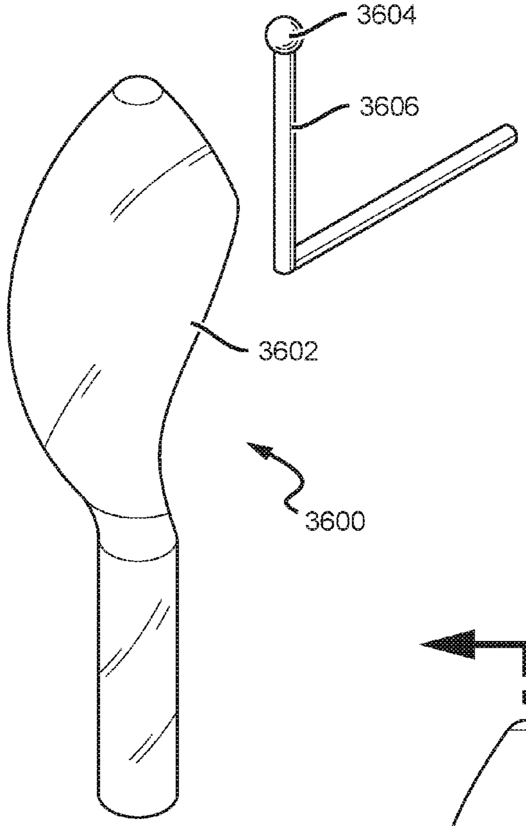
FIG. 36E
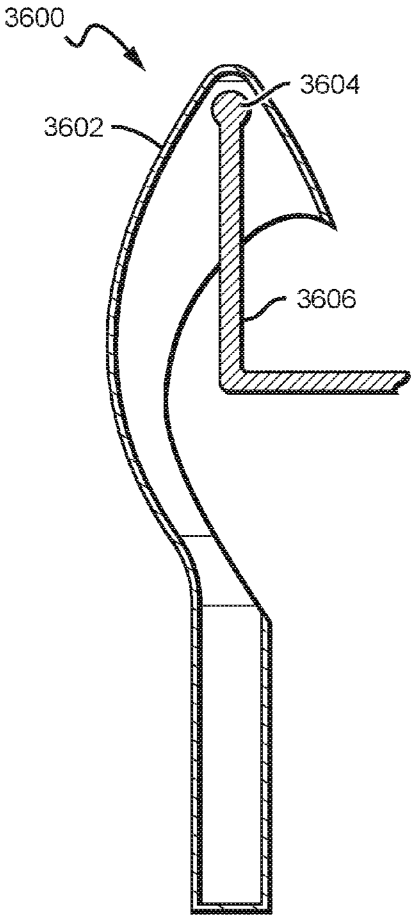
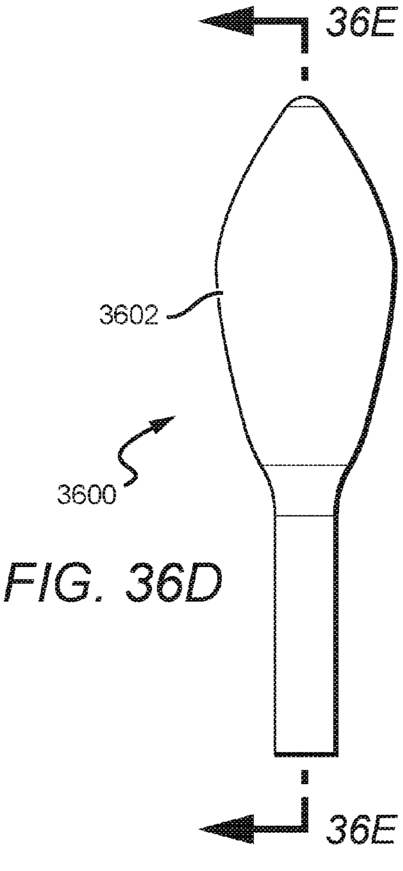
FIG. 36D

FIG. 37E
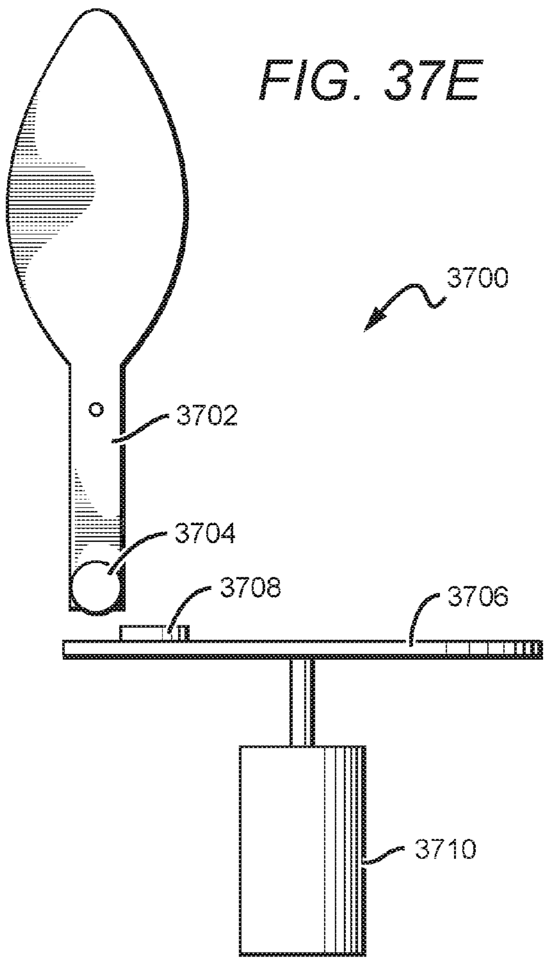
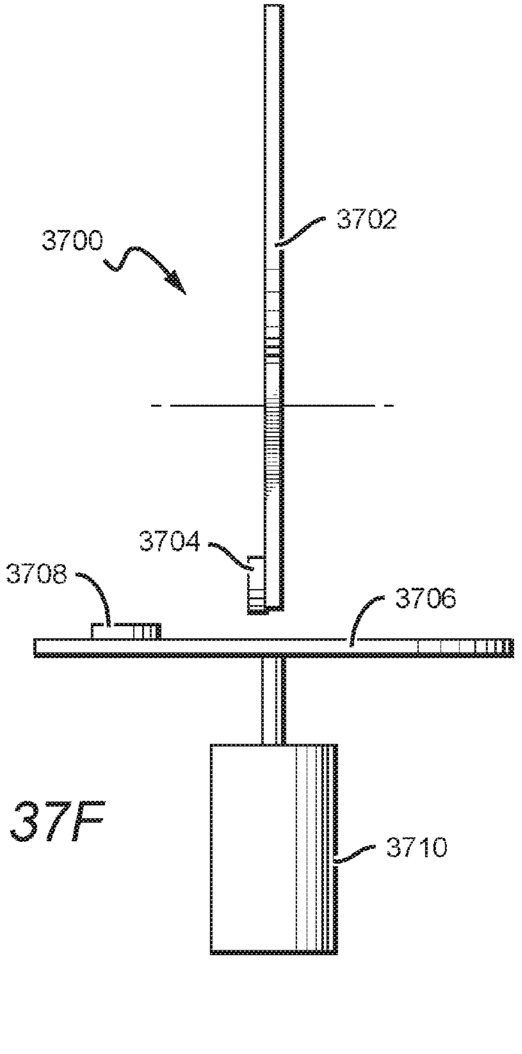
FIG. 37F

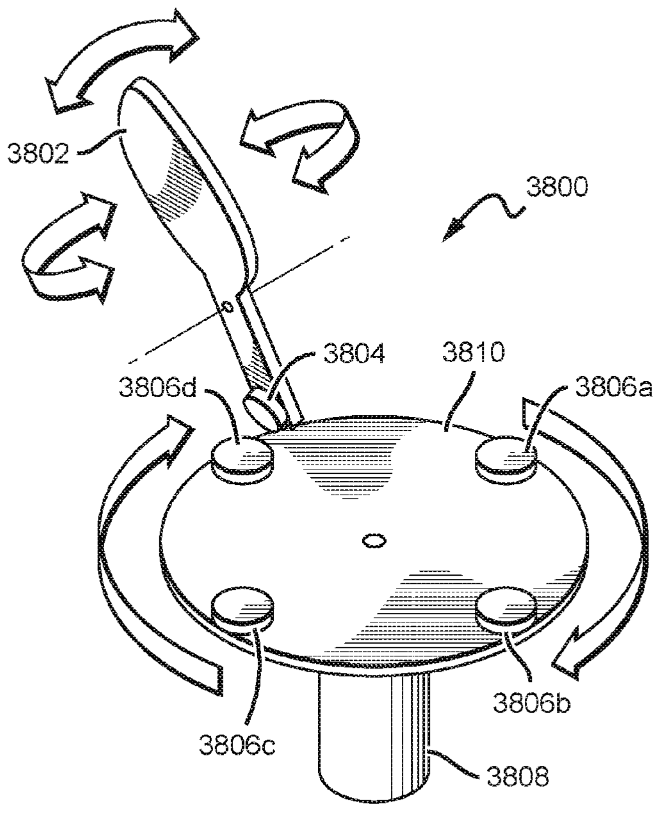
FIG. 38C
FIG. 38D
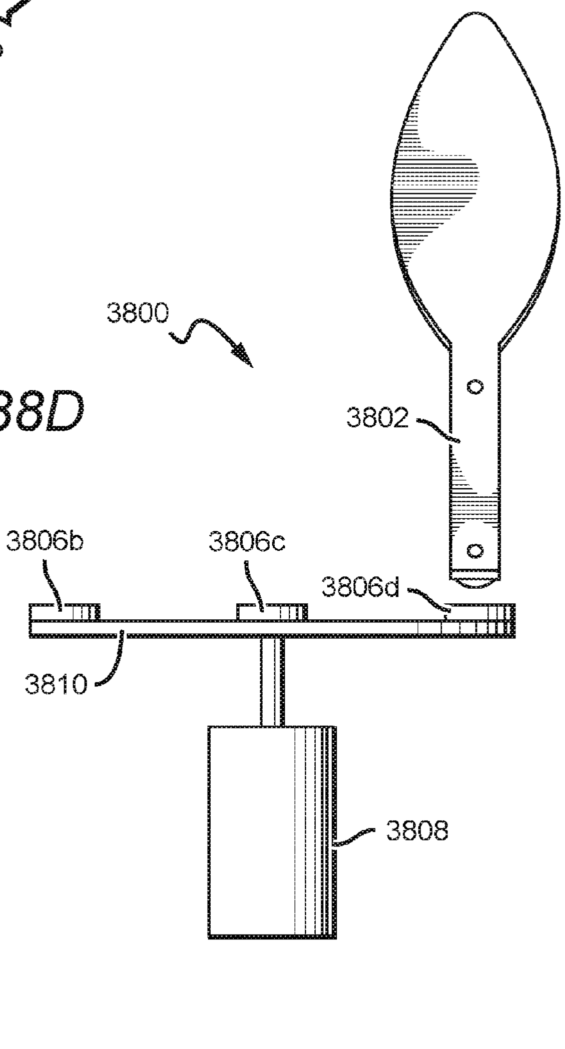

FIG. 39A
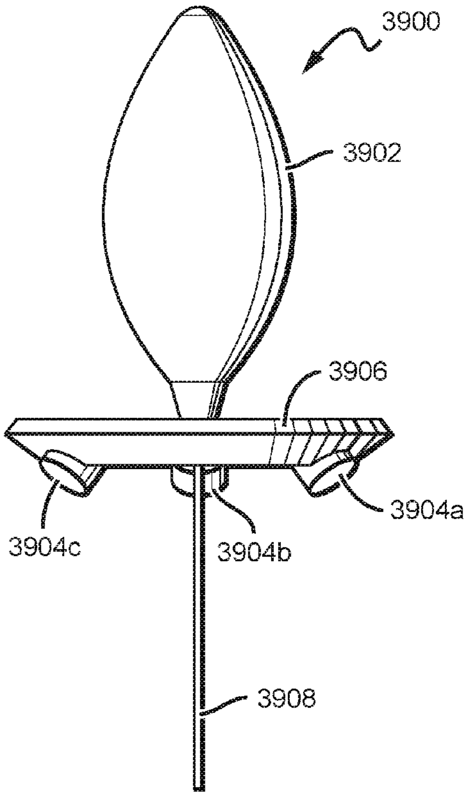
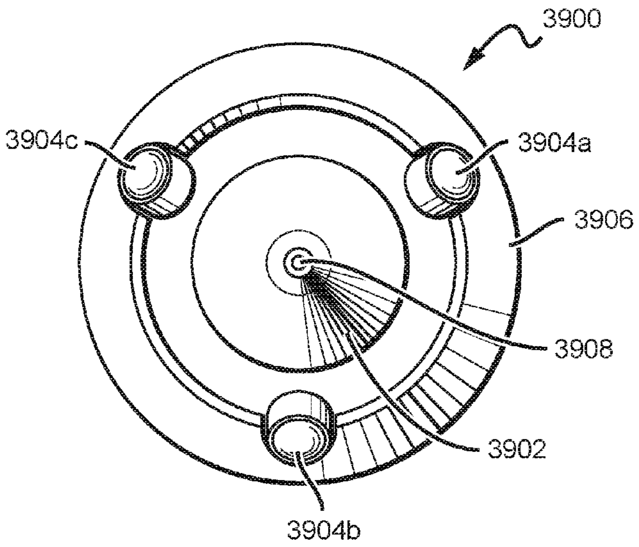
FIG. 39B
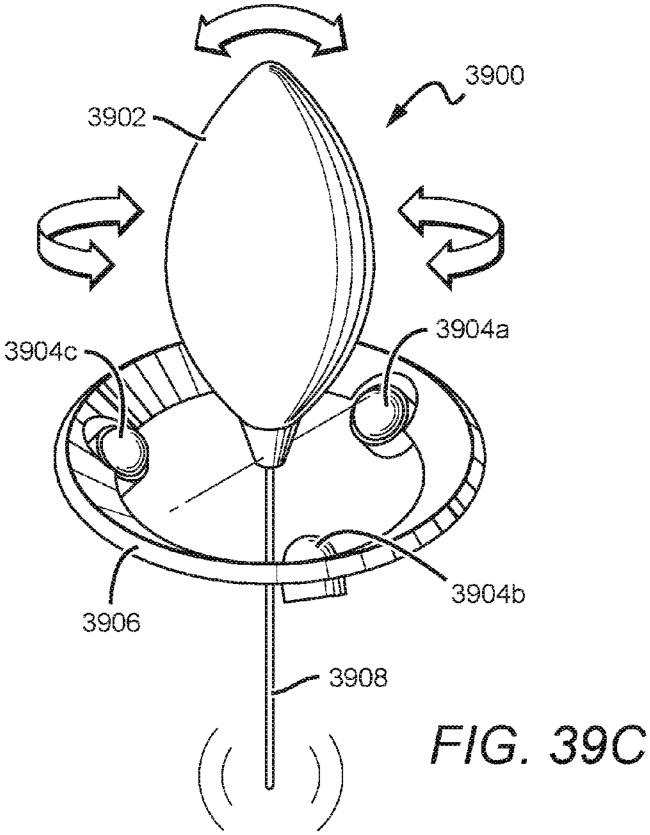
FIG. 39C

FIG. 39D
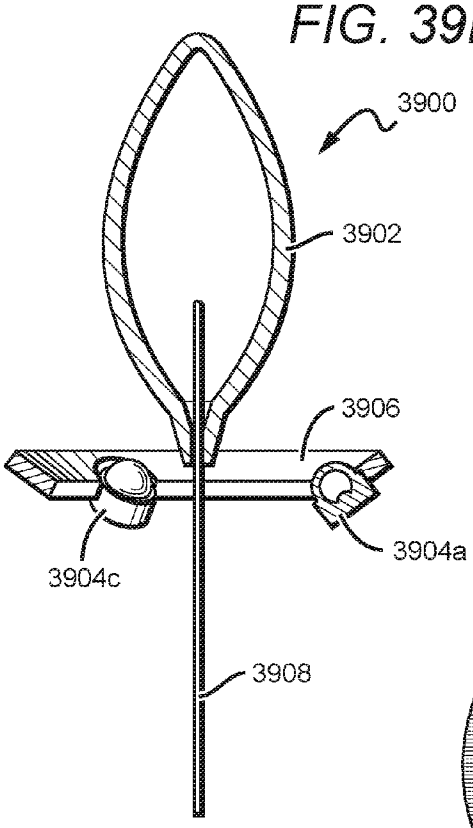
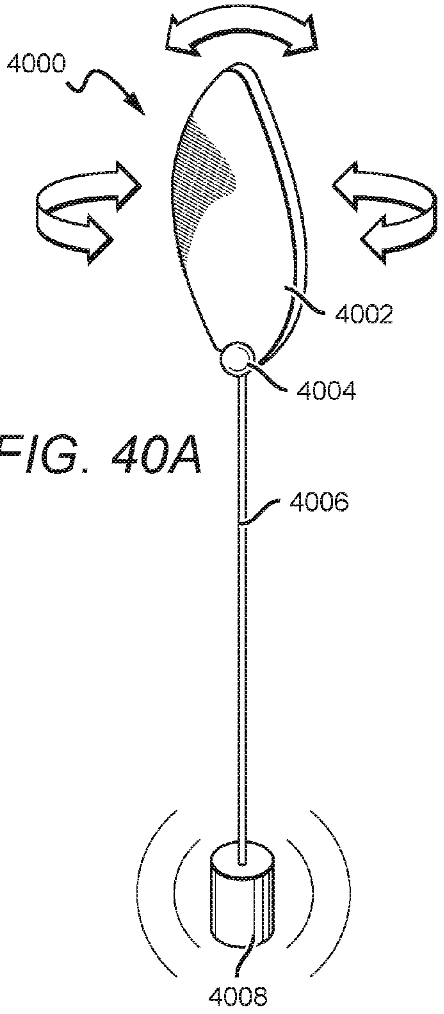
FIG. 40A
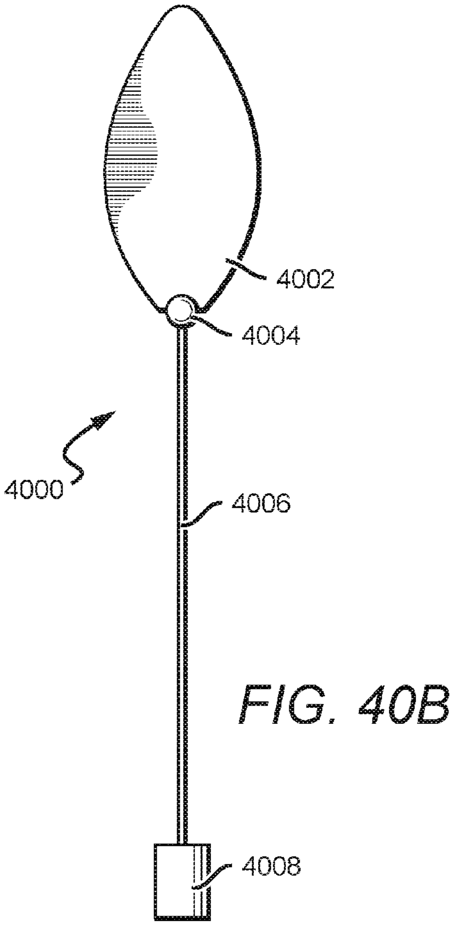
FIG. 40B

FIG. 44A
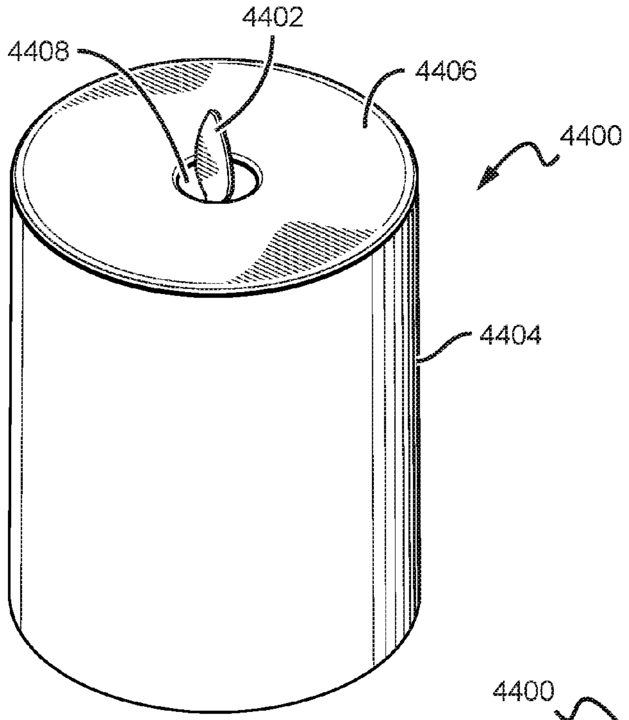
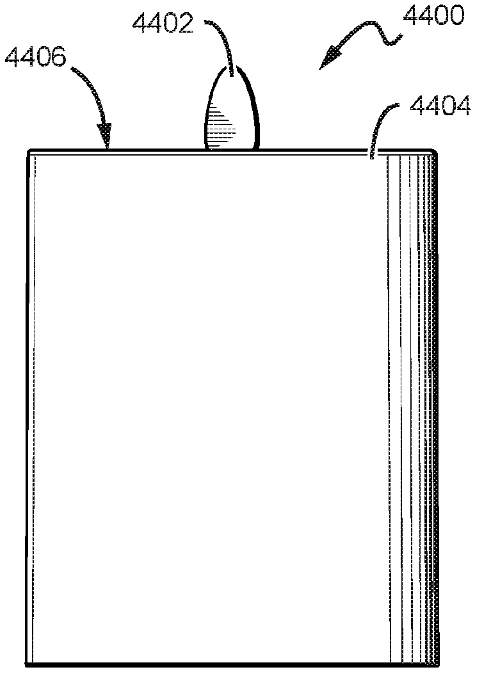
FIG. 44C
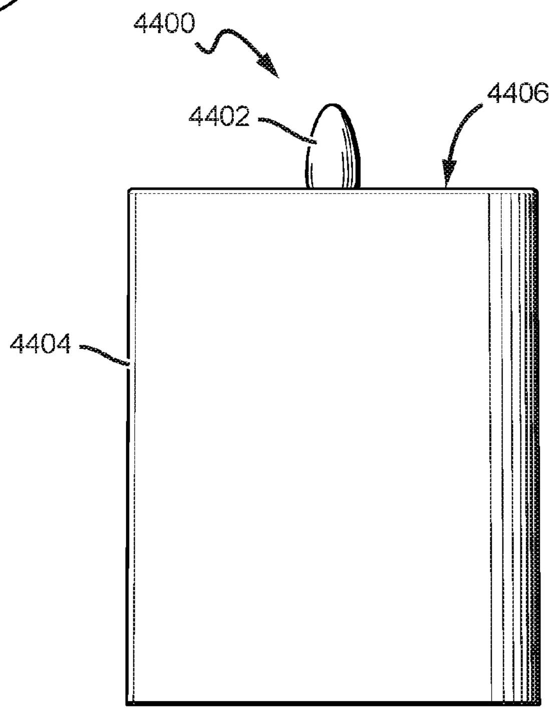
FIG. 44B

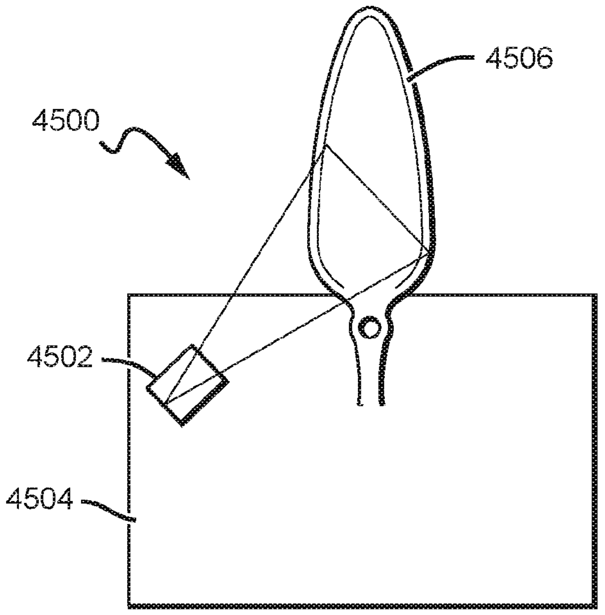
FIG. 45
FIG. 47
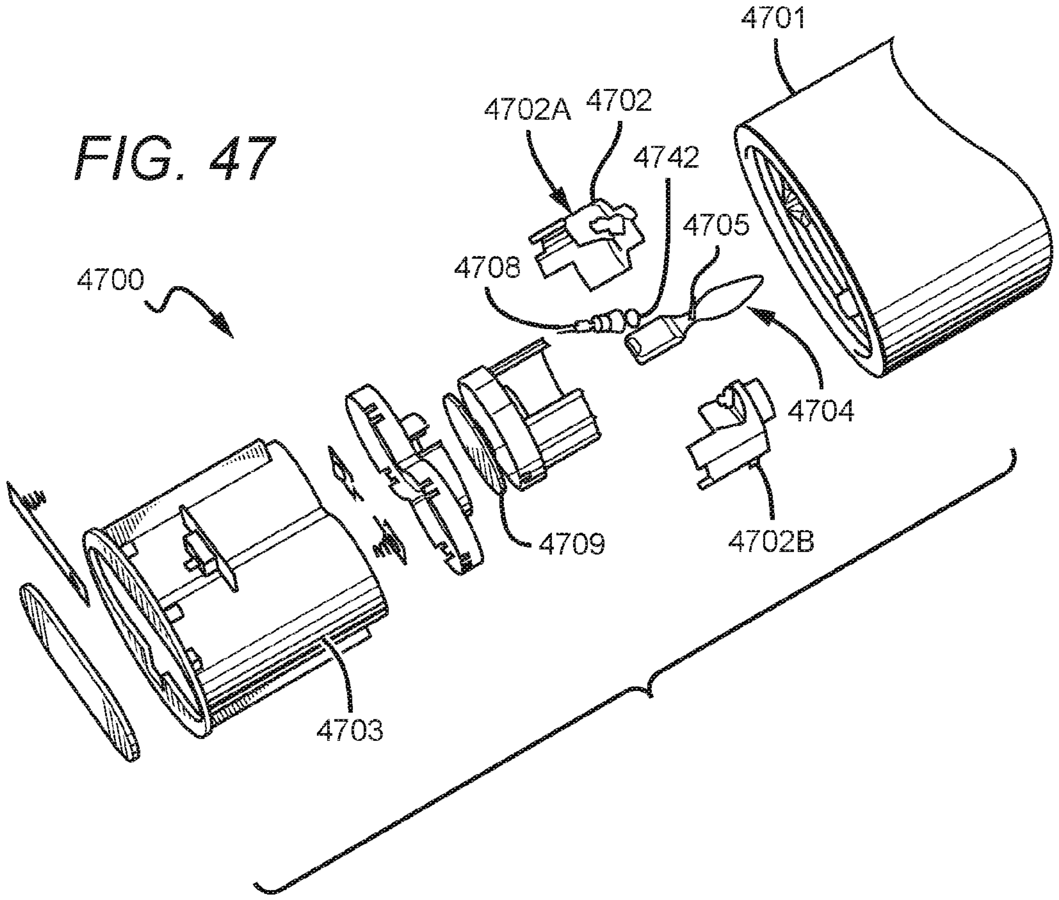

ELECTRIC LIGHTING DEVICES HAVING A MOVABLE FLAME-SHAPED PIECE WITH A HOLLOW INTERIOR

This application is a divisional of U.S. application Ser. No. 14/778,979, filed Sep. 21, 2015, which is a U.S. National Stage filing of PCT/US14/49819, filed Aug. 5, 2014, which claims priority to U.S. provisional application having Ser. No. 61/862,407, filed Aug. 5, 2013. This and all other extrinsic materials identified herein are incorporated by reference in their entirety.

FIELD OF THE INVENTION

The field of the invention is electric lights.

BACKGROUND

The background description includes information that may be useful in understanding the present invention. It is not an admission that any of the information provided herein is prior art or relevant to the presently claimed invention, or that any publication specifically or implicitly referenced is prior art.

Various electric lights are known in the art. See, e.g., U.S. Pat. No. 8,132,936 to Patton et al., U.S. Pat. No. 8,070,319 to Schnuckle et al., U.S. Pat. No. 7,837,355 to Schnuckle et al., U.S. Pat. No. 7,261,455 to Schnuckle et al., U.S. Pat. No. 7,159,994 to Schnuckle et al., US 2011/0127914 to Patton et al., U.S. Pat. No. 7,350,720 to Jaworski et al.; US 2005/0285538 to Jaworski et al. (publ. December 2005); U.S. Pat. No. 7,481,571 to Bistritzky et al.; US 2008/0031784 to Bistritzky et al. (publ. February 2008); US 2006/0125420 to Boone et al. (publ. June 2006); US 2007/0127249 to Medley et al. (publ. June 2007); US 2008/0150453 to Medley et al. (publ. June 2008); US 2005/0169666 to Porchia, et al. (publ. August 2005); U.S. Pat. No. 7,503,668 to Porchia, et al.; U.S. Pat. No. 7,824,627 to Michaels, et al.; US 2006/0039835 to Nottingham et al. (publ. February 2006); US 2008/0038156 to Jaramillo (publ. February 2008); US 2008/0130266 to DeWitt et al. (publ. June 2008); US 2012/0024837 to Thompson (publ. February 2012); US 2011/0134628 to Pestl et al. (publ. June 2011); US 2011/0027124 to Albee et al. (publ. February 2011); US 2012/0020052 to McCavit et al. (publ. January 2012); and US 2012/0093491 to Browder et al. (publ. April 2012).

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Thus, there is still a need for improved electric candles and other lighting devices.

SUMMARY OF THE INVENTION

The inventive subject matter provides apparatus, systems and methods in which an electric lighting device can be created with a minimal number of components, which when properly connected and configured, the components ultimately form a portion of an electronic candle.

An electric candle preferably includes an outer housing that could be coated with wax. Inside, an inner housing can be mounted. A flame piece can be coupled to the inner housing via support member, such that the flame piece can pivot about the support member and thereby vary its position with respect to the inner housing. Flame piece preferably includes upper and lower portions, with the upper portion disposed above where the support member passes through the flame element, and the lower portion disposed below that point. The upper portion can include a concave surface defining a face of the flame piece onto which light can be emitted by light source. Of course, planar and other dimensional surfaces could alternatively be used without departing from the scope of the invention. A light source that is preferably disposed within the inner housing can emit light through a lens, which advantageously focuses the light on to a face of the flame element.

Candle can further include a circuit board (controller) that fits within the inner housing. Preferably, where the flame element moves with respect to the housing, the circuit board can control a drive mechanism, which could be an electromagnet, a fan, or other component that creates kinetic motion of the flame element.

The various embodiments described below can be utilized within an artificial candle. It is specifically contemplated that various combinations of components from different embodiments could be utilized together without departing from the scope of the invention. For example, different components used to support or suspend the flame piece could be used with various components that are configured to cause movement of the flame piece. Many, if not all, of the drive mechanisms described herein could be used with the various structures that support the flame piece.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIGS. 2A-2D show a flame simulating device having a flame-shaped piece that is caused to swing and/or rotate by a collar having an extruding finger that is coupled to an agitator.

FIGS. 3A-3B show a flame simulating device having a flame-shaped piece suspended by crossing support members, which is caused to swing and/or rotate by an agitator.

FIGS. 4A-4D show a flame simulating device having a flame-shaped piece that is supported by a rod and pin.

FIGS. 11A-11C show a flame simulating device having a flame-shaped piece that has an extension rod coupled to its lower portion, such that a set of rotating arms below the flame-shaped piece interact with the extension rod to cause the flame-shaped piece to swing and/or rotate.

FIGS. 12A-12E show a flame simulating device having a flame-shaped piece that has a hollowed skirt and a support rod that suspends the flame-shaped piece by contacting the interior of the skirt.

FIGS. 13A-13E show a flame simulating device having a flame-shaped piece similar to the flame-shaped piece of FIGS. 12A-12E, where the skirt has two magnets coupled to its interior and there is a coil below the flame-shaped piece.

FIGS. 16A-16E show a flame simulating device similar to the flame simulating device of FIGS. 15A-15E except without the light source on the end of the support rod.

FIGS. 17A-17C show a flame simulating device having a flame-shaped piece that is coupled to a support rod which is further coupled to an agitator.

FIGS. 18A-18B show a flame simulating device having a flame-shaped piece that is coupled to a chain which is further coupled to a weight. The weight is caused to move by an agitator.

FIGS. 19A-19D show a flame simulating device having a flame-shaped piece with a support hole and a support member that is molded in to the flame-shaped piece that protrudes from the top of the support hole such that the flame-shaped piece can be suspended by resting the end of the support member in a cup-like device.

FIGS. 20A-20F show a flame simulating device having a flame-shaped piece similar to that of FIGS. 19A-19D, except the upper support member is molded from the same material as the flame-shaped piece.

FIGS. 21A-21D show a flame simulating device having a flame-shaped piece having a magnet, where the flame-shaped piece is suspended by magnets that surround it.

FIGS. 22A-22D show a flame simulating device having a flame-shaped piece that is suspended by a rod having a rounded end that snaps in to the flame-shaped piece.

FIGS. 23A-23D show a flame simulating device having a flame-shaped piece that is suspended by a rod and pin, where the pin passes through a beveled hole in the flame-shaped piece.

FIGS. 29A-29D show a flame simulating device having a flame-shaped piece that is suspended by rod where the two are coupled by a ball and socket joint.

FIGS. 30A-30D show a flame simulating device having a flame-shaped piece that is suspended by a rod where the two are coupled by a ball and socket joint, and where the ball and socket joint use electromagnetic effects to cause rotation and/or swinging in the flame-shaped piece.

FIGS. 32A-32D show a flame simulating device having a flame-shaped piece that is caused to rotate and/or swing by the interaction of a magnet attached to its bottom portion and a magnetic field generating coil attached to a rotating disk located below the flame-shaped portion.

FIGS. 35A-35D show a flame simulating device having a flame-shaped piece that is caused to swing and/or rotate by the reciprocating motion of an arm that is pinned to a rotating disk.

FIGS. 36A-36E show a flame simulating device having a three dimensional flame-shaped piece that is opaque, translucent, transparent, or some combination of both such that a light source on the end of a rod suspends the flame element and produces a candle-like flame effect.

FIGS. 37A-37H show a flame simulating device having a flame-shaped piece that has a magnet on its lower portion such that the magnet interacts with a magnet attached to a horizontally rotating disk located below the flame-shaped piece.

FIGS. 38A-38H show a flame simulating device having a flame-shaped piece that has a magnet on its lower portion such that the magnet can interact with four magnets attached to a horizontally rotating disk located below the flame-shaped piece to cause the flame-shaped piece to rotate and/or swing.

FIGS. 39A-39D show a flame simulating device having a three dimensional flame-shaped piece having approximately circular horizontal cross-sections and a band holding a plurality of light sources that project light on to the flame-shaped piece.

FIGS. 40A-40C show a flame simulating device having a flame-shaped piece that is pivotally coupled to a support rod which is further coupled to an agitator.

FIGS. 44A-44C show different views of an artificial candle that is configured to contain any of the above-described flame simulating devices.

FIG. 45 is a cutaway view of an artificial candle similar to the artificial candle shown in FIGS. 44A-44C. The artificial candle has a light source that is mounted within the housing, such that light is projected onto a flame-shaped piece.

FIG. 47 is an exploded view of one embodiment of an electric candle.

DETAILED DESCRIPTION

Figure 1A:
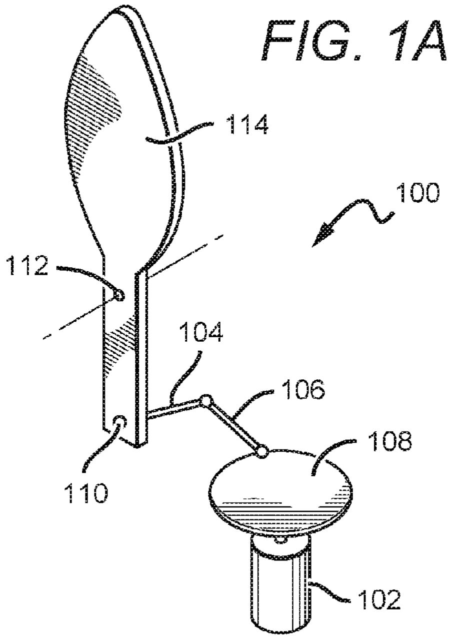
FIGS. 1A-1C show a flame simulating device having a flame-shaped piece that is moved by the action of an electronic motor.
Figure 1B:
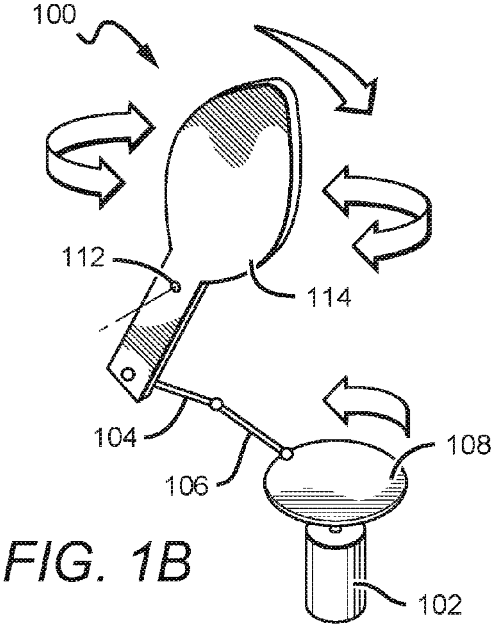
Figure 1C:
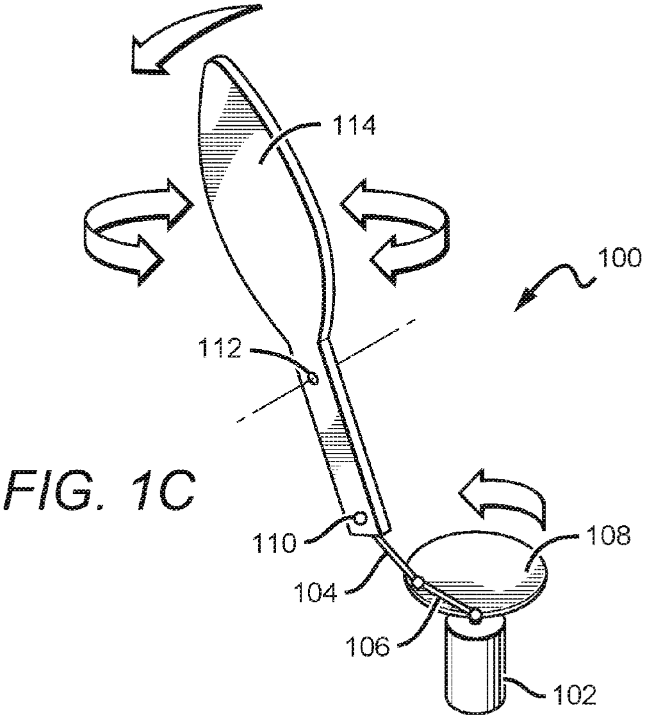

FIG. 1A shows a flame simulating device 100 having a flame-shaped piece 114, a motor 102, two linkage arms 104 and 106, and a linkage plate 108 (or alternatively, a wheel). The flame-shaped piece 114 swings and/or rotates as the motor 102 turns, making the flame-shaped piece 114 take on the appearance of a flickering candle flame as seen in FIGS. 1B and 1C. As the motor 102 turns, it causes the linkage plate 108 to rotate. Linkage arm 106 is coupled to both the linkage plate 108 and linkage arm 104, and linkage arm 104 is further coupled to the flame-shaped piece 114 at connecting point 110. Connecting point 110 is located on the bottom portion of the flame-shaped piece 114, but it can be positioned anywhere below hole 112. The flame-shaped piece's center of gravity should be below the hole 112 so that the flame-shaped piece 114 remains upright when it is suspended by the hole 112.

Linkage arms 106 and 104 are rigid components, preferably made from either a plastic or a metal, such that rotational movement of the linkage plate 108 causes linkage arm 106 to apply force to linkage arm 104, which in turn applies force to the flame-shaped piece 114 via the connecting point 110. FIG. 1B shows how the flame-shaped piece 114 is caused to move by rotation of the linkage plate 108. As the point where the linkage arm 106 moves toward the flame-shaped piece 114, the linkage arms 104 and 106 cause the connecting point 110 of the flame-shaped piece 114 to move away from the motor 102. Conversely, as the point where the linkage arm 106 moves away from the flame-shaped piece 114, the linkage arms 104 and 106 cause the connecting point 110 to move toward the motor 102.

Two linkage arms 104 and 106 are used to introduce an element of randomness to the movement of the flame-shaped piece 114 as the motor 102 rotates the linkage plate 108. In preferred embodiments, linkage arms 104 and 106 are connected using pin joints to allow for relative motion between the two having a single degree of freedom. In addition, linkage arm 106 is connected to the linkage plate 108 using a pin joint, and linkage arm 104 is connected to the connection point 110 similarly. Of course a single linkage arm could be alternatively be used. In addition, flexible linkage arms are also contemplated. Thus, the device described in FIGS. 1A-1C is caused to rotate and swing simultaneously when the motor 102 is turning.

Figure 2A:
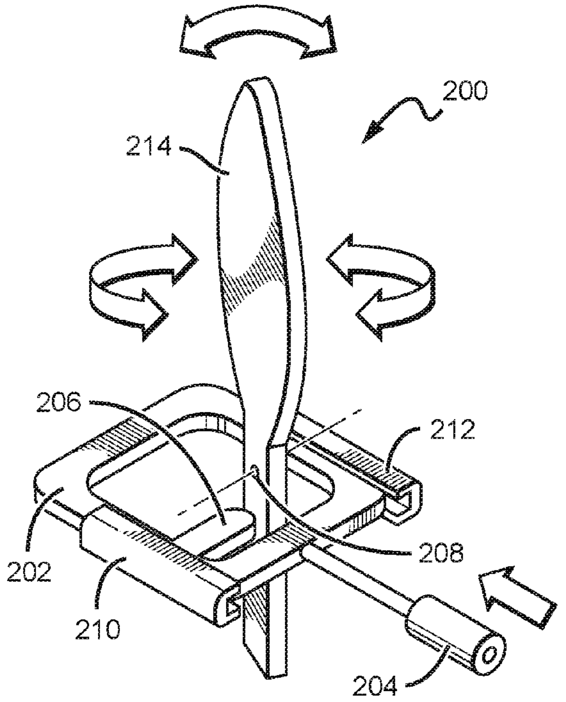
Figure 2B:
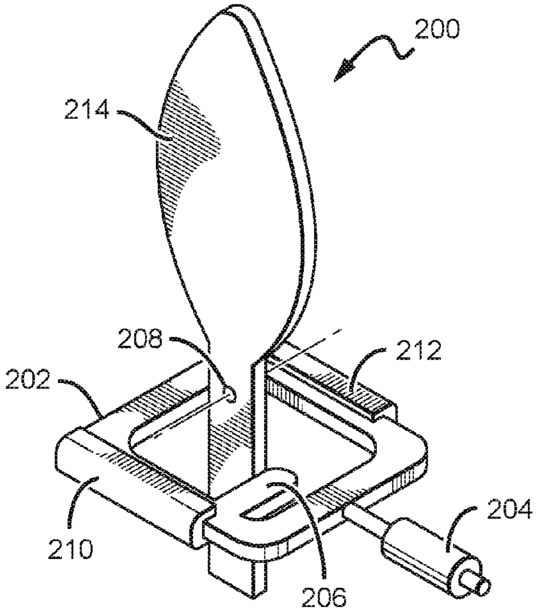
Figure 2C:
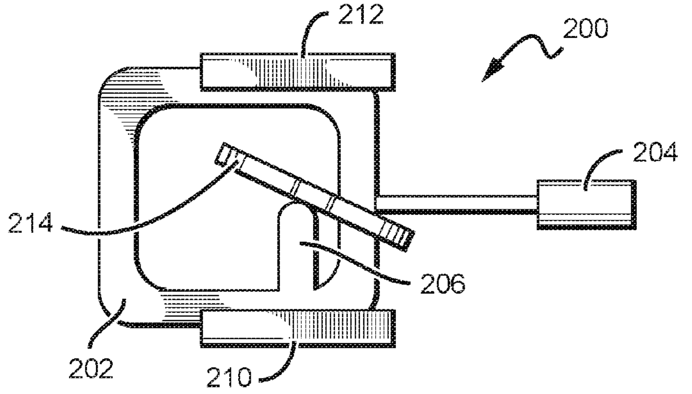

FIGS. 2A-2B show a flame simulating device 200 having a flame-shaped piece 214 that is caused to swing and/or rotate by a collar 202 in conjunction with an agitator 204. FIGS. 2C-2D show top views of FIGS. 2A-2B, respectively. To cause the flame-shaped piece 214 to move, the agitator 204 acts as a piston to cause the collar 202 to slide translationally with respect to the flame-shaped piece 214. The collar 202 is configured as a plate having a cutout center, where the center may optionally have a finger 206 protruding from a side of the interior portion of the collar 202.

When the agitator 204 is activated it causes the collar 202 to move back and forth guided by two brackets 210 and 212. The finger 206 interacts with the flame-shaped piece 214 since the collar 202 is caused to move with respect to the flame-shaped piece 214. FIGS. 2A and 2C show the position of collar 202 relative to the flame-shaped piece 214 when the agitator 204 is in an extended configuration (e.g., a solenoid or hydraulic piston is pushed out from the body). As the collar 202 moves to this position, the finger 206 causes the flame-shaped piece 214 to rotate and swing since the finger 206 is sized and shaped to nudge, push, and rotate the flame-shaped piece 214.

Once extended, the collar 202 can then be pulled into a different position by the agitator 204. FIGS. 2B and 2D show the collar 202 in such a position. When the agitator 204 pulls the collar 202 into this position, the collar 202 again interacts with the flame-shaped piece 214 as it moves relative to the flame-shaped piece 214. Thus, as the agitator 204 pushes both in and out, the collar 202 is caused to move back and forth relative to the flame-shaped piece 214 causing the flame-shaped piece 214 to rotate and swing.

Components that cause reciprocating movement as required by the flame simulating device 200 described above include any device that causes translational movement, such as pneumatic pistons and solenoids. In some embodiments, a rotating element similar the rotating element of FIGS. 1A-1C can be used, where there is only a single linkage arm connecting the linkage plate to the agitator. In this way, the collar 202 can be caused to move back and forth to create swinging and rotational movement in the flame-shaped piece 214.

Since solenoids operate using principles of electromagnetism, when current passes through a solenoid, it generally causes the piston portion of the solenoid to quickly move in one direction or another. For purposes of the inventive subject matter, a damping component may be included with the solenoid to slow down its actuation movements.

FIGS. 3A and 3B show a flame simulating device 300 having a flame-shaped piece 306 that can be caused to rotate and/or swing by an agitator 302 connecting to support members 304. Support members 304 are made from, for example, metal (e.g., steel, aluminum, copper, tin, or any kind of metal or metal alloy) or flexible, fibrous material (e.g., string, yarn, synthetic strings made from, for example, nylon). Agitator 302 is coupled to the support members 304 such that as the agitator 302 moves, it causes the support members 304 to vibrate. This vibration then causes the flame-shaped piece 306 to rotate and/or swing.

Agitators that can be used include DC motors having a non-coaxial weight attached to the shaft such that as it spins the motor is caused to vibrate. In other embodiments, the agitator 302 can be a piezoelectric vibrating mechanism. In preferred embodiments, the support members 304 couple to the flame-shaped piece 306 at a point higher than its center of mass. More specifically, support members 304 couple to the flame-shaped piece 306 above its center of mass as seen in FIGS. 3A-3B. One or more support members 304 can be used to support the flame-shaped piece 306 as long as each support member 304 couples to the flame-shaped piece 306 at the same point as described above.

FIGS. 4A-4D show a flame simulating device 400 preferably having a flame-shaped piece 414 that is coupled to the end of a rod 402. Rod 402 has a cylindrical, hollow portion on one end 412. The hollow portion 412 can either be at an angle relative to the rod 402 as shown in FIG. 4A, or it can alternatively collinear with the rod 402.

A pin 408 is configured to fit into the hollow portion 412 such that when the pin 408 passes through a hole 410 in the flame-shaped piece 414, the flame-shaped piece 414 is pivotally and rotatably supported. The pin 408 has an elongated portion 404 and a flanged portion 406. The flanged portion 406 is flared out to prevent the flame-shaped piece 414 from falling off of the structure when the pin 408 is coupled to the rod 402.

The hole 410 in the flame-shaped piece 414 is located above the flame-shaped piece's 414 center of mass such that when the flame-shaped piece 414 is supported by the pin 408 and the rod 402 it is oriented upright. The hole 410 has a larger diameter than the diameter of the elongated portion of the pin 404 in some embodiments, and in other embodiments the hole 410 has a diameter greater than the diameter of the hollow portion 412. Thus, the flame-shaped piece 414 can be supported by either the elongated portion of the pin 404 or the hollow portion 412 of the rod 412. FIG. 4D shows the former configuration. FIG. 4B shows a perspective view of the flame simulating device 400, and FIG. 4C shows a front view of the flame simulating device 400.

Figure 5A:
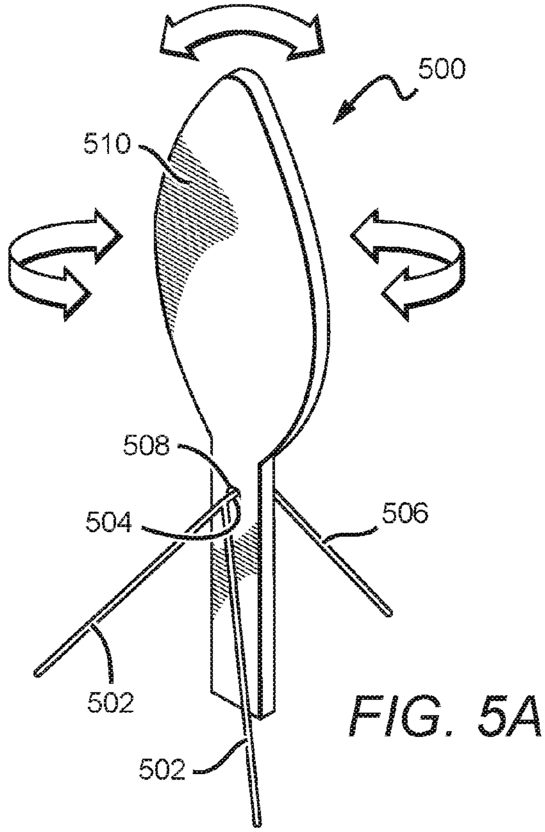
FIGS. 5A-5B show a flame simulating device having a flame-shaped piece that is supported by a three support members configured as a tripod.
Figure 5B:
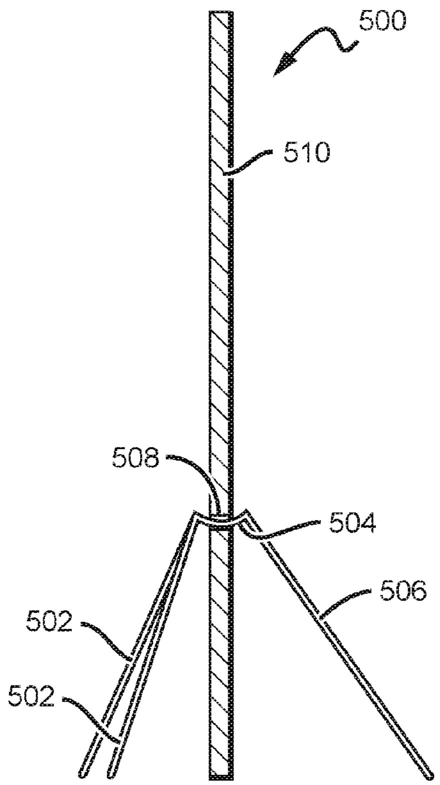

FIGS. 5A and 5B show a flame simulating device 500 having a flame-shaped piece 510 that is suspended via support members 502 and 506 as well as a support link 504. In this embodiment, support members 502 in conjunction with support member 506 create a tripod where support link 504 provides a bridge between the support members 502 and 506. Support link 504 passes through a support hole 508 on the flame-shaped piece 510 such that the flame-shaped piece 510 is supported and upright at rest. Support link 504 can be curved as seen in FIG. 5B such that it creates a trough for the flame-shaped piece 510 to rest in. This allows the flame-shaped piece 510 to be centered with respect to the support members 502 and 506, which in turn allows the flame-shaped piece 510 to rotate and/or swing freely. The flame-shaped piece 510 can be made from different materials to allow for variations in transparency. For example, it can be completely transparent on the bottom and completely opaque on the top; with a gradient of changing transparency in between, or it can have a single transparency. In preferred embodiments, the flame-shaped piece becomes transparent as it extends downward (e.g., it is completely transparent at the support hole 508) so as not to interact with the light emitted from the light source.

Figure 6A:
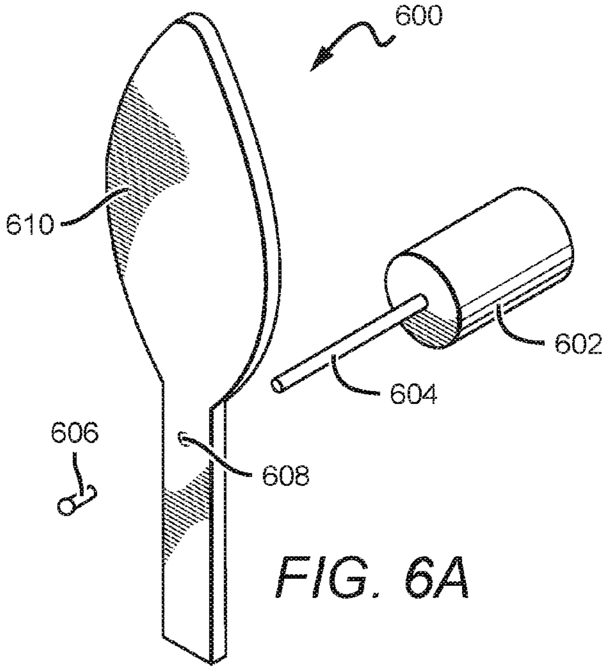
FIGS. 6A-6D show a flame simulating device having a flame-shaped piece that is supported by a shaft and pin, where the shaft is connected to an agitator that causes the flame-shaped piece to swing and/or rotate.
Figure 6B:
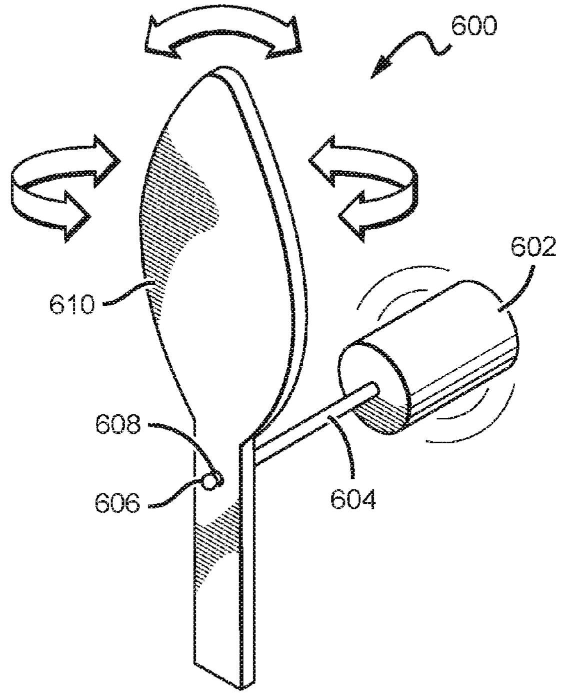
Figure 6C:
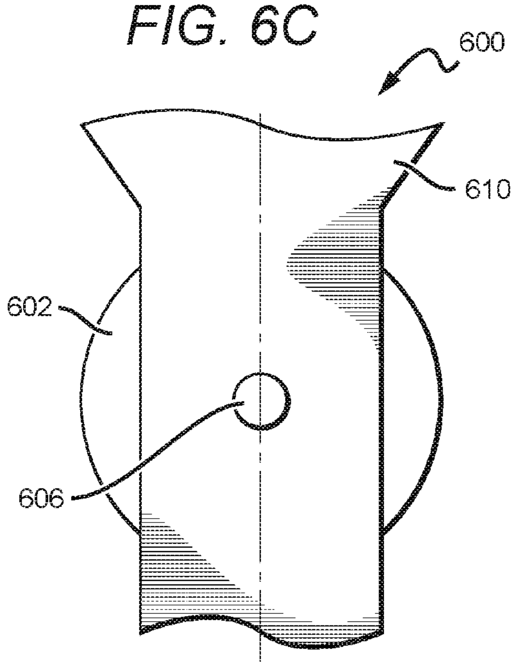
Figure 6D:
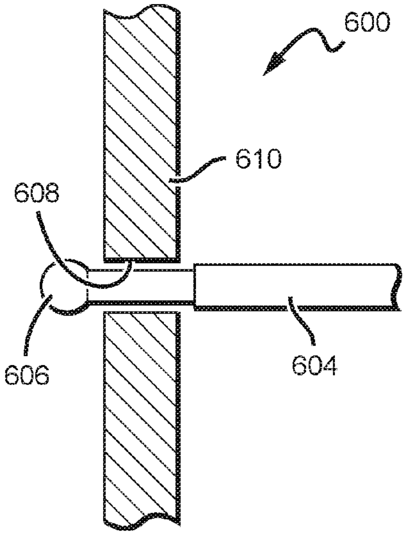

FIGS. 6A-6D show a flame simulating device 600 similar to the device of FIGS. 4A and 4B. FIGS. 6C and 6D show front and side views of the embodiment of FIGS. 6A and 6B. The flame simulating device 600 has a flame-shaped piece 610 that is supported by a rod 604 and pin 606, where the pin 606 passes through a support hole 608 on the flame-shaped piece 610. In this embodiment, the end of the rod 604 is hollow to receive the pin 606. The pin 606 has an end that has a larger diameter than the shaft of the pin 606 and also larger than the diameter of the hole 608. This prevents the flame-shaped piece 610 from sliding off the pin 606 when the pin 606 is passed through the support hole 608 and fitted into the hollowed end of the rod 608. The pin 606 can be coupled to the rod by pressure fit, by clipping in, by adhesive, or by any other appropriate fastening means.

Rod 604 extends from an agitator 602. The agitator 602 is configured to produce movement in the rod 604, which in turn causes the flame-shaped piece 610 to swing and/or rotate. It is contemplated that the agitator 602 can be a motor that is configured to generate rotational movement in the rod 604. In such a configuration, movement in the flame-shaped piece 610 can be caused by bumps on either the rod 604 or the pin 606 which interact with the support hole 608 of the flame-shaped piece 610 as the rod 604 rotates. To cause appropriate movement, the agitator 602 (in this case a motor) can be geared to cause the rod 604 to rotate slowly.

Figure 7A:
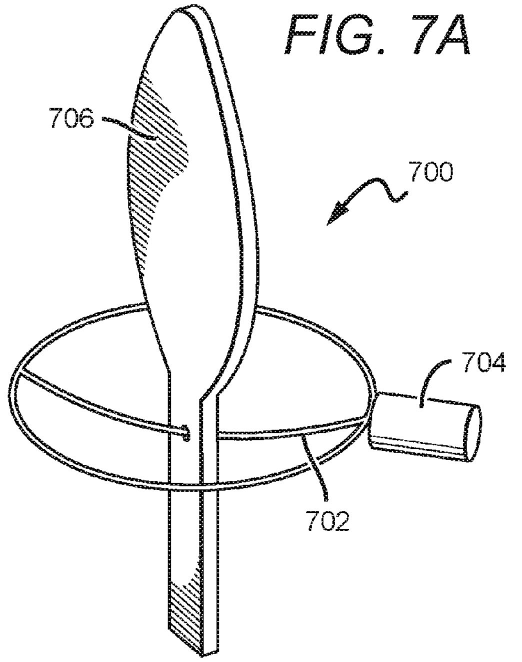
FIGS. 7A-7B show a flame simulating device having a flame-shaped piece that is suspended by a support member that is coupled to an agitator.
Figure 7B:
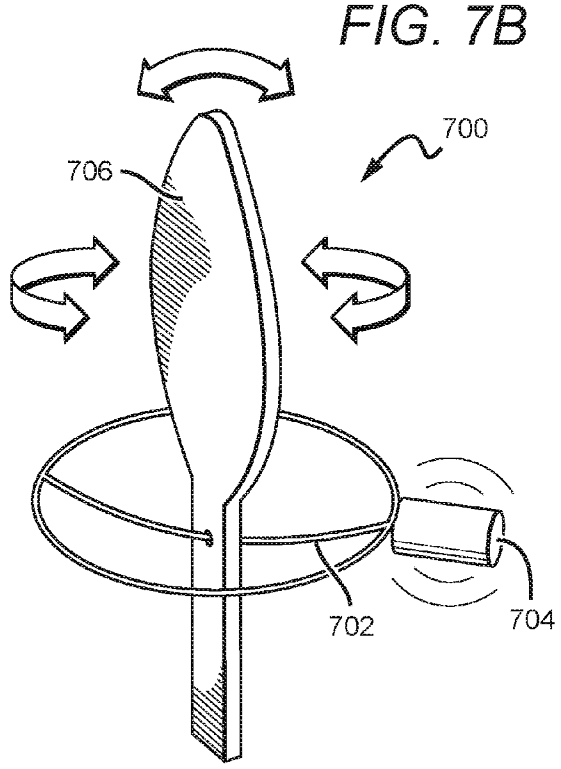

FIGS. 7A and 7B show a flame simulating device 700 that is substantially similar to the flame simulating device shown in FIGS. 3A and 3B. Instead of multiple support members, this flame simulating device 700 includes only a single support member 702 (e.g., fishing line, or another suitable string material that is either clear, opaque, or translucent). The support member 702 holds a flame-shaped piece 706 by passing through a support hole 708 located above the center of mass of the flame-shaped piece 706, and an agitator 704 causes the support member 702 to move (e.g., vibrate or undulate), which in turn causes the flame-shaped piece 706 to swing and/or rotate. To enable the flame-shaped piece 706 to move and/or sway, support member 702 could comprise a rigid piece or alternatively a flexible piece (e.g., sufficiently flexible to allow the flame-shaped piece 706 to cause elastic deformation in the support member 702).

Figure 8A:
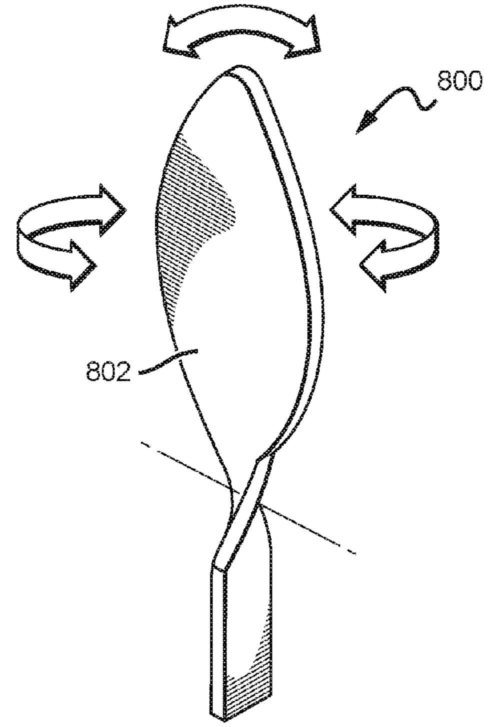
FIGS. 8A-8C show a flame simulating device having a flame-shaped piece where the upper portion of the flame-shaped piece is twisted relative to the lower portion.
Figure 8B:
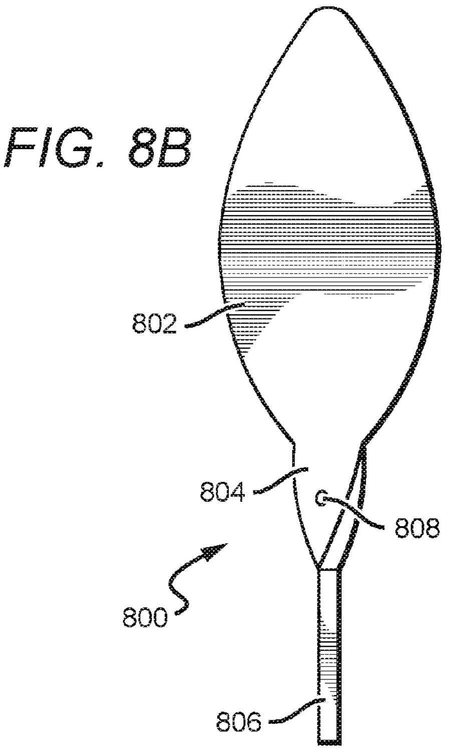
Figure 8C:
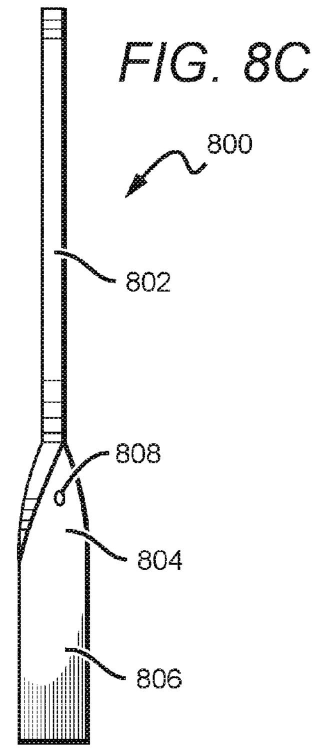

FIGS. 8A-8C show a flame simulating device 800 having a flame-shaped piece comprising a twisted middle portion 804 such that a bottom portion 806 is angled relative to the top portion 802. The angle between the top portion 802 and the bottom portion 806 can include 45, 50, 55, 60, 65, 70, 75, 80, 85, 90, 95, 100, 105, 110, 115, 120, 125, 130, and 135 degrees. The middle portion 804 also has a support hole 808 (seen in FIGS. 8B and 8C), which is positioned such that the center of mass of the flame-shaped piece is below the support hole 808. Preferably, the angle is such that a face 803 of the flame-shaped piece is perpendicular to a face of the bottom portion. As the light source (seen in FIG. 45) is typically disposed in front of the flame-shaped piece such that light is directed on to the face of the upper portion of the flame-shaped piece, this ensures the support member does not block the light emitted by the light source.

Figure 9A:
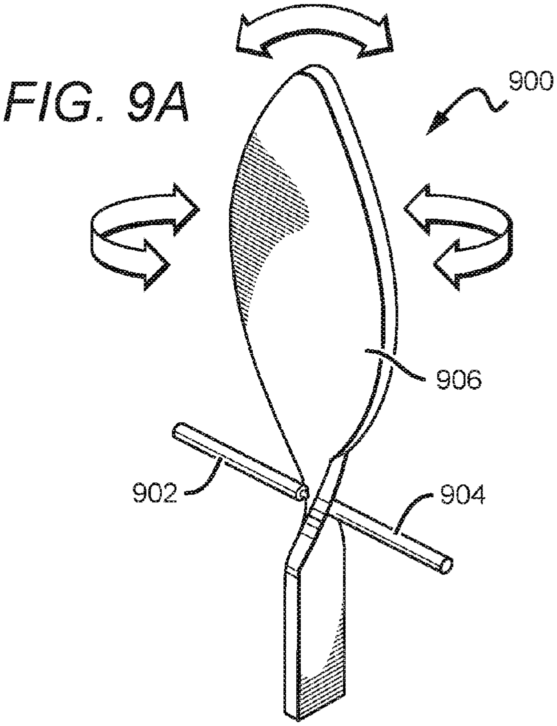
FIGS. 9A-9C show a flame simulating device having a flame-shaped piece similar to that of FIGS. 8A-8C that is also suspended by two rods that couple through a hole in the flame-shaped piece.
Figure 9B:
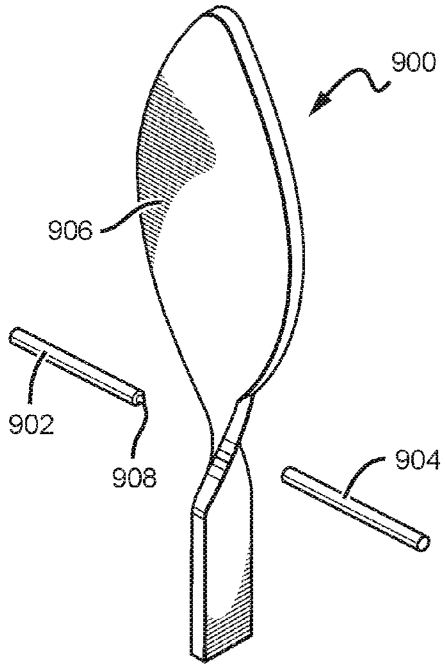
Figure 9C:
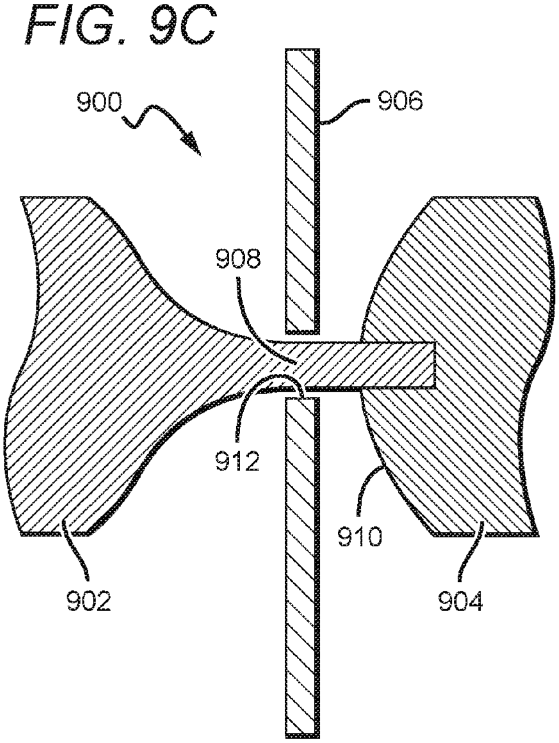

FIGS. 9A-9C show a flame simulating device 900 (described in FIGS. 8A-8C) having a flame-shaped piece 906 and accompanying support member 902 and 904. Support member 902 is configured to couple with support member 904. To do this, support member 902 has a tip portion 908 that has a smaller diameter than the main shaft of the support member 902. The tip portion 906 fits within a hollow portion 910 on the top of the other support member 904 such that the tip portion 908 provides support to the flame-shaped piece 906 via the support hole 912 (seen in FIG. 9C).

Figure 10A:
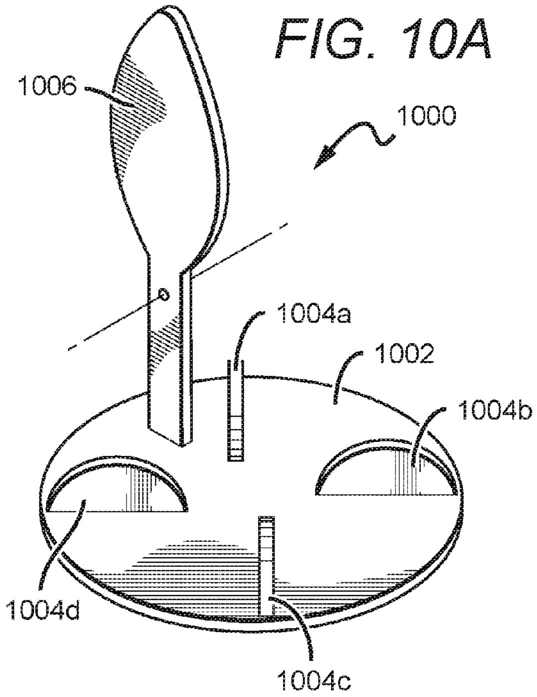
FIGS. 10A-10C show a flame simulating device having a flame-shaped piece that is caused to swing and/or rotate by interacting with tabs on a horizontal disk that rotates below the flame-shaped piece.
Figure 10B:
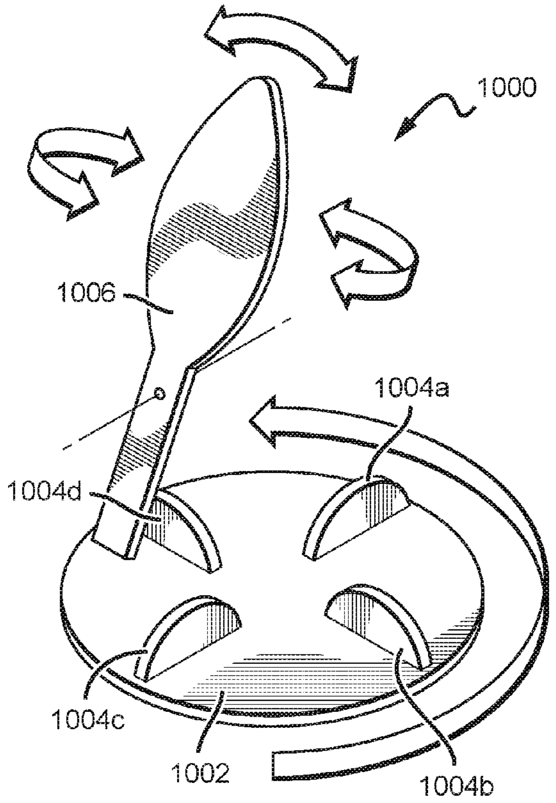
Figure 10C:
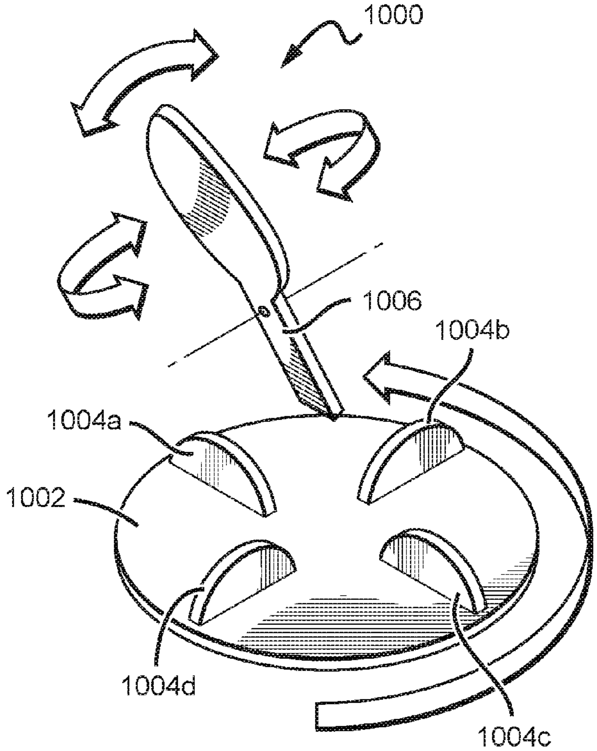

FIGS. 10A-10C show a flame simulating device 1000 having a flame-shaped piece 1006 that is positioned to interact with a tabs 1004*a-d* on a rotating disk 1002. As the disk 1002 rotates, the tabs 1004*a-d* interact with the lower portion of the flame-shaped piece 1006. This interaction causes the flame-shaped piece 1006 to swing and/or rotate. The disk 1002 can be caused to rotate at various speeds and with various rhythms, and it preferably is oriented such that the face of the disk 1002 faces upward toward the flame-shaped piece 1006. Its movement can be sporadic/random or it can be caused by a predetermined program. FIGS. 10B-10C show the flame-shaped piece 1006 swinging and rotating as the tabs 1004*a-d* on the disk 1002 knock into the lower portion of the flame-shaped piece 1006. It is additionally contemplated that the disk can have two tabs, three tabs, or more than four tabs, and the tabs 1004*a-d* can have different sizes and shapes than those pictured without departing from the inventive concepts described herein.

FIGS. 11A-11C shows a flame simulating device 1100 having a flame-shaped piece 1104 and an extension member 1102 coupled to a bottom portion of the flame-shaped piece 1104. The extension member 1102 is positioned such that a set of arms 1106 interact with the extension member 1102 as the set of arms 1106 rotates about a central axis 1108. The central axis 1108 can be coupled to a motor or some other means of generating rotational motion (no pictured).

The set of arms 1106 should be reasonably stiff, such that as the set of arms 1106 interacts with the extension member 1102, the flame-shaped piece 1104 is caused to move and/or rotate. Thus, the set of arms 1106 could be made from metal, plastic, or any other material that has a stiffness comparable to that of plastic. The extension member 1102 can either be stiff or rigid, similar to the set of arms 1106, or alternatively, the extension member could be made from a flexible material such as a string or fibrous material. As long as one end of the extension member 1102 is connected to the lower portion of the flame-shaped piece 1104, then any material having a stiffness sufficient to produce movement in the flame-shaped piece 1104 when the extension member 1102 interacts with the set of arms 1108 is appropriate. FIGS. 11B and 11C show movement of the flame-shaped piece 1104 as the set of arms 1106 rotates and interacts with the extension member 1102.

Figure 12B:
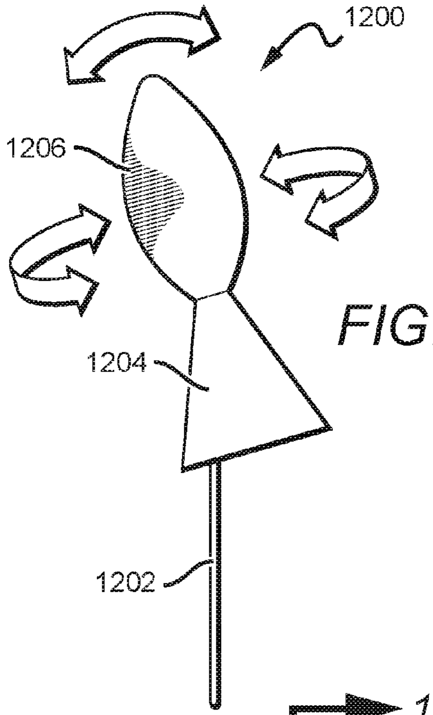
Figure 12C:
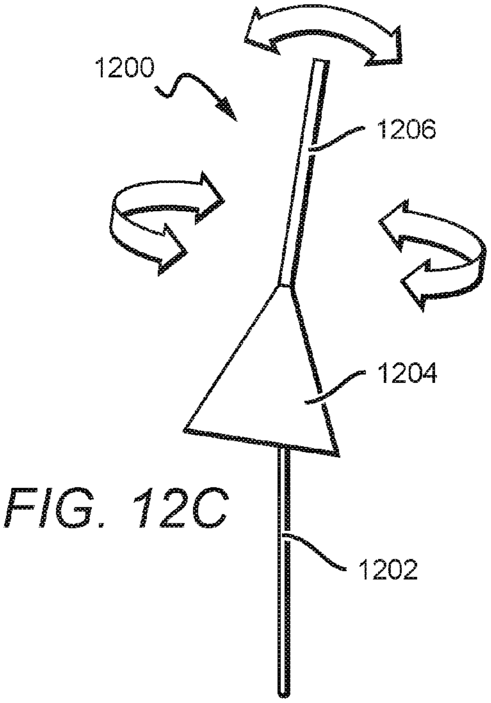
Figure 12D:
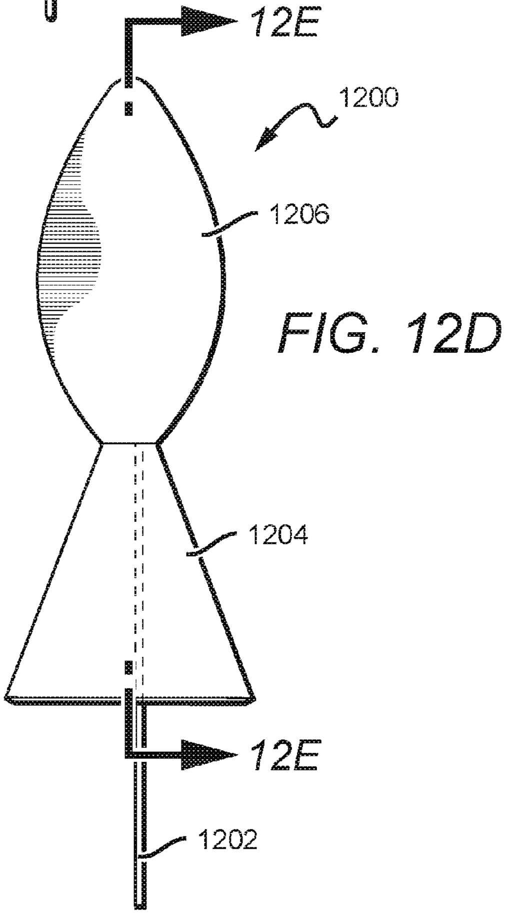
Figure 12E:
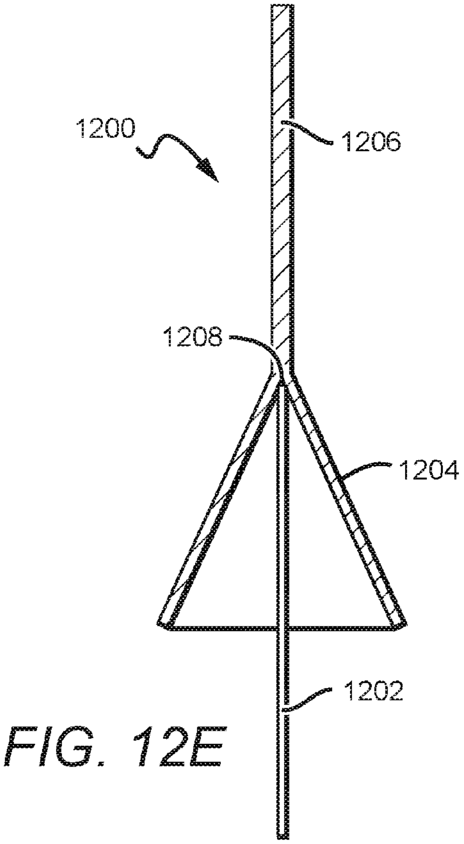

FIGS. 12A-12E show a flame simulating device 1200 having a flame-shaped piece that is suspended by a support member 1202. The flame-shaped piece has two portions: a skirt 1204 and a flame-shaped piece 1206. The skirt 1204 is cone-shaped, having a hollow interior. It is coupled to the flame-shaped piece 1206 such that the point of the skirt 1204 is closest to the flame-shaped piece 1206. The flame-shaped piece is placed onto the support member 1202, such that it is suspended by the support member. In preferred embodiments, the flame-shaped piece is weighted such that the center of mass is located below the point 1208 where the tip of the support member 1202 interacts with the interior of the skirt 1204 (seen in FIG. 12E). FIGS. 12B and 12C show possible movement of the flame simulating device 1200 when it is suspended by the support member 1202.

Figure 13D:
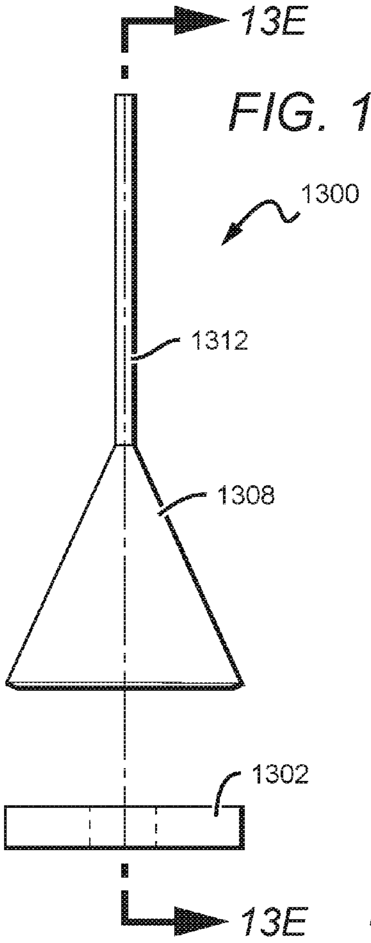
Figure 13E:
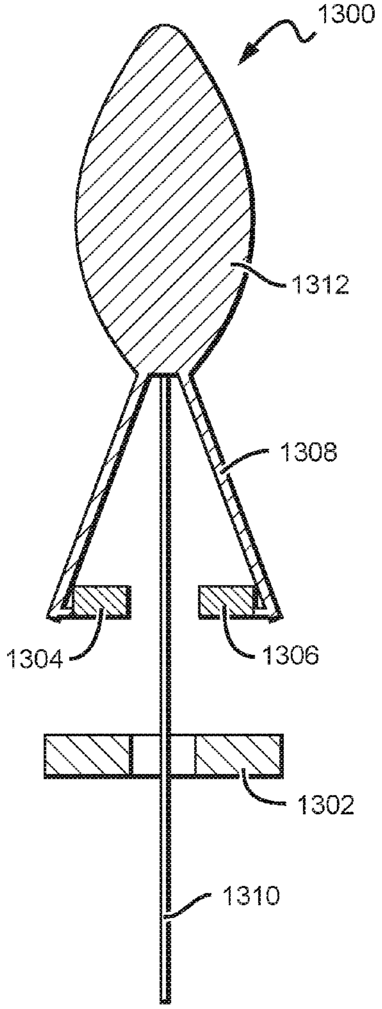

FIGS. 13A-13E show a flame simulating device 1300 that is substantially similar to the flame simulating device of FIGS. 12A-12E. The flame simulating device 1300 of FIGS. 13A-13E include magnets 1304 and 1306 as well as a coil 1302. The coil 1302 is preferably a standard electromagnetic coil that generates a magnetic field when current is passed through it. Current can be passed through the coil 1302 according to a preprogrammed pattern, or it can be passed through randomly. In either scenario, because the magnets 1304 and 1306 are coupled to the skirt 1308, and the coil 1302 is stationary relative to the support member 1310, when the coil 1302 generates a magnetic field, the interaction of that magnetic field with the magnetic fields of the magnets 1304 and 1306 causes the flame-shaped piece (which includes the skirt 1308 and the flame-shaped upper portion 1312) of the flame simulating device 1300 to rotate and/or swing. FIGS. 13B and 13C show movement of the flame-shaped piece as seen from the front and side, respectively.

FIGS. 14A-14E show a flame simulating device 1400 similar to the flame simulating device from FIGS. 12A-12E.

Figure 14A:
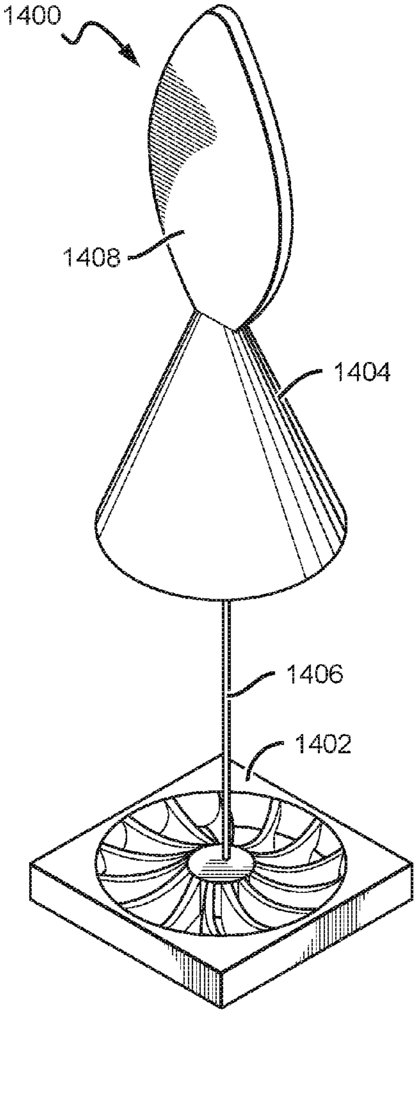
FIGS. 14A-14E show a flame simulating device having a flame-shaped piece similar to the flame-shaped piece of FIGS. 12A-12E, where there is a fan below the skirt.
Figure 14B:
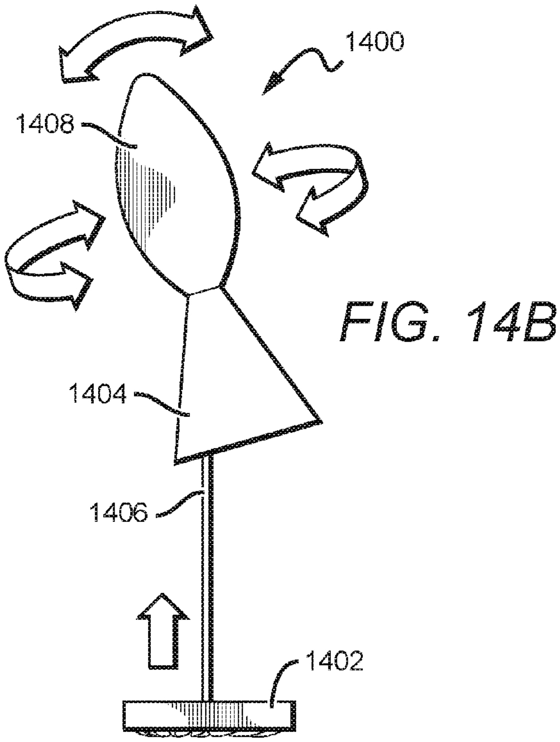
Figure 14C:
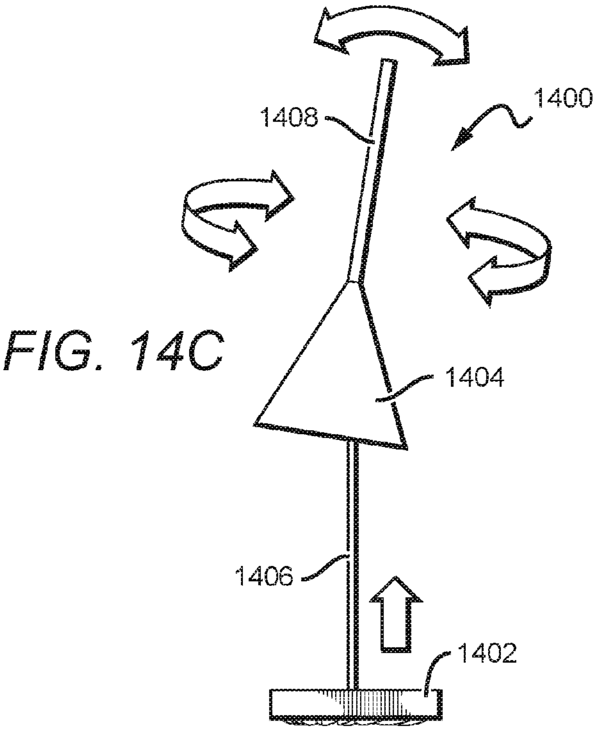
Figure 14D:
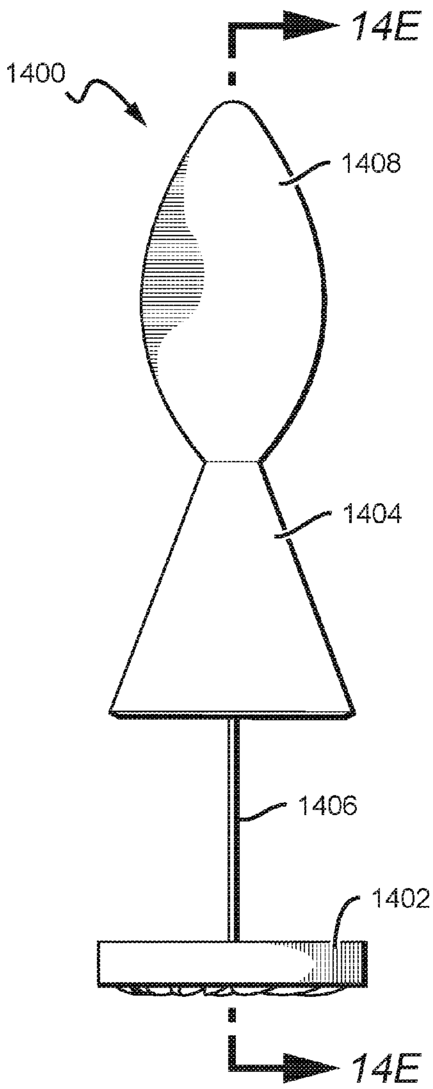
Figure 14E:
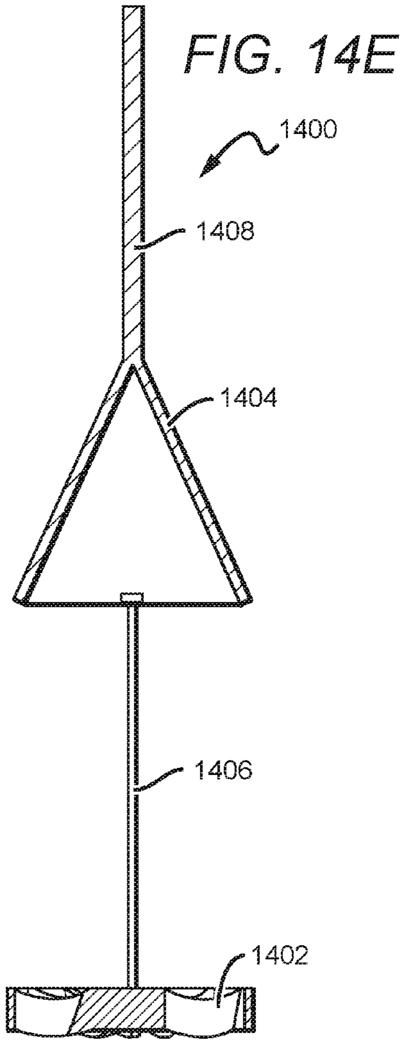

A fan 1402 is configured to blow air either into, or in some embodiments away from, a flame-shaped piece, which comprises a top portion 1408 and a skirt portion 1404, which is shaped as a hollow cone. When the fan 1402 blows air upward toward the skirt portion 1404, air interacts with the skirt portion 1404 causing the flame-shaped piece to swing and/or rotate. This movement is shown in FIGS. 14B and 14C. The flame-shaped piece is able to move because it is supported by a support rod 1406 that interacts with the interior of the skirt 1404 in the same way as the support rod shown in FIGS. 12A-12E and described above. In some embodiments, it is contemplated that the support rod 1406 could rotate with respect to the fan 1402.

Figure 15A:
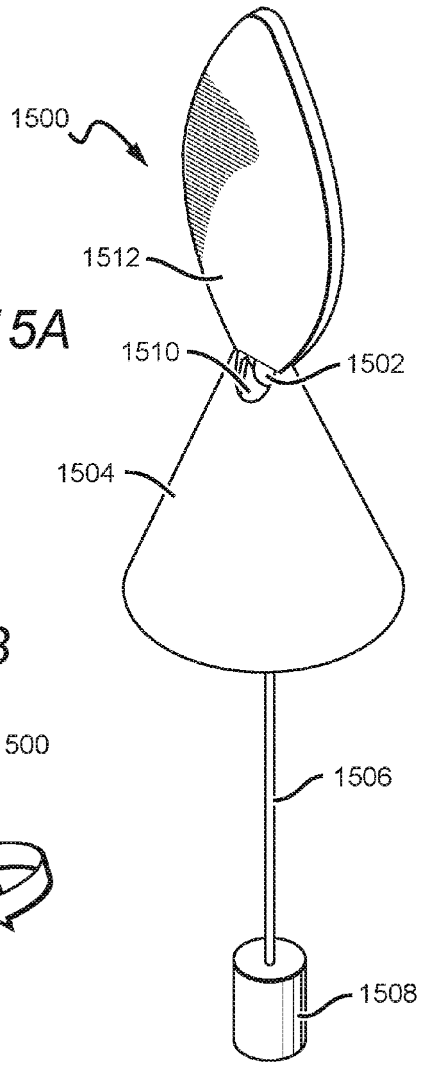
FIGS. 15A-15E show a flame simulating device having a flame-shaped piece similar to the flame-shaped piece of FIGS. 12A-12E, where the support rod has a light source on one end that engages with the interior of the skirt, the skirt has cutouts to allow light to be projected outward from the light source, and there is an agitator coupled to the support rod and positioned below the skirt
Figure 15B:
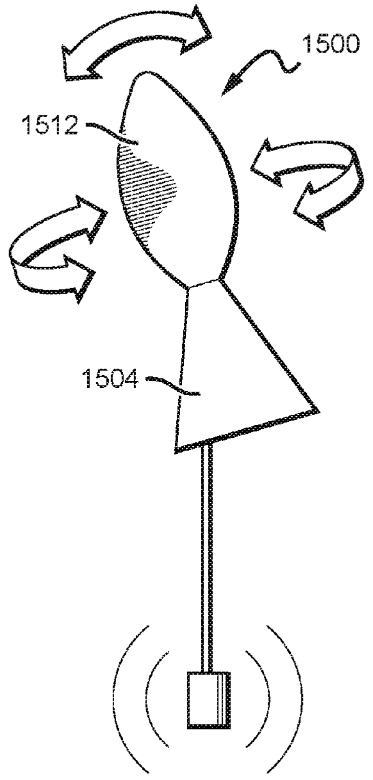
Figure 15C:
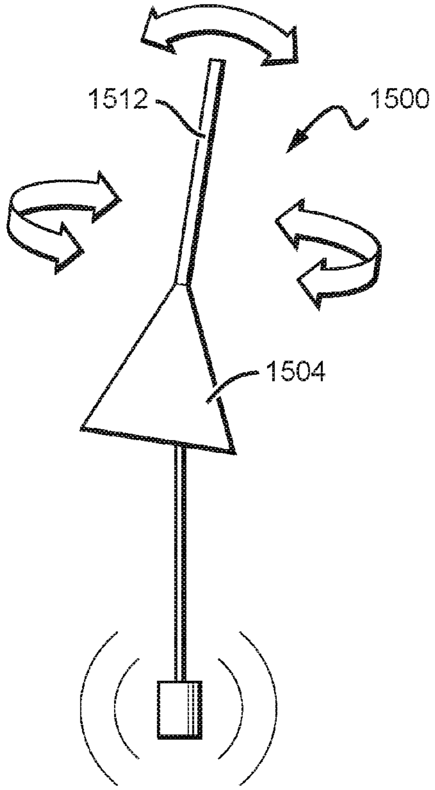
Figure 15D:
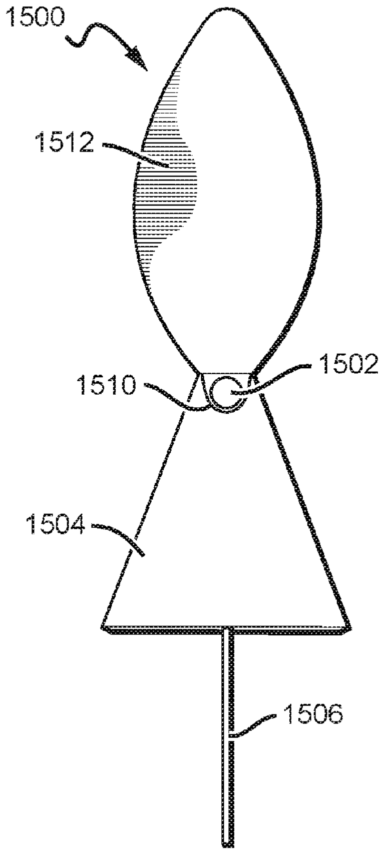
Figure 15E:
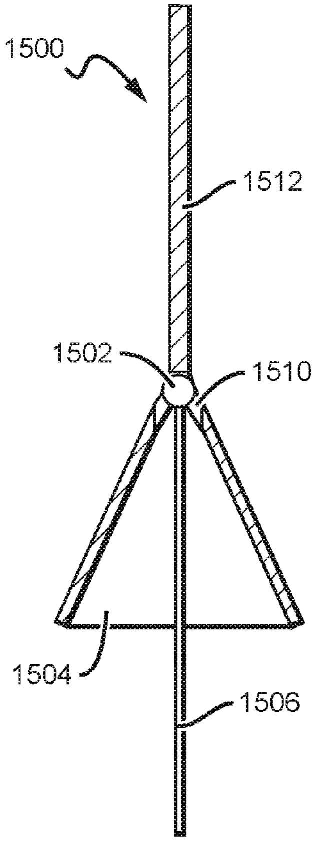

FIGS. 15A-15E show a flame simulating device 1500 that is suspended by a support member 1506 having an LED on the end 1502. As with the flame simulating device shown in FIGS. 12A-12E, the end of the support member 1506 interacts with the interior of a skirt 1504, which coupled together with a flame-shaped piece 1512 comprises a flame-shaped piece. The flame-shaped piece has a cutout portion near the apex of the skirt 1504 that allows light from the LED 1510 to be projected outward. In addition, the flame-shaped piece 1512 can be translucent or even transparent such that light from the LED can permeate the material to give off the appearance of a natural flame. The support member 1506 is coupled to an agitator 1508, such that the agitator 1508 can cause the flame-shaped piece 1504 and 1512 to swing and/or rotate as seen in FIGS. 15B and 15C.

FIGS. 16A-16E show substantially the same flame simulating device as shown in FIGS. 15A-15E without the LED. The flame simulating device 1600 has a flame-shaped piece 1608, a skirt 1604, a support member 1602 and an agitator 1606. These components are the same as those seen in FIGS. 15A-15E and described above. The difference here is that the flame-shaped piece, which comprises the flame-shaped piece 1608 coupled to the skirt 1604, does not have a cutout, and the support member 1602 does not have an LED on the end that interacts with the interior of the skirt 1604.

Figure 17B:
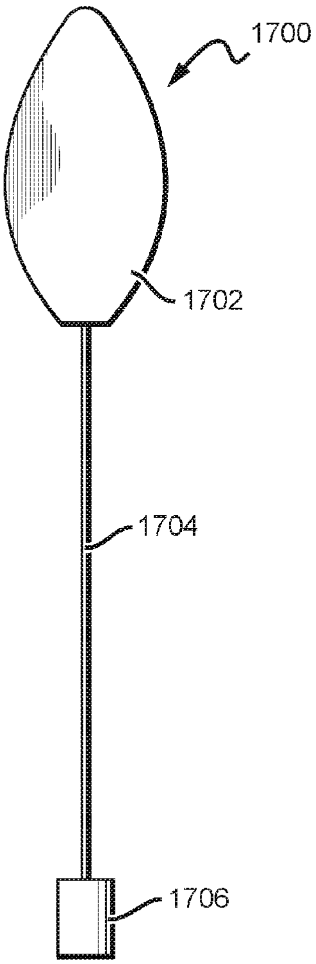
Figure 17C:
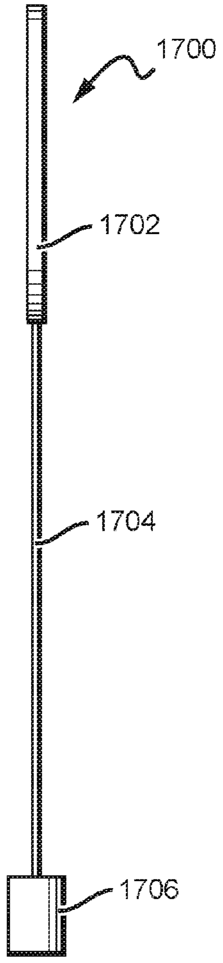

FIGS. 17A-17B show a flame simulating device 1700 having a flame-shaped piece 1702, a support member 1704, and an agitator 1706. The flame-shaped piece is coupled to one end of the support member 1704, and the other end of the support member 1704 is coupled to the agitator 1706. When the agitator 1706 is activated, it can cause vibration, movement, and/or rotation of the flame-shaped piece.

Figure 18A:
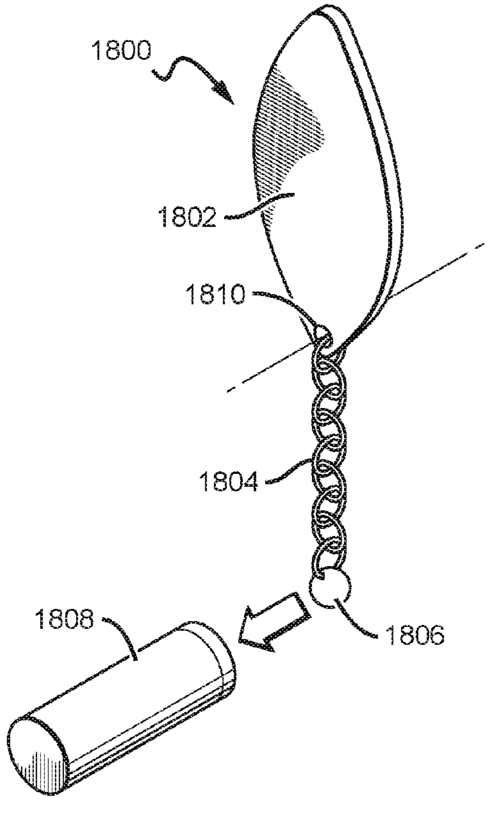

FIGS. 18A and 18B show a flame simulating device 1800 and an accompanying activation mechanism 1808. The flame simulating device 1800 has a top, flame-shaped piece 1802, a chain 1804 and a weight 1806. The flame-shaped piece 1802 is coupled to the one end of the chain 1804 and the other end of the chain 1804 is coupled to the weight 1806. The flame-shaped piece 1802 is suspended from a support hole 1810 such that the weight of the chain 1804 and the weight 1806 keep the flame-shaped piece 1802 upright. The activation mechanism generates translational movement (e.g., extending and retracting a piston) such that the activation mechanism interacts with the weight 1806. FIG. 18B shows a piston 1812 extending from the activation mechanism 1808 and interacting with the weight 1806.

Figure 19C:
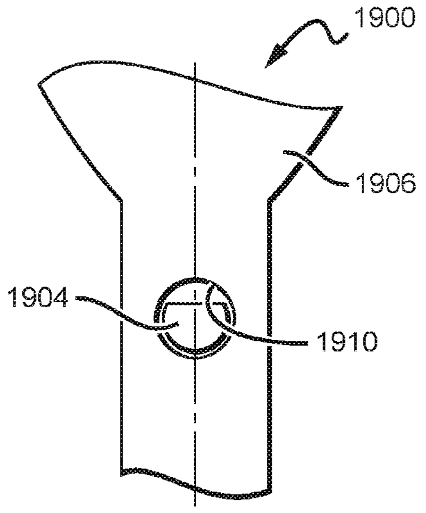
Figure 19D:
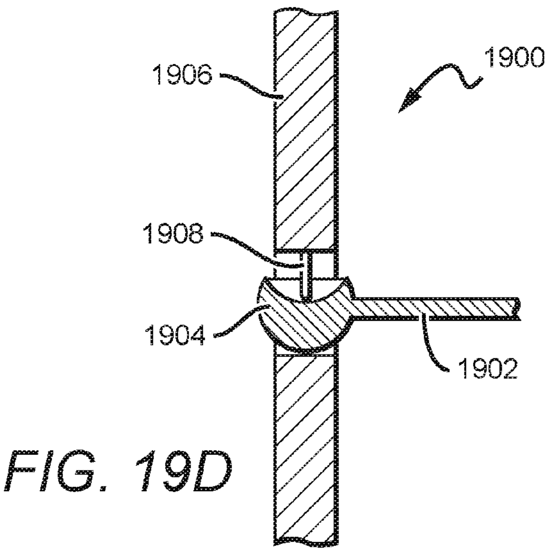

FIGS. 19A-19D show a flame simulating device 1900 that is supported by a support member 1902 having a cup portion 1904 on an end. The flame-shaped piece 1906 of the flame simulating device 1900 has a support hole 1910 and an upper support member 1908 (e.g., a wire that is molded in to the flame-shaped piece 1906). The upper support member 1908 runs approximately along a vertical axis of the flame-shaped piece 1906 such that an end of the upper support member 1908 extrudes from the top of the support hole 1910. The cup portion 1904 of the support member 1902 is configured to receive the portion of the upper support member 1908 that protrudes from the top of the support hole 1910 as seen in FIG. 19D.

Figure 20A:
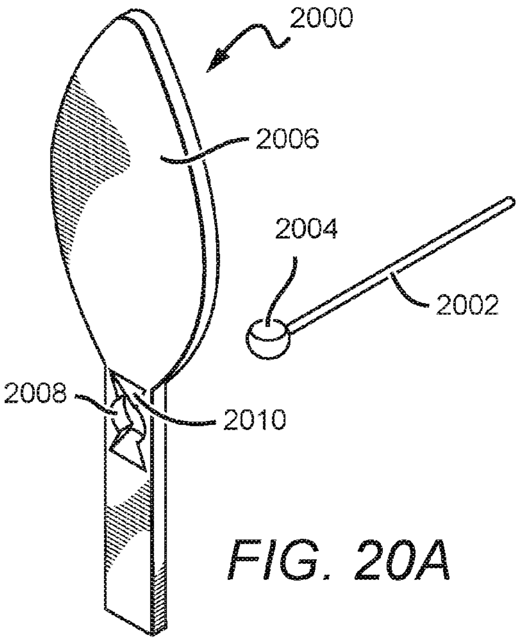
Figure 20B:
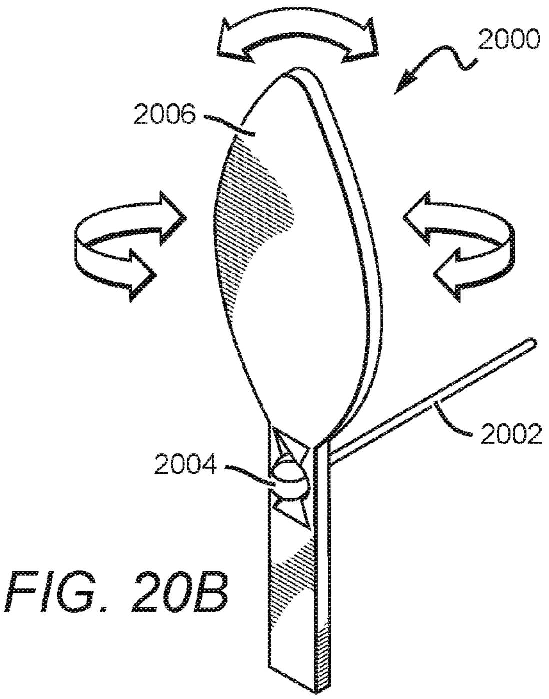

FIGS. 20A-20F show a flame simulating device 2000 having a support member 2002 with a cup portion 2004 on one end. The flame simulating device 2000 additionally has a flame-shaped piece 2006 with a support hole 2008. The support hole 2008 has a protrusion 2010 (e.g., the protrusion 2010 is molded from the same material as the flame-shaped piece 2006) that projects downward from the top of the support hole 2008. When the cup portion 2004 of the support rod 2002 is positioned within the support hole 2008, the protrusion 2010 rests within the cup 2004. This provides a pivoting support for the flame-shaped piece 2006 of the flame simulating device 2000, which allows the flame-shaped piece 2006 so swing and/or rotate with little frictional resistance. FIG. 20D shows a zoomed, cut-away view of the cup portion 2004 of the support member 2002 coupled with the protrusion 2010 of the support hole 2008 in the flame-shaped piece 2006 as described above.

FIGS. 21A-21D show a flame simulating device 2100 having a flame-shaped piece 2102 that is suspended by a series of magnets 2014*a-d*. The flame-shaped piece 2012 has a central magnet 2106 in its middle portion (i.e., at the base of the flame-shaped area). The series of magnets 2104*a-d* are arranged in a circular pattern such that the polarities of the magnets 204*a-d* orient their magnetic fields to provide support for the central magnet 2106. The magnets 2104*a-d* should all produce approximately the same magnetic fields and be held in position by a band 2108, such that the flame-shaped piece 2102, when at rest, is approximately equidistant from each of the magnets 2104*a-d.*

FIGS. 22A-22D show a flame simulating device 2200 that is suspended by a rod 2202. The rod 2202 has a rounded end 2204 that is shaped substantially as a sphere. The rounded end 2204 is coupled to the rod 2202 by a linking portion 2206. The linking portion 2206 has a smaller diameter than either the rod 2202 or the rounded end 2204. The flame-shaped piece 2210 is coupled to the rod 2202 by inserting the rounded end 2204 into a support hole 2208 positioned above the center of mass of the flame-shaped piece 2210. The rounded portion 2204 is sized and dimensioned such that is snaps in to the support hole 2208. Once snapped in, the flame-shaped piece 2210 rests against the linking portion 2206 such that the flame-shaped piece 2210 can rotate and/or swing relative to the rod 2202. The linking portion 2206 could have a valley or trough for the flame-shaped piece 2210 to rest in. By supporting the flame-shaped piece 2210 from one side only, the rod 2202 can be positioned so that it does not block light from a light source disposed to emit light on to a face of the flame element (e.g., a surface facing away from the rod 2202).

FIGS. 23A-23D show a flame simulating device 2300 that is supported by a rod 2302 and pin 2304. The flame-shaped piece 2306 has a support hole 2308 located above its center of mass, where the support hole 2308 is sized and dimensioned for the pin 2304 to pass through it. On one end of the rod 2302 is a hollow portion 2310, as seen in FIG. 23B, which is sized and dimensioned to receive the pin 2304. The pin 2304 is passed through the support hole 2308 such that when the hollow portion 2310 of the rod 2302 receives the pin 2304, the pin 2304 provides support for the flame-shaped piece 2306 so that the flame-shaped piece 2306 can swing and/or rotate freely. The support hole 2308 is additionally beveled, as seen in FIG. 23D, such that the flame-shaped piece 2306 is better able to freely rotate and/or swing.

Figure 24A:
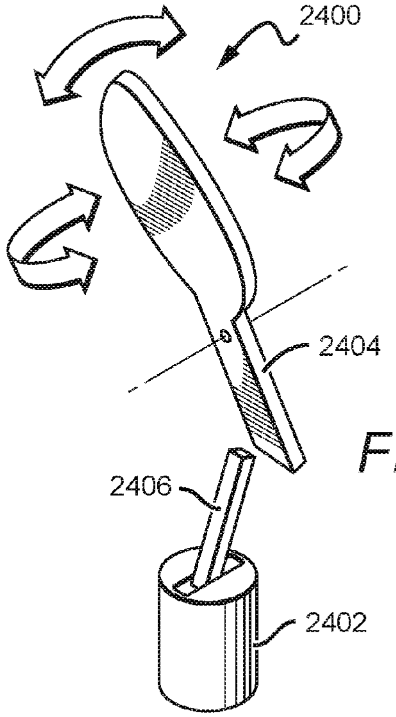
FIGS. 24A-24D show a flame simulating device having a flame-shaped piece that is caused to swing and/or rotate by the lever arm of an agitator.
Figure 24B:
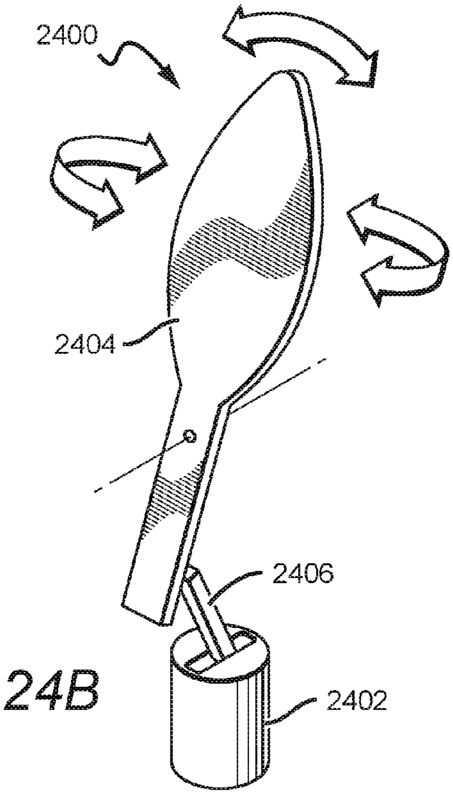
Figure 24C:
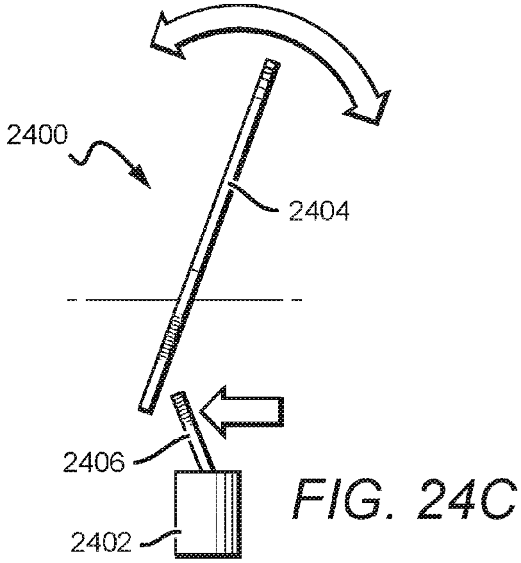
Figure 24D:
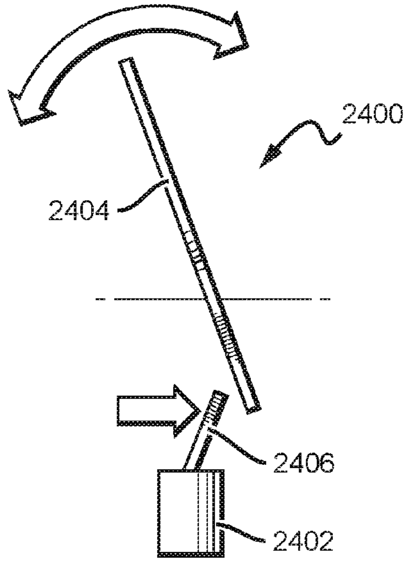

FIGS. 24A-24D show a flame simulating device 2400 having a switching agitator 2402 and a flame-shaped piece 2404. The switching agitator 2402 has a rod 2406 that is configured to alternate from a first position (FIG. 24A) to a second position (FIG. 24B). Alternatively, the switching agitator 2402 can move the rod 2406 to intermediate positions, as needed to cause desirable movement of the flame-shaped piece 2404. The flame-shaped piece 2404 is suspended from a support hole 2408 such that, at rest, it is upright (as seen in the figures). The switching agitator 2402 is positioned below the flame-shaped piece 2404 such that the rod 2406 of the switching agitator 2402 interacts with the bottom portion of the flame shaped piece as the rod 2406 changes from the first position (FIG. 24A) to the second position (FIG. 24B). FIGS. 24C and 24D show side views of FIGS. 24A and 24B, respectively.

Figure 25A:
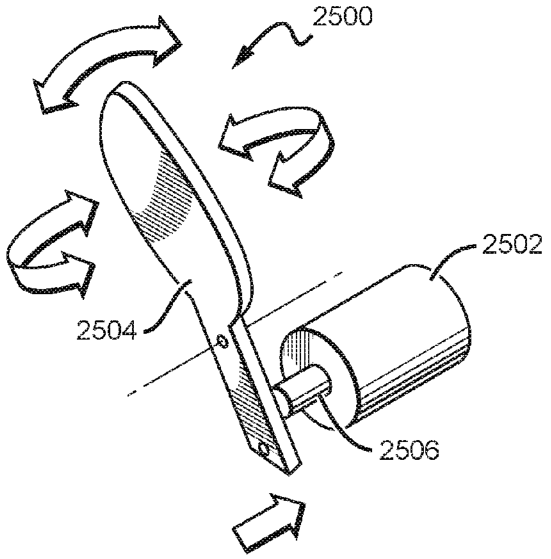
FIGS. 25A-25D show a flame simulating device having a flame-shaped piece that is caused to swing and/or rotate by the piston arm of an agitator.
Figure 25B:
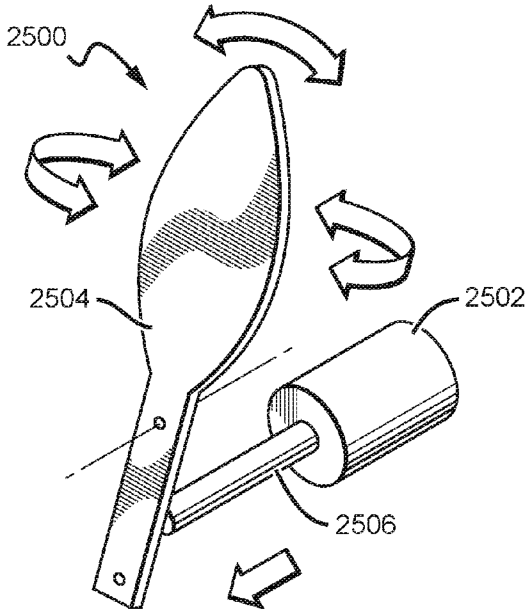
Figure 25C:
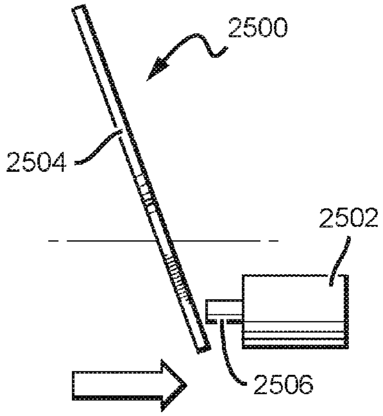
Figure 25D:
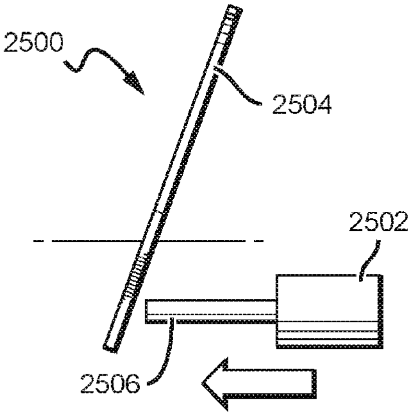

FIGS. 25A-25D show a flame simulating device 2500 having a mechanical agitator 2502 and a flame-shaped piece 2504. The flame-shaped piece 2504 is suspended by a support hole 2506 located above its center of mass, such that the flame-shaped piece 2504 is upright at rest. The mechanical agitator 2502 has a piston 2506 that can alternate between a first position (FIG. 25A) and a second position (FIG. 25B). Some example agitators include DC motors configured to produce translational movement and solenoids. When the piston 2506 moves from the first position (FIG. 25A) to second position (FIG. 25B), and back, it interacts with the bottom portion of the flame-shaped piece 2504 to cause rotational and/or swinging movement. FIGS. 25C and 25D show side views of FIGS. 25A and 25B, respectively.

Figure 26A:
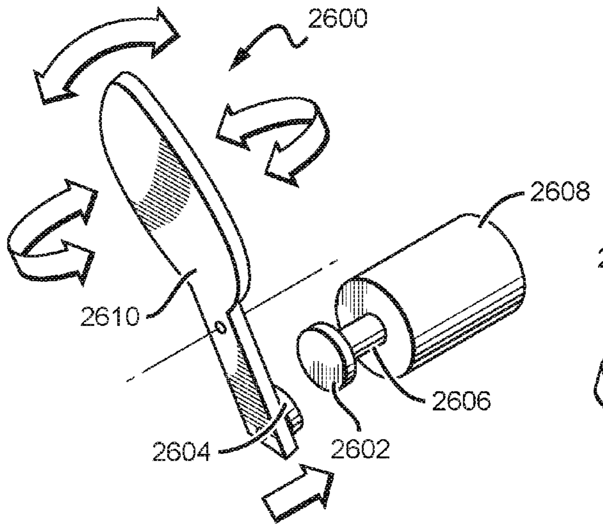
FIGS. 26A-26D show a flame simulating device having a flame-shaped piece with a magnet attached to its lower portion, where the flame-shaped piece is caused to move by the movement of a piston also having a magnet attached to it.
Figure 26B:
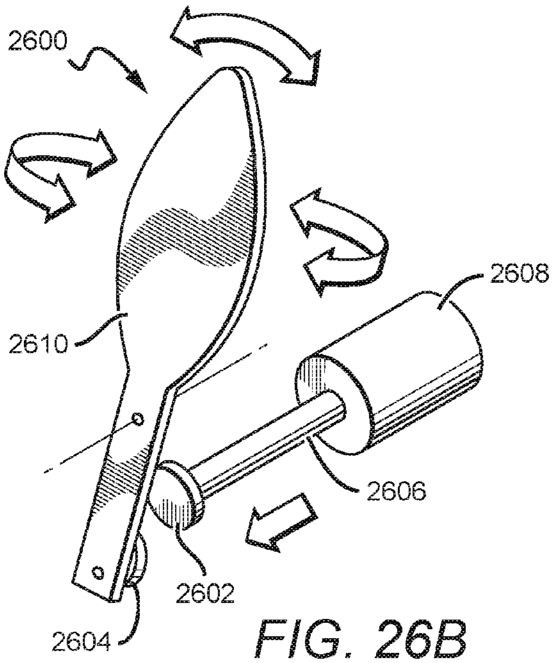
Figure 26C:
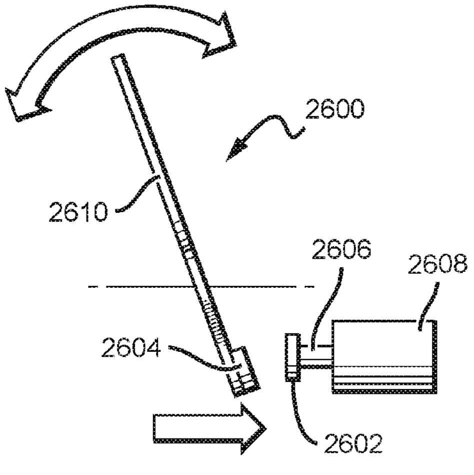
Figure 26D:
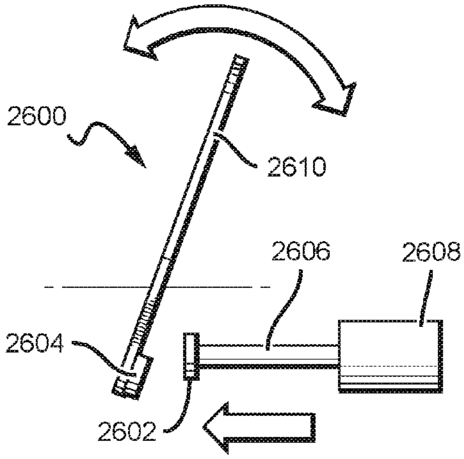

FIGS. 26A-26D shows a flame simulating device 2600 that is substantially similar to the flame simulating device of FIGS. 25A-25D, except that the flame simulating device 2600 in FIGS. 26A-26D has two magnets 2602 and 2604. Magnet 2602 is coupled to the piston 2606 of the mechanical agitator 2608, and magnet 2604 is coupled to the lower portion of the flame-shaped piece 2610. The magnets 2604 and 2602 are oriented to have opposing magnetic fields, such that as the magnet 2602 coupled to the piston 2606 pushes the magnet 2604 coupled to the lower portion of the flame-shaped piece 2610 as the piston 2606 extends from the mechanical agitator 2608. FIGS. 26C and 26D show side views of FIGS. 26A and 26B, respectively.

Figure 27A:
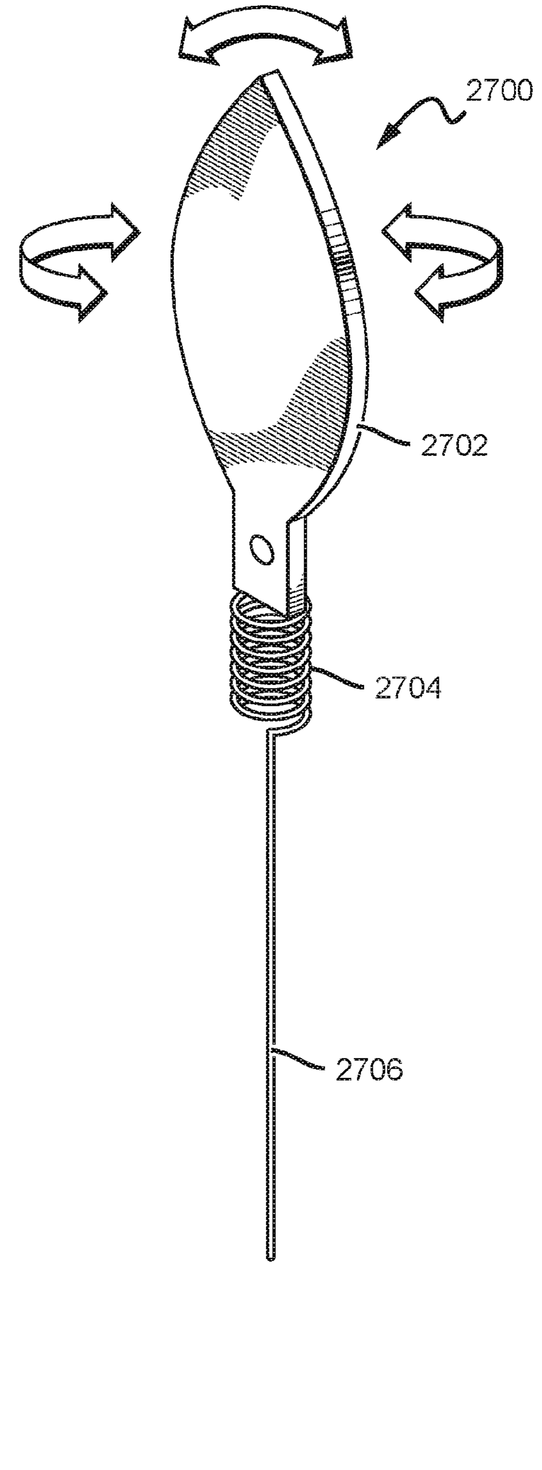
FIGS. 27A-27C show a flame simulating device having a flame-shaped piece that is coupled to a spring which is in turn coupled to a support rod.
Figure 27B:
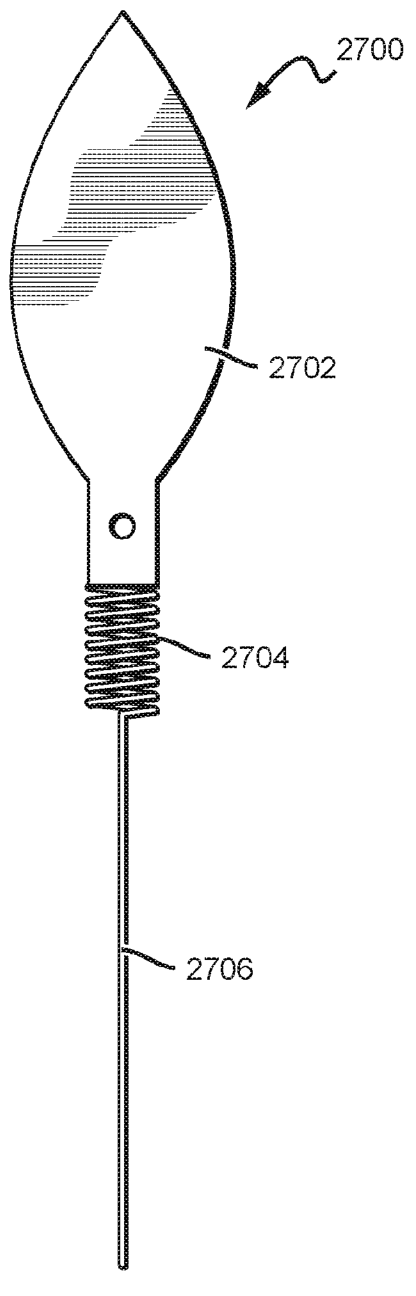
Figure 27C:
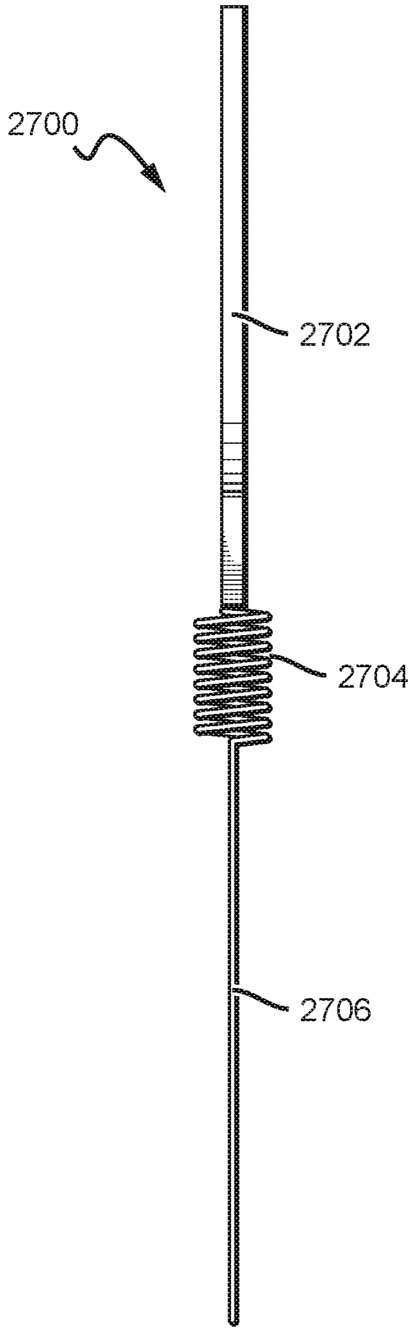

FIGS. 27A-27C show a flame simulating device 2700 that includes a flame-shaped piece 2702, a spring 2704, and support member 2706. The flame-shaped piece 2702 couples to the spring 2704, which in turn couples to the support member 2706. This allows the flame-shaped piece 2702 to sway and/or rotate freely either from energy passing through the support member 2706 and the spring 2704 (e.g., from a vibrating component or other agitator coupled to the support member 2706), or from energy transferred to the flame-shaped piece 2702 by other external means (e.g., a fan blowing air into the flame-shaped piece 2702). FIGS. 27B and 27C are from and side views of the flame simulating device 2700 shown in FIG. 27A.

Figure 28A:
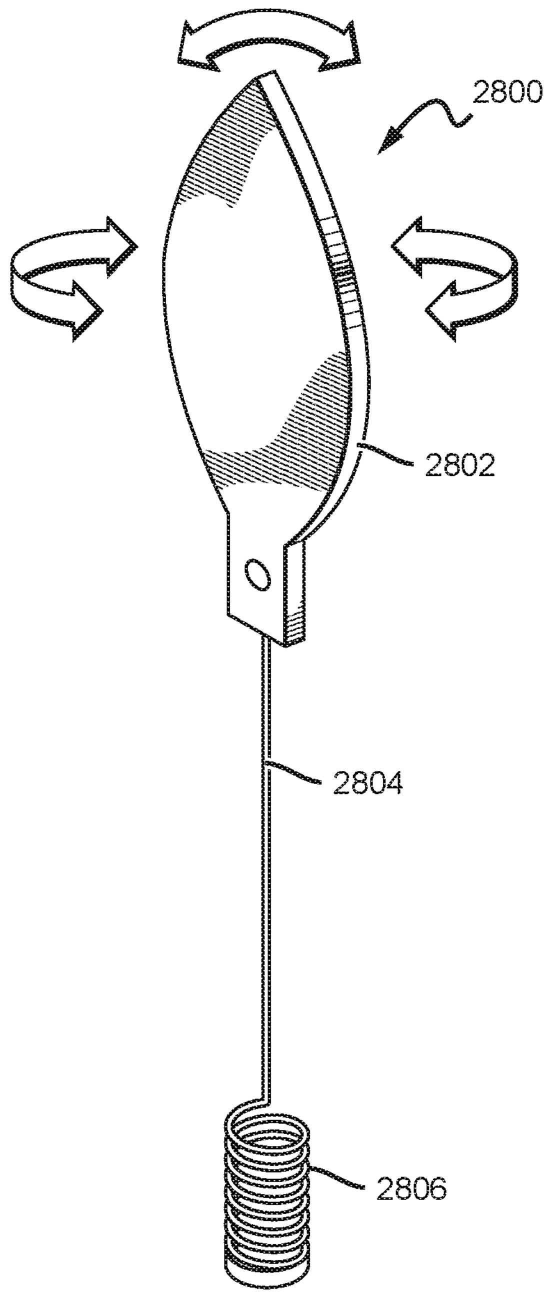
FIGS. 28A-28C show a flame simulating device having a flame-shaped piece that is coupled to a support rod which is in turn coupled to a spring.
Figure 28B:
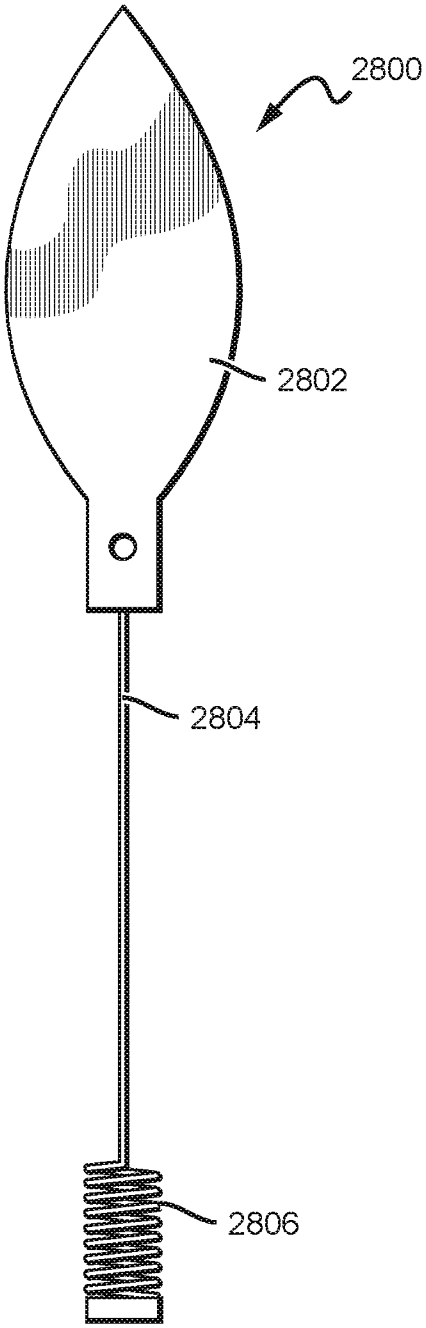
Figure 28C:
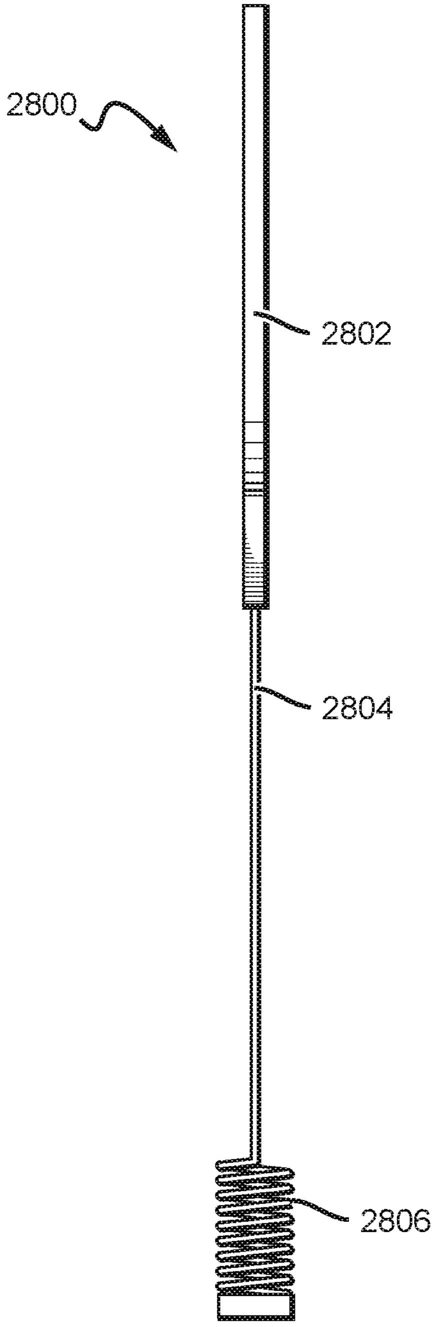

FIGS. 28A-28C show a flame simulating device 2800 that is substantially similar to the flame simulating device of FIGS. 27A-27C, except that the spring 2806 is in a different position. In FIGS. 28A-28C, the spring 2806 is coupled to one end of the support member 2804 and the other end of the support member 2804 is coupled to the flame-shaped piece 2802. This allows the flame-shaped piece 2802 to sway and/or rotate, albeit with a longer moment arm than the flame-shaped piece of FIGS. 27A-27C.

FIGS. 29A-29D show a flame simulating device 2900 that is suspended by a ball and socket joint. The ball 2908 fits into the socket 2906 to allow the flame-shaped piece 2902 to rotate and/or sway freely. The ball and socket joint is positioned on the flame-shaped piece 2902 above its center of mass. The ball 2908 is coupled to the end of a rod 2904, which can be further coupled to framework (e.g., a candle body or another component of an electronic candle). The ball 2908 snaps into the socket 2906 so that the flame-shaped piece 2902 cannot easily fall off of the ball 2908, and the socket is configured to prevent over-articulation of the flame-shaped piece 2902 (e.g., beyond 45 degrees of rotation off its upright, vertical axis).

FIGS. 30A-30D show a flame simulating device 3000 that is agitated by electromagnetism. The configuration of the flame simulating device 3000 is similar to that of the flame simulating device in FIGS. 29A-29D, except the flame simulating device 3000 the ball 3008 acts as a mini Tesla coil. The interior of the socket 3004 can be injection molded with ferrous flakes, or it alternatively can be vacuum metalized or painted with ferrous or electrically conductive material. When charge is passed into the ball 3008, the ball 3008 is magnetized and it interacts with the materials coated on the interior portion of the socket 3004, causing the flame-shaped piece 3002 to move and/or sway.

Figure 31A:
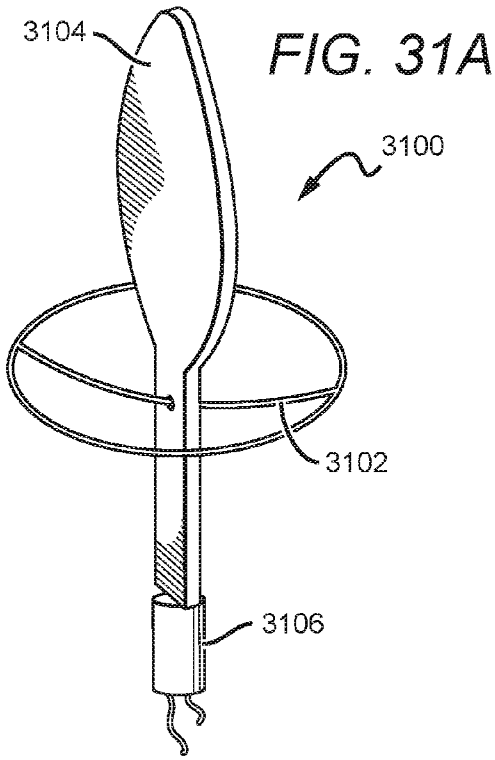
FIGS. 31A-31B show a flame simulating device having a flame-shaped piece that is suspended by a flexible support member, where the flame-shaped piece additionally has an agitator coupled to its bottom portion.
Figure 31B:
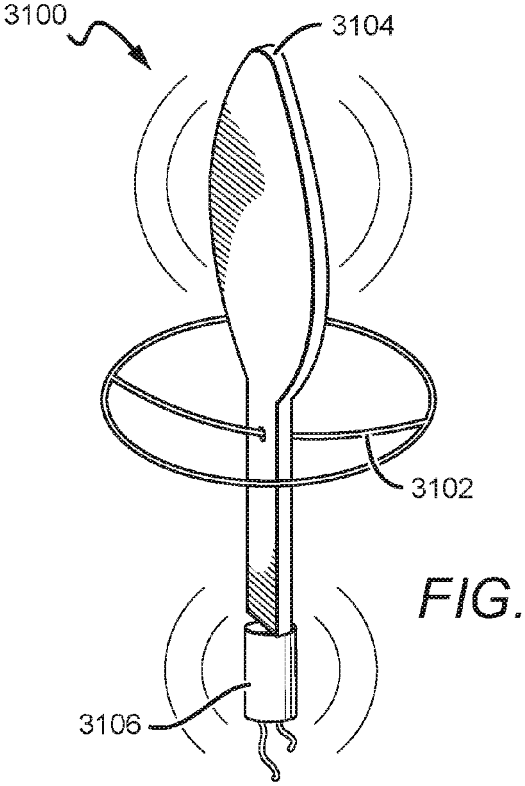
Figure 32A:
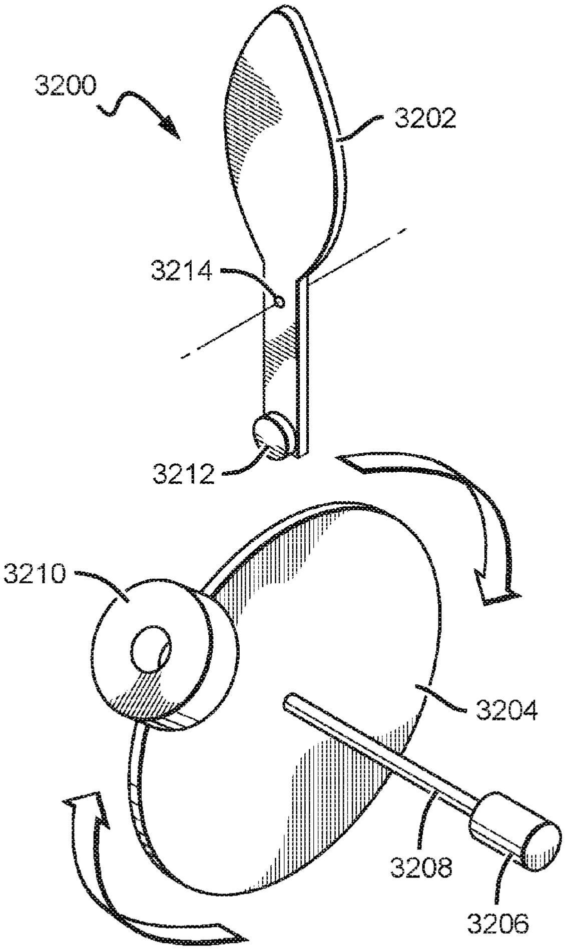
Figure 32D:
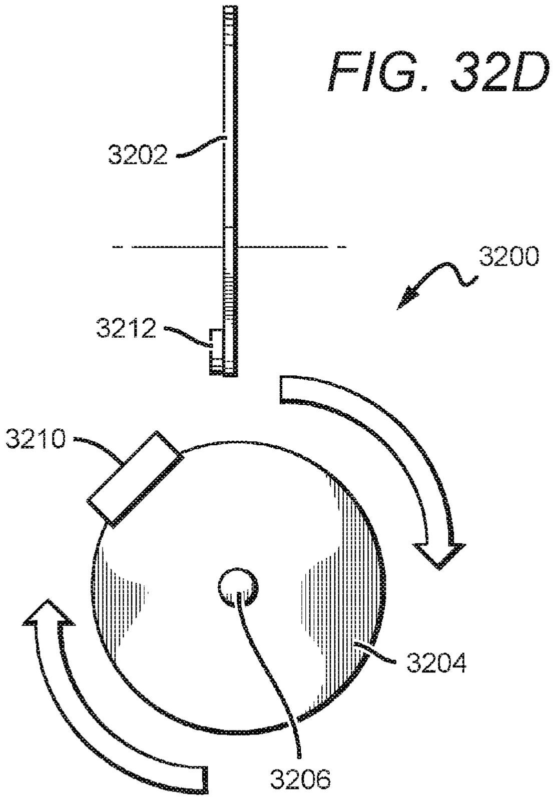
Figure 33A:
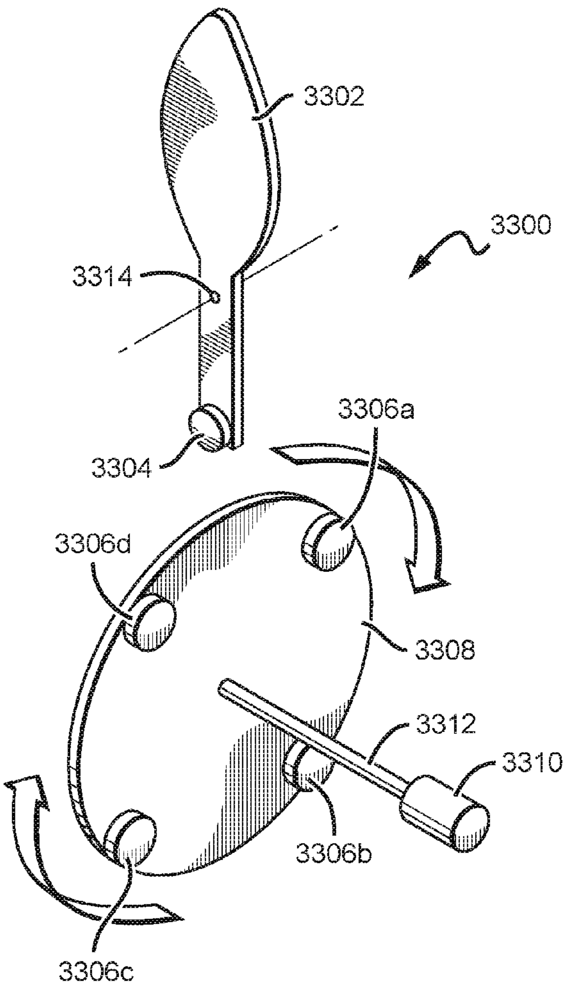
FIGS. 33A-33D show a flame simulating device similar to the device of FIGS. 32A-32D, except the rotating disk has four magnets instead of one coil.
Figure 33B:
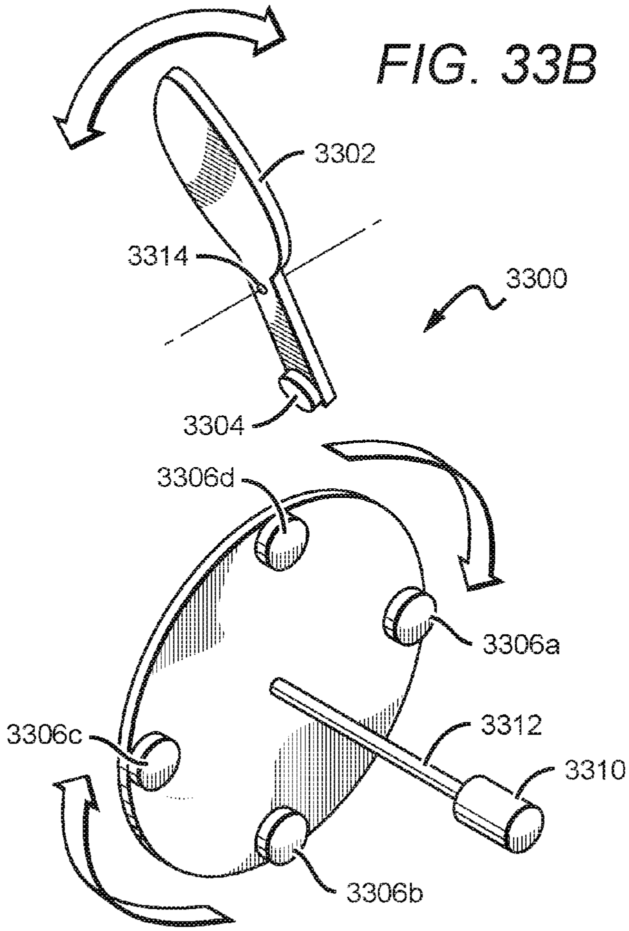
Figure 33C:
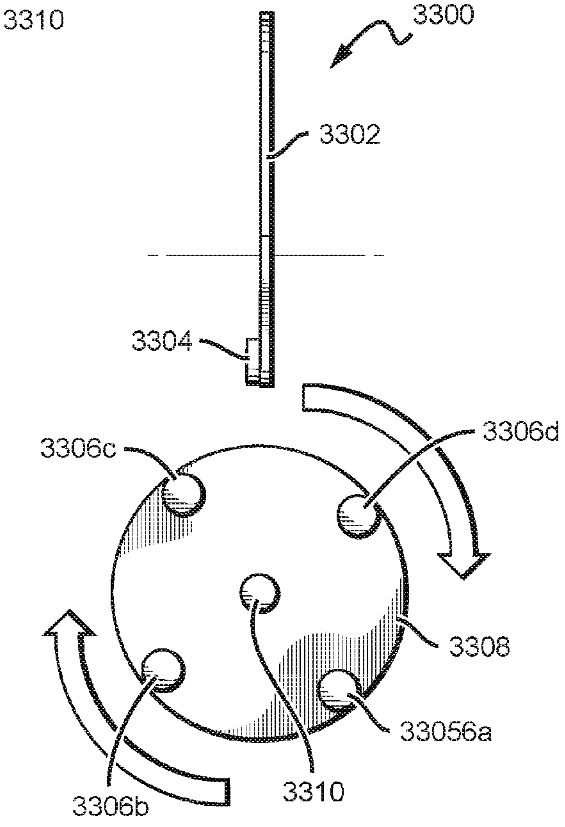
Figure 33D:
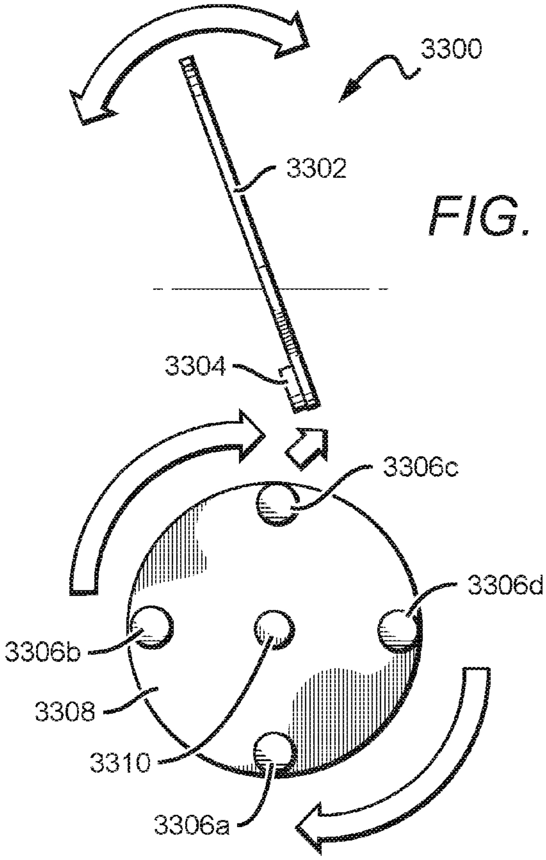
Figure 34A:
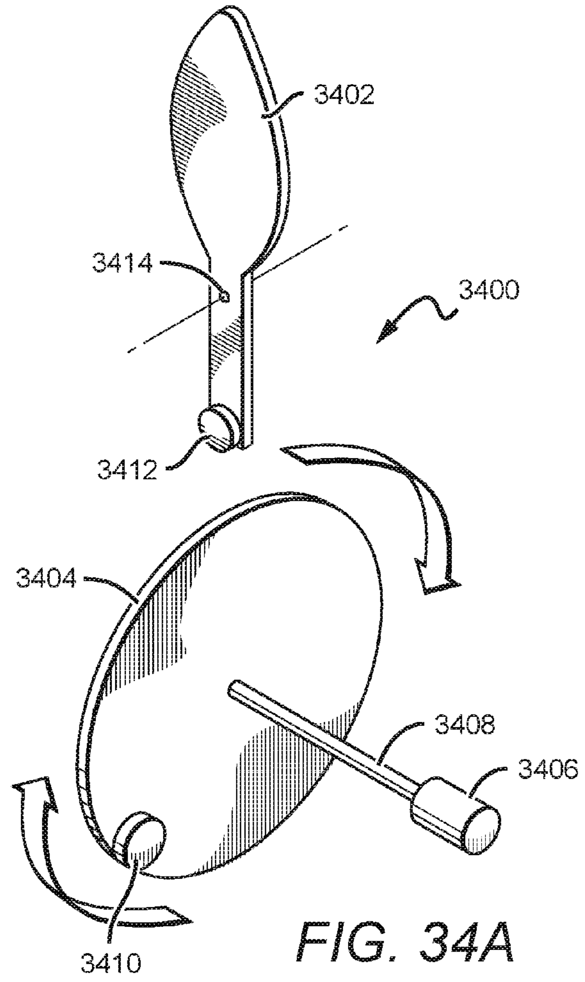
FIGS. 34A-34D show a flame simulating device similar to the device of FIGS. 32A-32D, except the rotating disk has one magnet instead of one coil.
Figure 34B:
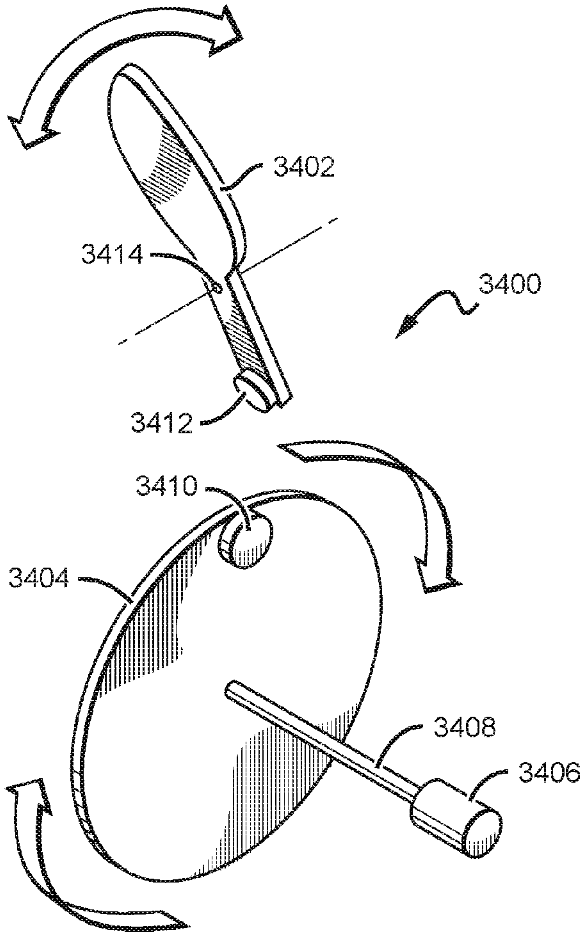
Figure 34C:
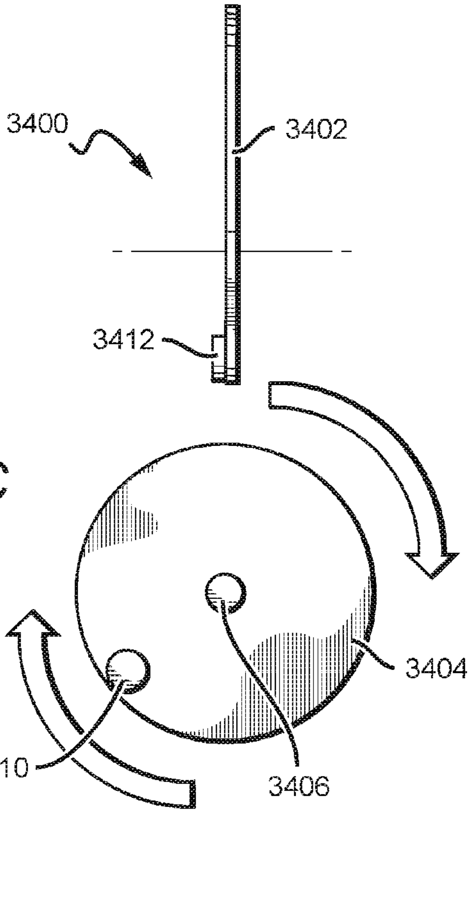
Figure 34D:
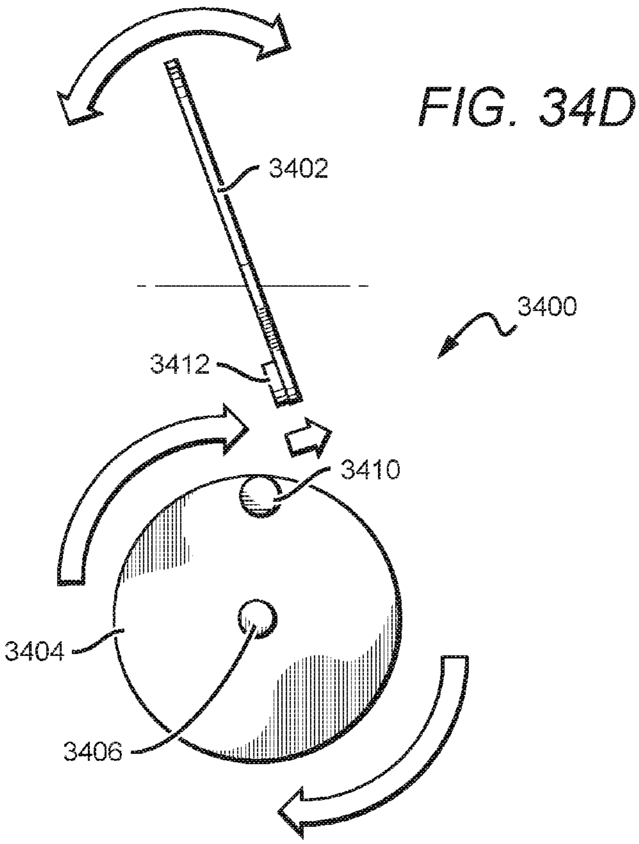
Figure 35A:
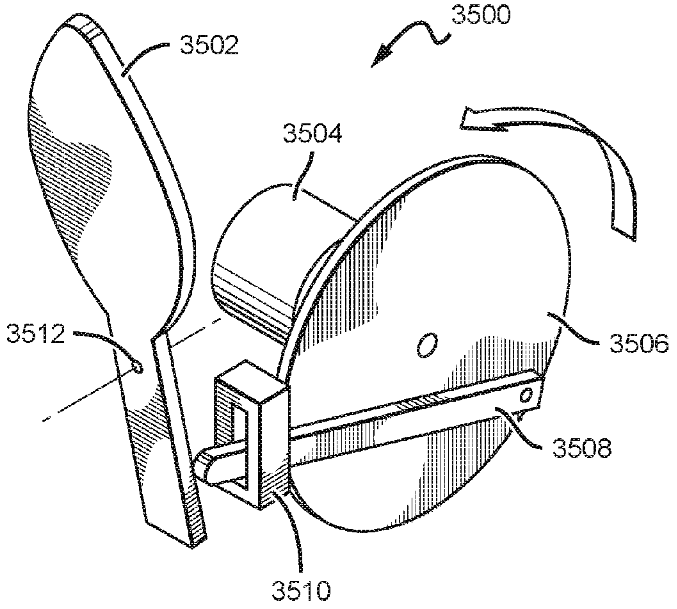
Figure 37A:
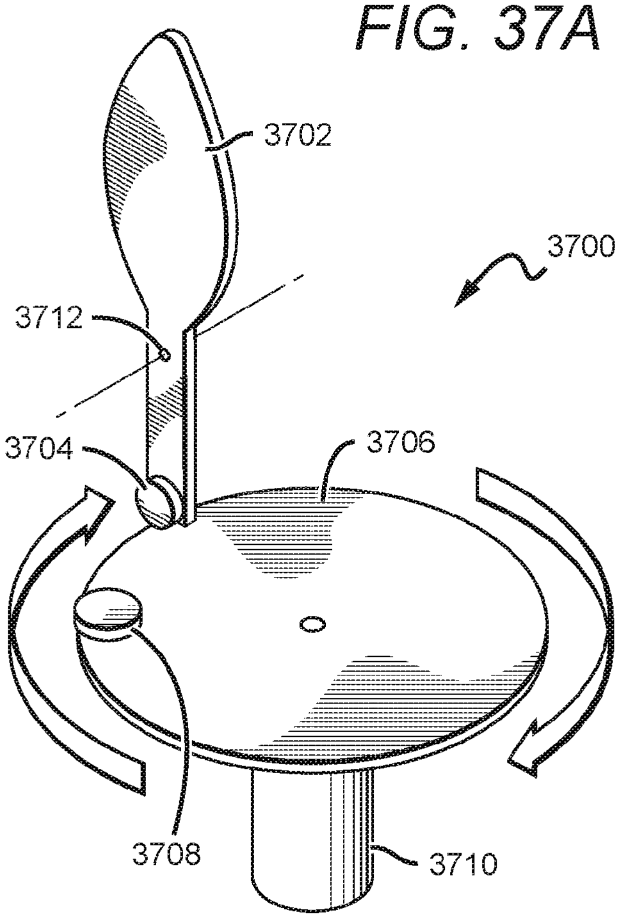
Figure 37B:
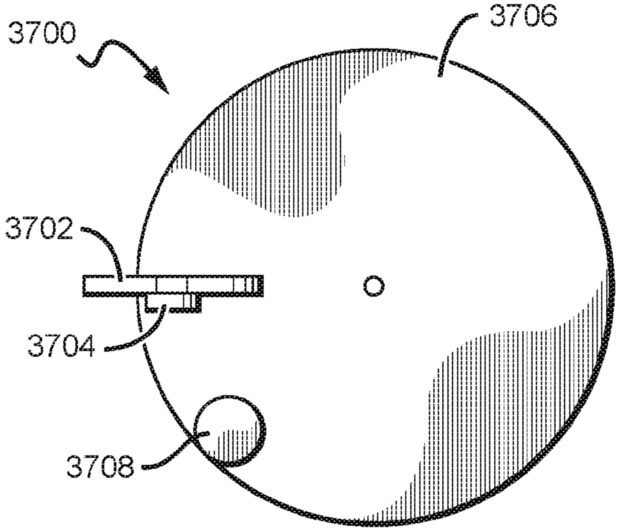
Figure 37C:
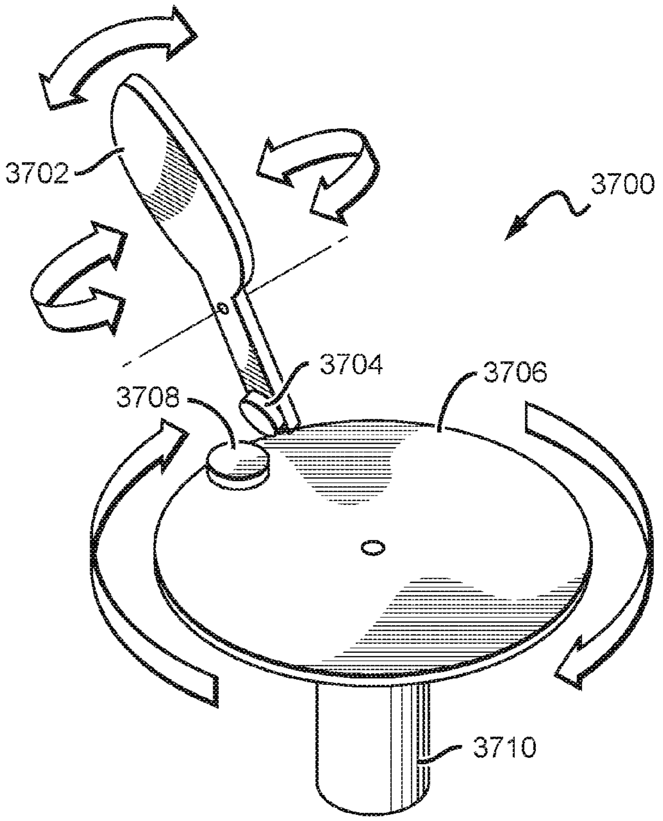
Figure 37D:
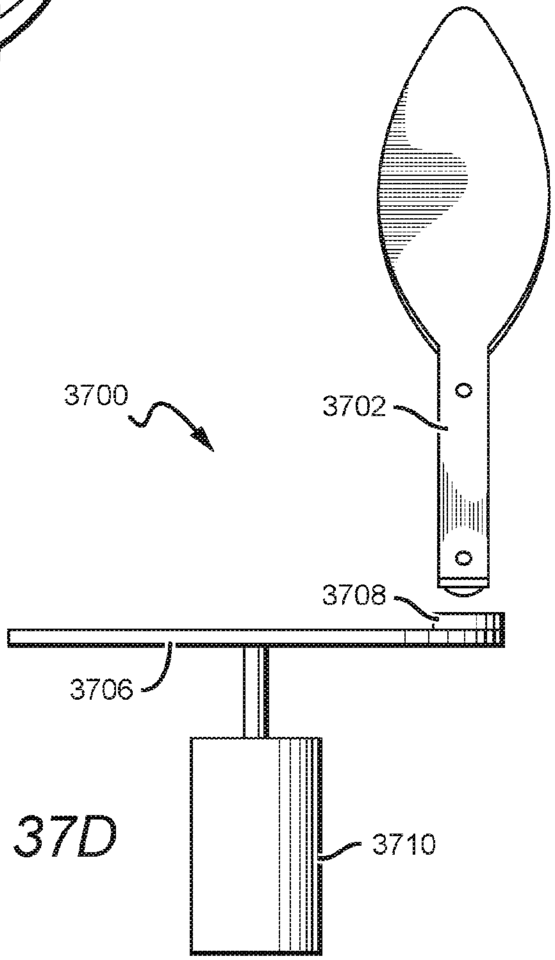
Figure 37G:
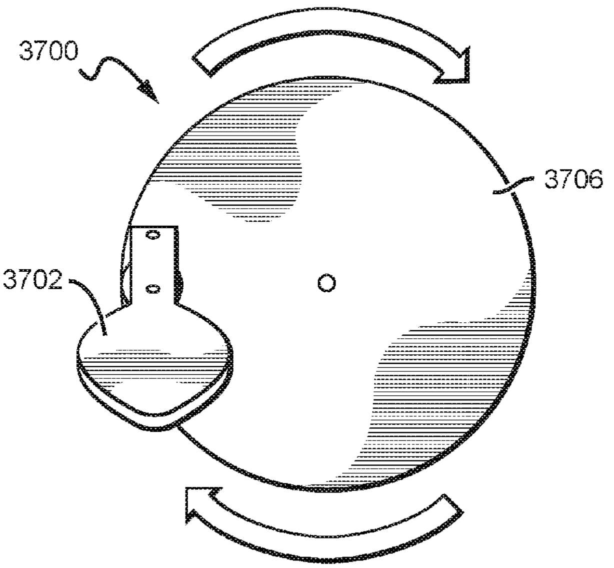
Figure 37H:
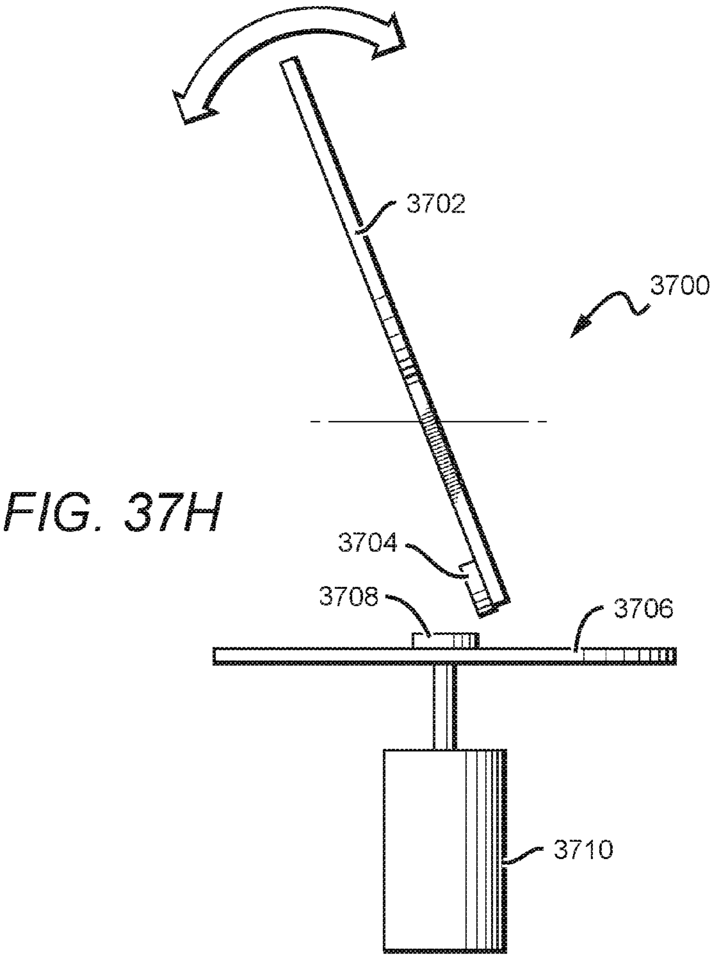
Figure 38A:
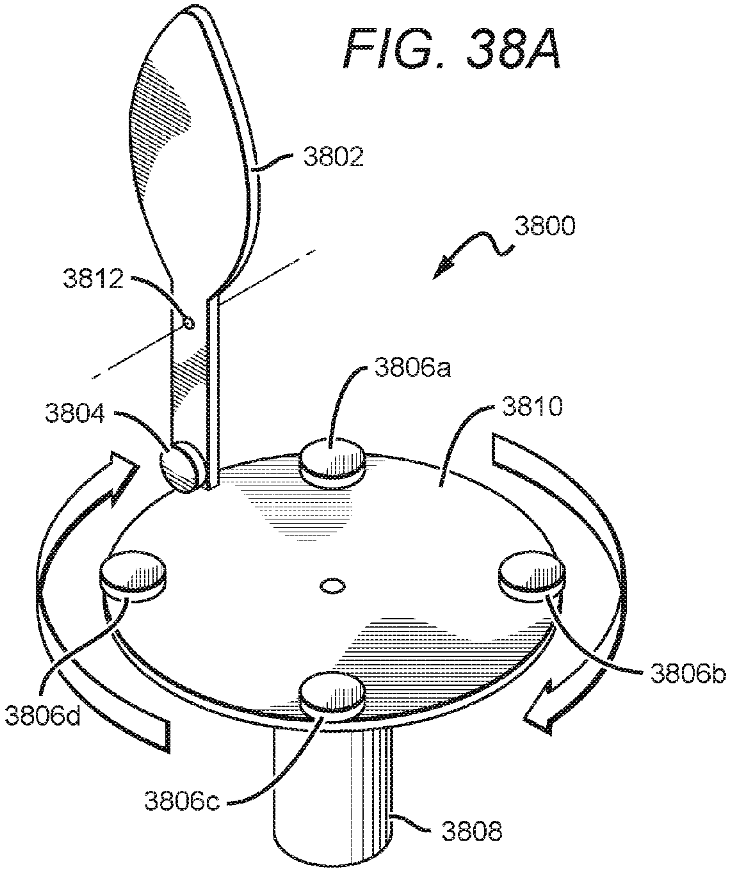
Figure 38B:
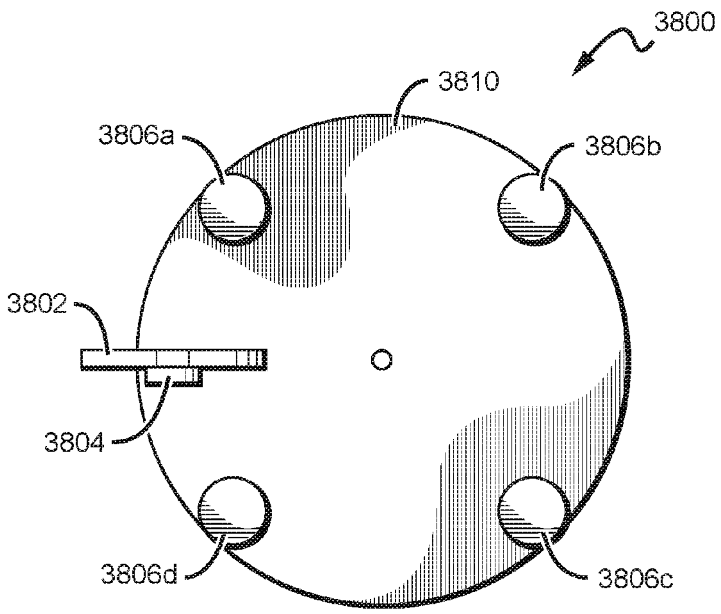
Figure 38E:
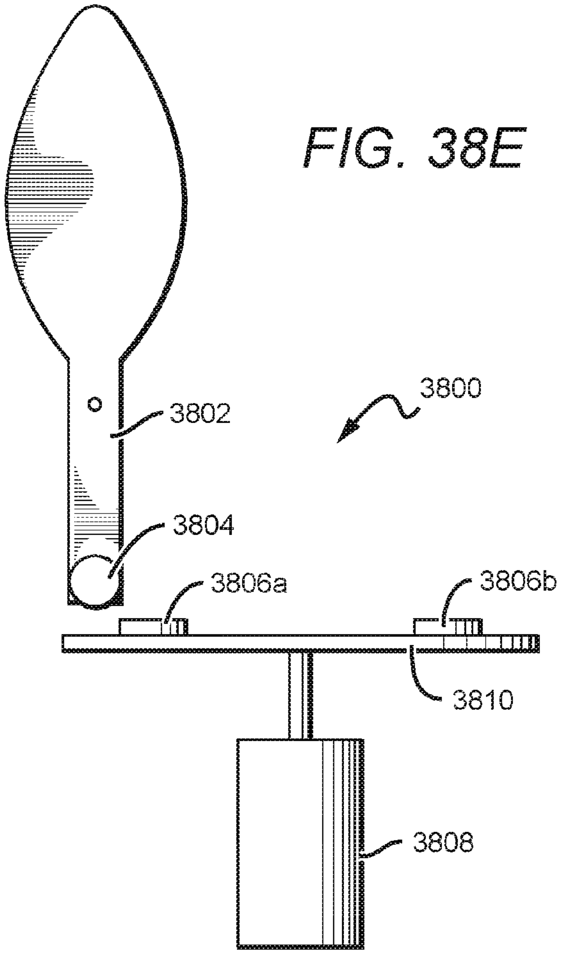
Figure 38F:
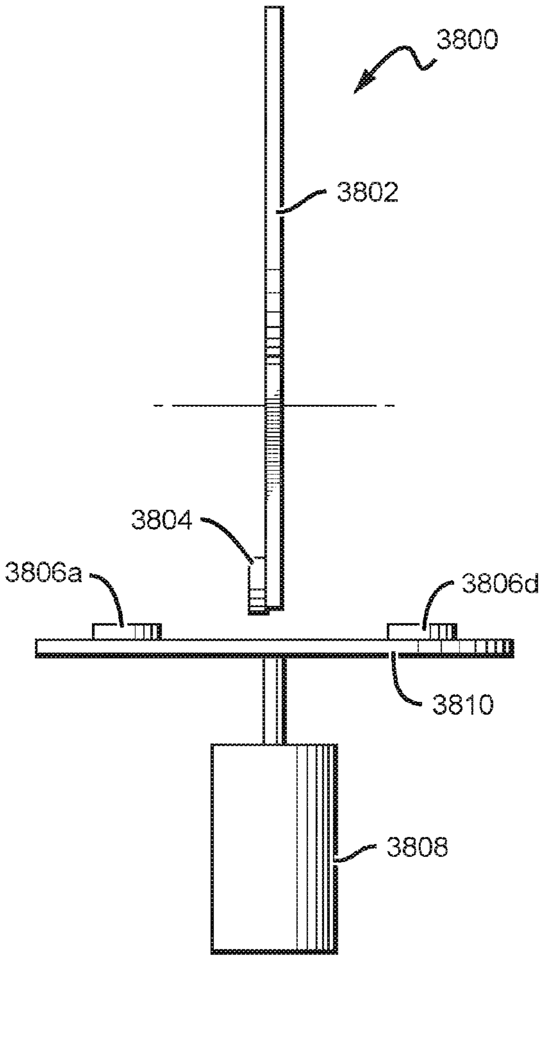
Figure 38G:
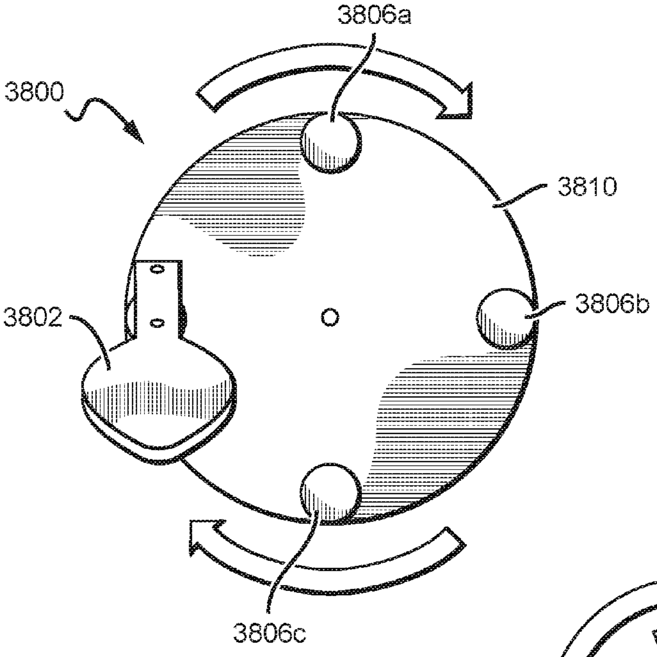
Figure 38H:
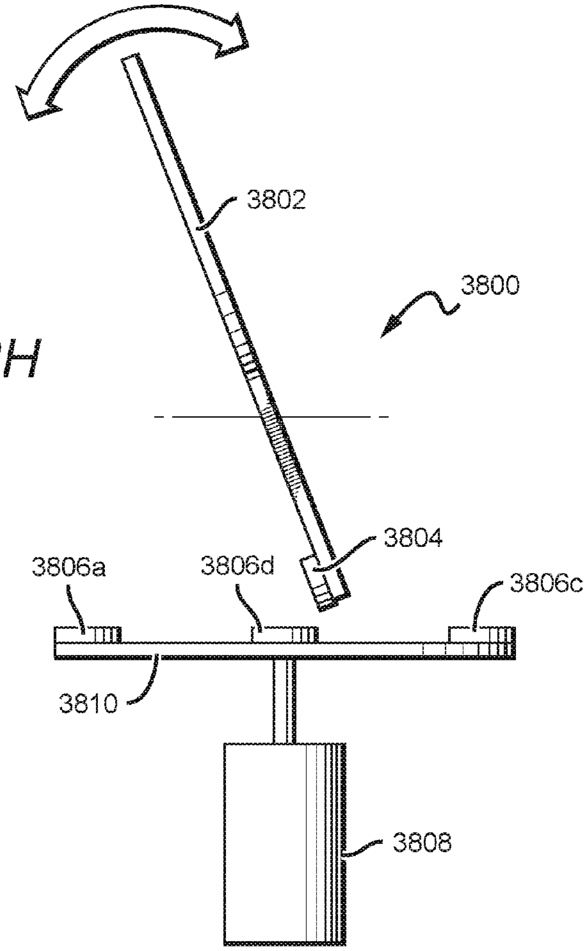

FIGS. 31A-31B show a flame simulating device 3100 substantially similar to the device shown in FIGS. 7A and 7B. The flame simulating device 3100 includes only a single support member 3102 (e.g., fishing line, or another suitable string material). The support member 3102 holds the flame-shaped piece 3104 and an agitator 3106, which is coupled to the bottom of the flame-shaped piece 3104. The agitator 3106 acts as a ballast to keep the flame-shaped piece 3104 upright. When the agitator is activated, it causes the flame-shaped piece 3104 to move (e.g., vibrate, rotate, swing, and/or sway).

FIGS. 32A-32D show a flame simulating device 3200 having a flame shaped piece 3202 with a magnet 3212 attached to the bottom. Below the flame-shaped piece 3202 is a vertically oriented rotating disk 3204, which has an electromagnetic coil 3210 attached to it on or near an outside edge. The rotating disk 3204 is coupled to a motor 3206 via a shaft 3208, such that when the motor 3206 is activated, it causes the rotating disk 3204 to turn. As the disk 3204 turns, it brings the electromagnetic coil 3210 into close proximity with the magnet 3212 on the lower portion of the flame-shaped piece 3202. The electromagnetic coil 3210 and the magnet 3212 interact with each other when current is passed through the coil 3210, causing the flame-shaped piece 3202 to rotate and/or swing about its support point 3214 (shown in FIGS. 32A and 32B).

FIGS. 33A-33D show a flame simulating device 3300 having a flame-shaped piece 3302 with a magnet 3304 attached to the bottom. Below the flame-shaped piece 3302 is a vertically oriented rotating disk 3308, which has magnets 3306*a-d* attached to it near the outside edge of the disk 3308. The rotating disk 3308 is coupled to a motor 3310 via a shaft 3312, such that when the motor 3310 is activated, it causes the disk 3308 to turn. As the disk 3204 turns, it brings each of the magnets 3306*a-d* sequentially into close proximity with the magnet 3304 on the lower portion of the flame-shaped piece 3302. The magnets 3306*a-d* and 3304 interact with each other causing the flame-shaped piece 3302 to rotate and/or swing about a support point 3314 (shown in FIGS. 33A and 33B).

FIGS. 34A-34D show a flame simulating device 3400 having a flame shaped piece 3202 with a magnet 3412 attached to the bottom. Below the flame-shaped piece 3402 is a vertically oriented rotating disk 3404, which has a magnet 3410 attached to it on an outside edge. The rotating disk 3404 is coupled to a motor 3406 via a shaft 3408, such that when the motor 3406 is activated, it causes the rotating disk 3404 to turn. As the disk 3404 turns, it brings the magnet 3410 into close proximity with the magnet 3412 on the lower portion of the flame-shaped piece 3402. The magnets 3410 and 3412 interact with each other causing the flame-shaped piece 3402 to rotate and/or swing about its support point 3414 (shown in FIGS. 34A and 34B).

FIGS. 35A-35D show a flame simulating device 3500 that includes a flame-shaped piece 3502 which is caused to rotate and/or swing by a piston type mechanism. The piston type mechanism includes a motor 3504, a rotating disk 3506, an arm 3508, and a collar 3510. As the motor 3504 turns, it causes the disk 3506 to turn. The arm 3508, which is pinned on one end to the disk 3506, is caused to move relative to the collar 3510 such that the unpinned end interacts with the lower portion of the flame-shaped piece 3502. This interaction causes the flame-shaped piece to swing and/or rotate about its support point, 3512. (shown in FIGS. 35A and 35B).

FIGS. 36A-36E show a flame simulating device 3600 that includes a three dimensional flame-shaped piece 3602 that is suspended by an LED 3604 on the end of a rod 3606. The flame-shaped piece 3602 can be either at least partially translucent or transparent such that at least a portion of the rod 3606 is visible through the flame-shaped piece 3602, resulting in the appearance of a candle flame having a wick. Alternatively, light could be directed from below the flame-shaped piece 3602 from a light source within a body of the device. When the flame-shaped piece is translucent, it can additionally be dyed different colors or be made from materials having different colors to reproduce the appearance of a candle flame. It can have one or multiple colors, depending on the desired appearance. Additionally, the LED 3604 can have different colors and brightnesses. The LED 3604 can be coupled to a printed circuit board that provides a control scheme, where the control scheme can produce varying brightnesses or other effects to better simulate a real candle flame. Finally, the rod 3606 can be made from a glowing material to give off the appearance of a wick. The material can either glow by absorbing energy from light, or it can be a powered light source itself. In some embodiments, the rod 3606 can electrically couple the LED to a power source.

FIGS. 37A-37H show a flame simulating device 3700 that is caused to swing and/or rotate by a rotating disk 3706 having a magnet 3708 attached to it. The flame-shaped piece 3702 is suspended by a support point 3712 such that its lower portion is above the surface of the disk 3706. The disk 3706 is horizontally oriented having the magnet 3708 attached to an outer edge. As the motor 3710 causes the disk 3706 to rotate, the magnet 3708 is brought into proximity with the magnet 3704 attached to the lower portion of the flame-shaped piece 3702. The magnets 3704 and 3708 interact with each other, causing the flame-shaped piece to swing and/or rotate about its support point 3712. The motor 3710 can be causes to rotate at varying speeds or in different directions based on the desired movement of the flame-shaped piece 3702. The interaction of the magnets 3704 and 3708 that cause the flame-shaped piece 3702 to swing and/or rotate is illustrated in FIGS. 37C-37H, which shows sequentially how the components interact together.

FIGS. 38A-38H shows a flame simulating device 3800 that is substantially similar to the flame simulating device of FIGS. 37A-37H, except that instead of a single magnet on the outside edge of a disk, the flame simulating device 3800 includes four magnets 3806*a-d* on the outside edge of the disk 3810. The magnets 3806*a-d* interact with the magnet 3804 on the bottom portion of the flame-shaped piece 3802, which causes the flame-shaped piece 3802 to swing and/or rotate about its support point 3812. As with the flame simulating device of FIGS. 37A-37H, the motor 3808 can be causes to rotate at varying speeds or in different directions based on the desired movement of the flame-shaped piece 3802. The interaction of the magnets 3804 and 3806*a-d* that cause the flame-shaped piece 3702 to swing and/or rotate is illustrated in FIGS. 38C-38H, which shows sequentially how the components interact together.

FIGS. 39A-39D show a flame simulating device 3900 that has a three dimensional flame-shaped piece 3902 that is positioned between three light sources 3904*a-c*, where the flame-shaped piece is formed to have circular cross-sections. The three light sources 3904*a-c* can be LEDs or any other suitable light source, and the light sources 3904*a-c* are coupled to a band 3906, which angles and direct light from the light sources 3904*a-c* such that they project light onto the flame-shaped piece 3902. The flame-shaped piece 3902 can be opaque at the top, transitioning to a clear material toward the bottom. The opacity and transparency of the material can be selected to produce a desired flame effect. The flame-shaped piece 3902 is coupled to, and supported by, a rod 3908 which allows the flame-shaped piece 3902 to swing and/or rotate based on the flexibility of the rod 3908 (i.e., based on the size, shape, and Young's modulus of the material). Regardless of the material selected, the rod must be able to easily flex despite the flame-shaped piece's 3902 light weight. The light sources 3904*a-c* can have different colors, such as red, orange, yellow, blue, and all combinations thereof.

Figure 40C:
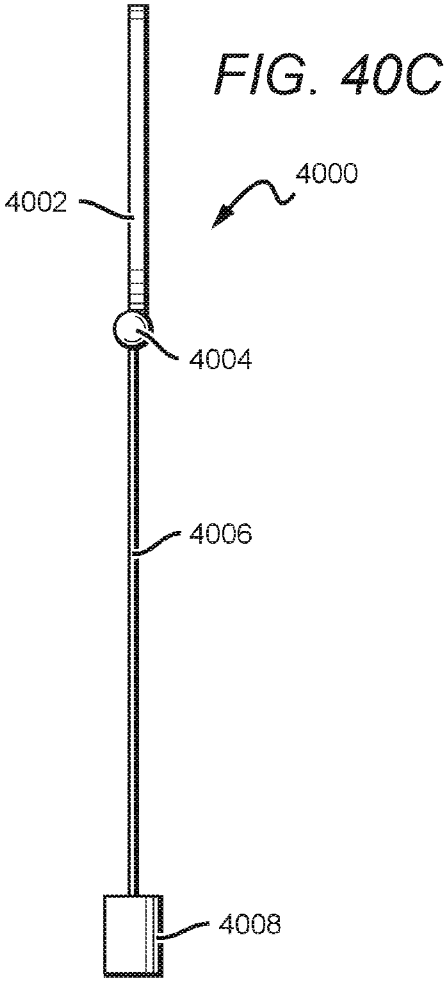
Figure 41A:
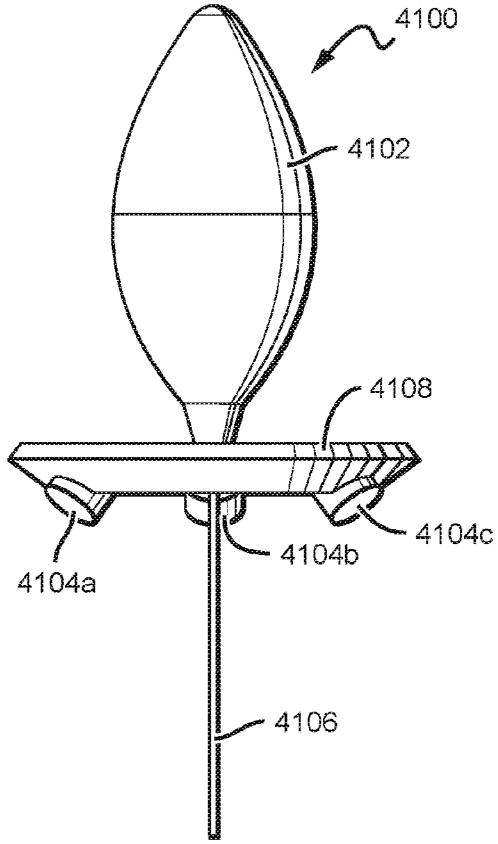
FIGS. 41A-41D show a flame simulating device similar to the device of FIGS. 39A-39D having a three dimensional flame-shaped piece similar where the horizontal cross sections of the flame-shaped piece are substantially triangular so that the number of sides of the flame-shaped piece correspond to the number of light sources.
Figure 41B:
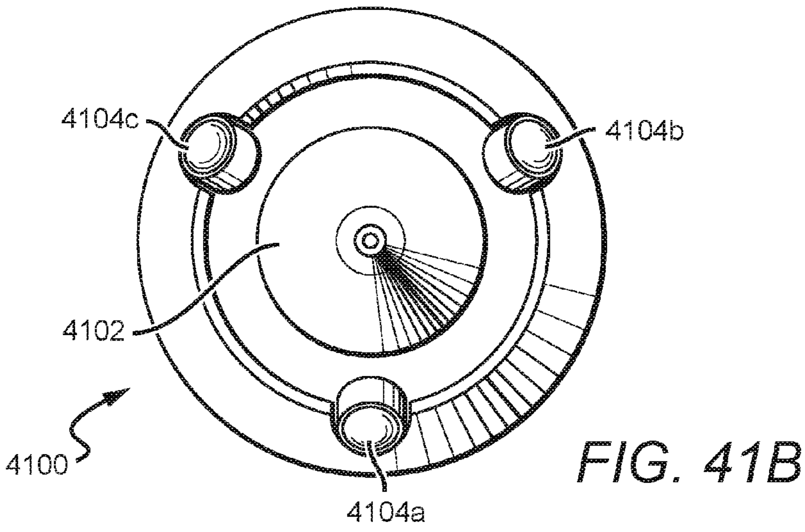
Figure 41C:
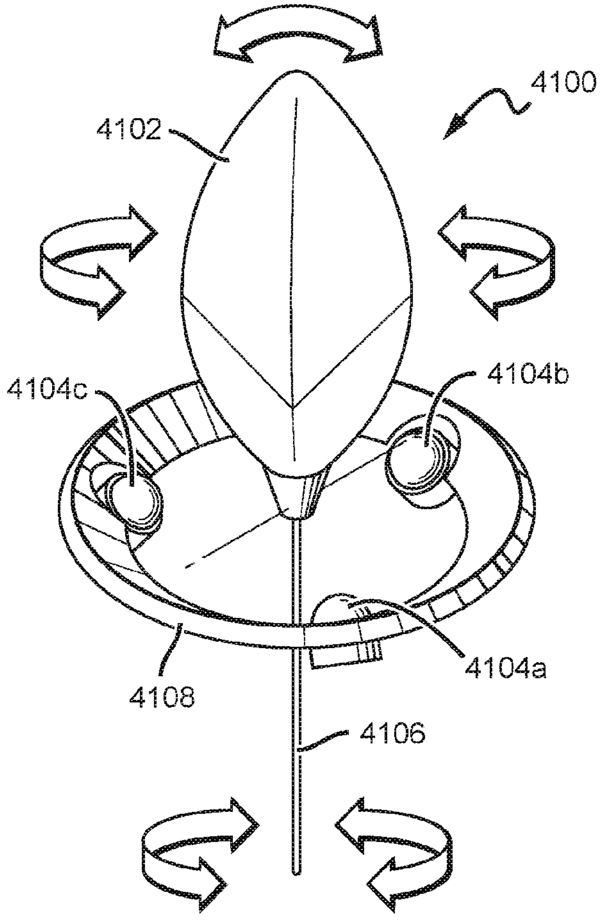
Figure 41D:
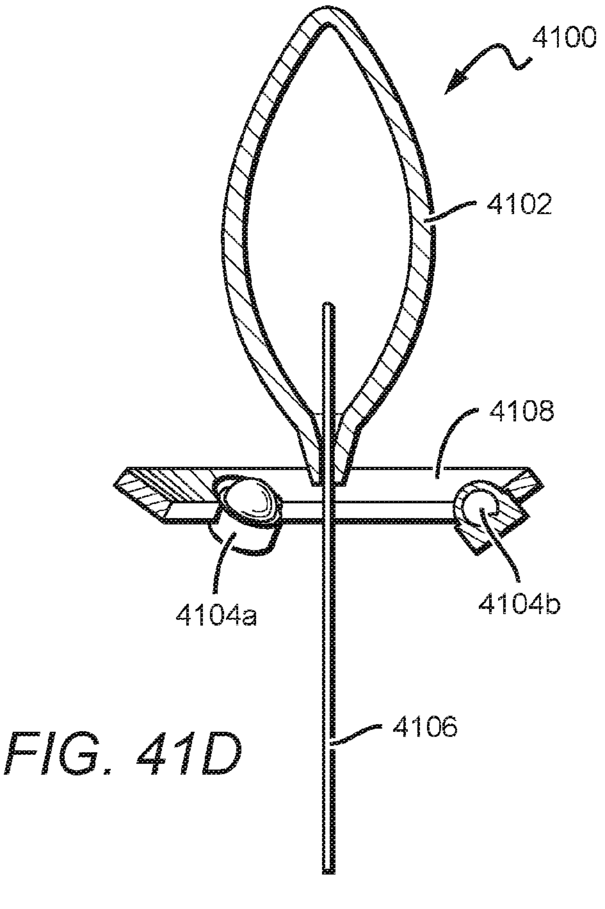

FIGS. 40A-40C show a flame simulating device 4000 having a flame-shaped piece 4002 that is suspended by a ball pivot 4004 that is coupled to a rod 4006 on one end, which is further coupled on the other end to an agitator 4008. The flame-shaped piece 4002 is coupled to the ball pivot 4004 such that the flame-shaped piece 4002 can move independently from the rod 4006 (e.g., entirely independently or only partially independently). To cause the flame-shaped piece 4002 sway and/or rotate, the agitator 4008 causes the rod 4006 to move (e.g., to vibrate, to swing, to rotate, or some combination thereof).

FIGS. 41A-41D show a flame simulating device 4100 that is substantially similar to the flame simulating device in FIGS. 39A-39D. Flame simulating device 4100 that has a three dimensional flame-shaped piece 4102 that is positioned between three light sources 4104*a-c*, that is formed to have substantially triangular cross sections. The three light sources 4104*a-c* can be LEDs or any other suitable light source, and the light sources 4104*a-c* are coupled to a band 4108, which angles and direct light from the light sources 4104*a-c* such that they project light onto the flame-shaped piece 4102. By having triangular cross sections, the flame-shaped piece 4102 provides flatter surfaces for three light sources 4104*a-c* to project light onto, which enhances the illusion that the flame-shaped piece 4102 is a real flame. The flame-shaped piece 4102 can be opaque at the top, transitioning to a clear material toward the bottom. The opacity and transparency of the material can be selected to produce a desired flame effect. The flame-shaped piece 4102 is coupled to, and supported by, a rod 4106 which allows the flame-shaped piece 4102 to swing and/or rotate based on the flexibility of the rod 4106 (i.e., based on the size, shape, and Young's modulus of the material). Regardless of the material selected, the rod must be able to easily flex despite the flame-shaped piece's 4102 light weight. The light sources 4104*a-c* can have different colors, such as red, orange, yellow, blue, and all combinations thereof.

Figure 42A:
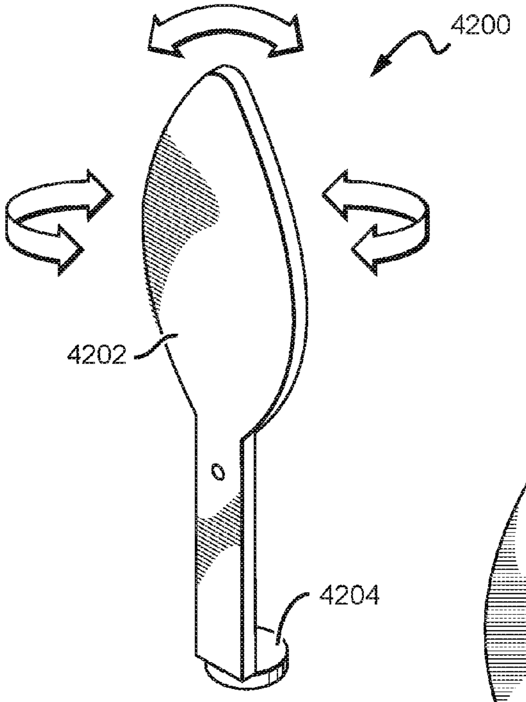
FIGS. 42A-42C show a flame simulating device having a flame-shaped piece with an eccentrically mounted (i.e., coupled via a pin joint) weight on its bottom portion.
Figure 42B:
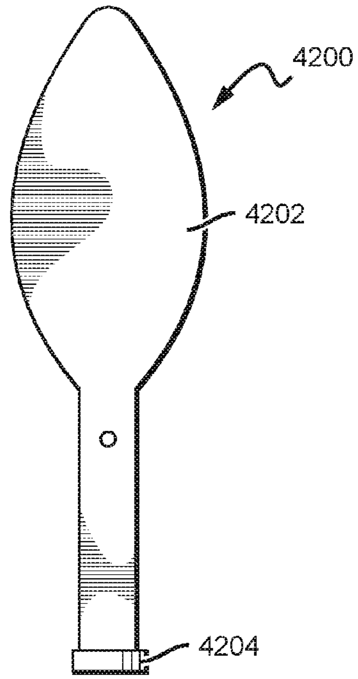
Figure 42C:
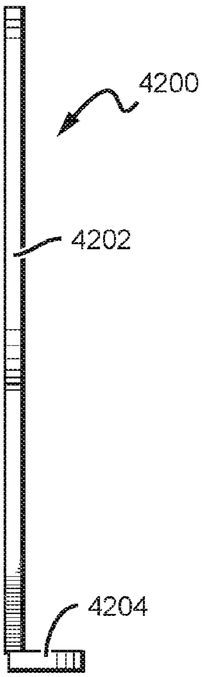

FIGS. 42A-42C show a flame simulating device 4200 having an eccentrically mounted weight 4204 on the bottom portion of the flame-shaped piece 4202. The weight 4204 is mounted by a pin joint, such that the weight can rotate about the connection point. In this way, as the flame simulating device 4200 is caused to swing and/or rotate by some other means, the weight 4204 will change positions and rotate thereby introducing an element of apparent randomness to the movement of the flame-shaped piece 4202.

Figure 43A:
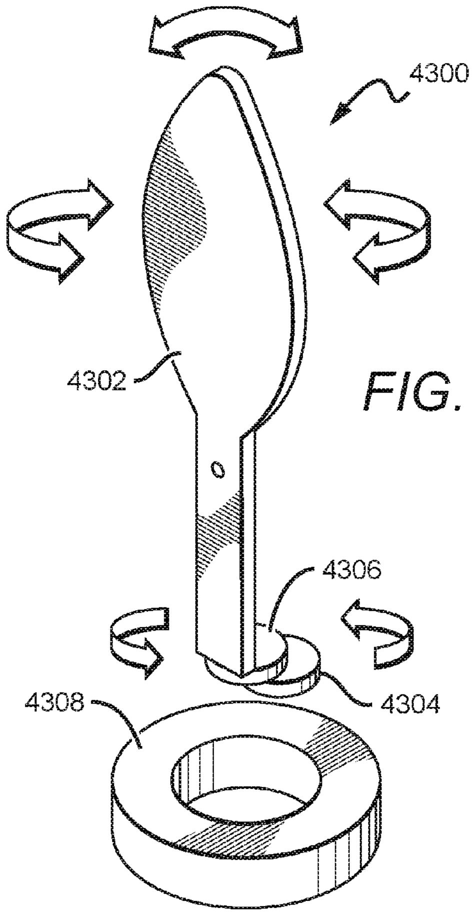
FIGS. 43A-43C show a flame simulating device having a flame-shaped piece with an eccentrically mounted (i.e., coupled via a pin joint) weight/magnet on its bottom portion, where the eccentrically mounted weight/magnet has another weight/magnet eccentrically mounted to it.
Figure 43B:
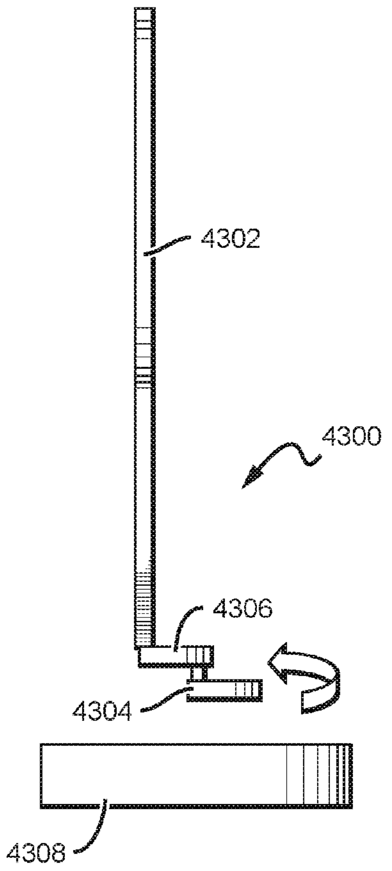
Figure 43C:
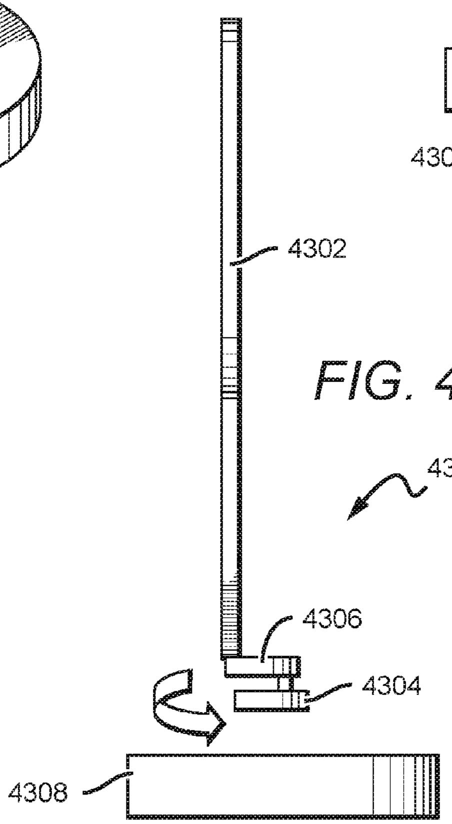

FIGS. 43A-43C show a flame simulating device 4300 that has two eccentrically mounted magnets 4304 and 4306 coupled to the lower portion of the flame-shaped piece 4302. The first magnet 4306 is mounted by a pin joint to the lower portion of the flame-shaped piece 4302 such that it can rotate having a single degree of freedom, and the second magnet 4304 is mounted by a pin joint to the side of the first magnet 4306 on the opposite side of its pin joint coupling it to the lower portion of the flame-shaped piece 4302. Below the flame-shaped piece 4302 is a coil 4308 that produces a magnetic field when electric current is passed through it. A magnetic field produced by the coil 4308 interacts with both of the magnets such that the movement of the flame-shaped piece can be randomized. Not only can current passed through the coil 4308 be pre-programmed or randomized, the magnets 4304 and 4306 being coupled to each other and to the lower portion of the flame-shaped piece 4302 introduces further randomness. These elements together cause the flame-shaped piece 4302 to move erratically as one would expect a real candle flame to behave.

FIGS. 44A-44C show an artificial candle 4400 having a housing 4404 that is configured to receive a flame simulating device from any of the embodiments described above with regard to FIGS. 1A-43C. When a flame simulating device is installed within the housing 4404, the flame-shaped piece 4402 protrudes from a hole 4408 the top 4406 of the artificial candle 4400. The flame-shaped piece 4402 is coupled to the candle body such that the flame element can move in at least two dimensions (e.g. rotate and/or swing, or sway).

FIG. 45 is a cutaway view of an artificial candle 4500 similar to the artificial candle shown in FIGS. 44A-44C. The artificial candle 4500 has a light source 4502 that is mounted within the housing 4504, such that light is projected onto a flame-shaped piece 4506. Some embodiments, however, do not need a light source 4502.

Figure 46:
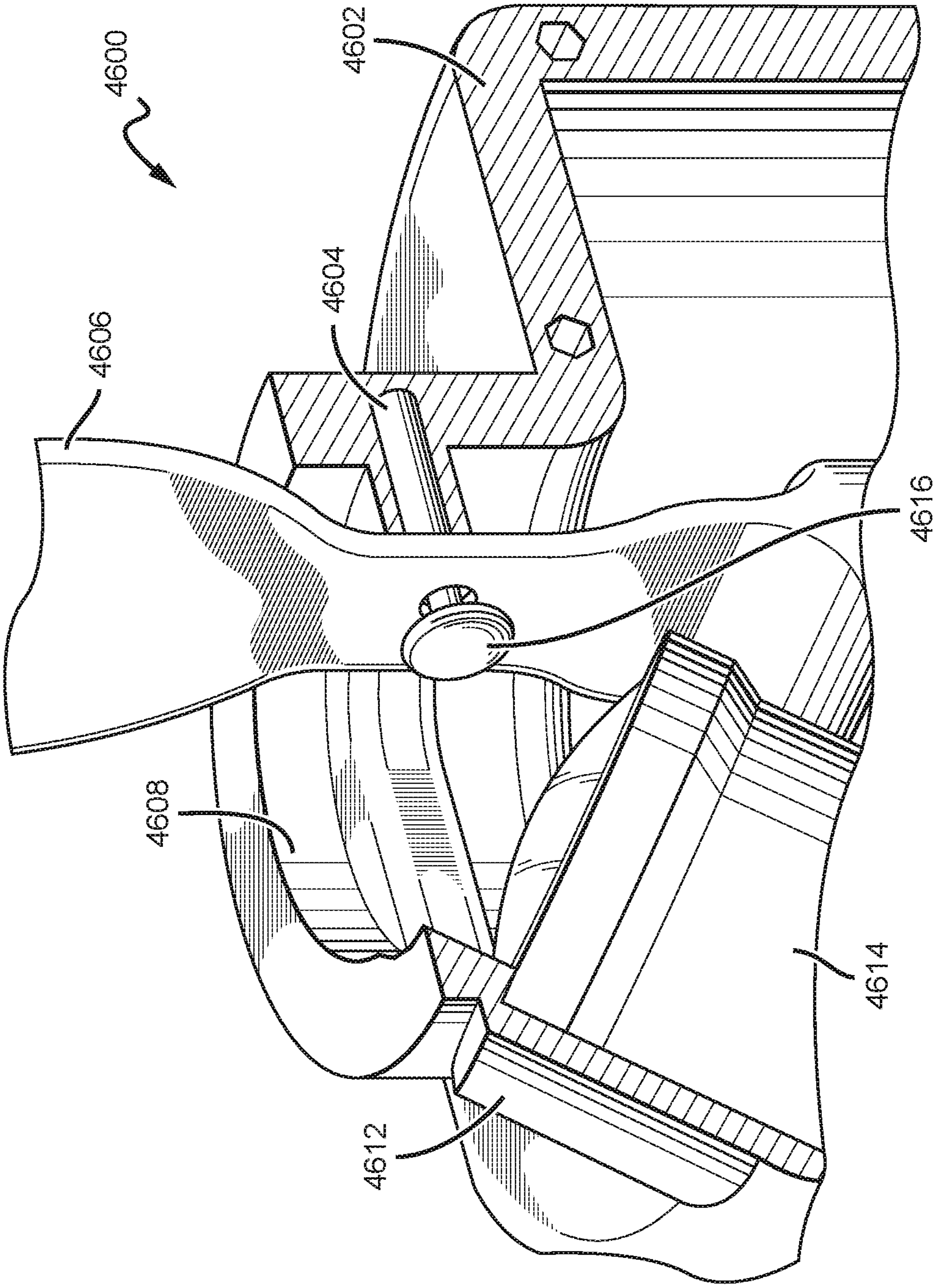
FIG. 46 is an enlarged view of a vertical cross-section of one embodiment of an electric candle.

FIG. 46 shows a cutaway view of an electronic lighting device 4600 having an alternative to a support wire to support a flame element 4606. Rather than providing support from a wire, this electronic lighting device 4600 instead includes a pin 4604 configured to pass through the flame element 4606 and into a reciprocal slot in the enclosure 4602. The pin 4604 can be connected to or coupled to the enclosure 4602 in a variety of ways. For example, the pin 4604 can be pressure fit into the enclosure 4602, or it can be fastened to the enclosure by an adhesive. In other embodiments the pin 4606 is at least partially threaded and the receiving hole on the enclosure 4602 is threaded to receive the pin 4606. The pin head 4616 is broad and flat compared to the rest of the pin, similar to that of the head of a nail. This prevents the flame element 4606 from falling off of the pin after the pin 4604 has been positioned through the flame element 4606 and inserted into the enclosure 4602. In this way, the enclosure supports the flame element 4606 such that it can swing and/or rotate with little resistance from friction.

The electronic lighting device 4600 is assembled such that at least a portion of the flame element 4606 protrudes from the top of the cylindrical opening 4608. The cylindrical opening 4608 is located on the top of the enclosure 4602 and allows light to shine from a light source on to the flame element 4606. The electronic lighting device 4600 is preferably made from a single piece. The electronic lighting device 4600 can be made from, for example, a plastic, a metal, a metal alloy, or a composite material. Regardless of the material, the most important aspect is that the enclosure 4602 is formed from a single piece. FIG. 46 shows only half of the enclosure because it is a cutaway view—the other half is preferably symmetrical to the half shown.

In FIG. 47, another embodiment of an artificial candle 4700 is shown. Although the device is shown as having a pillar candle shape, the shape could be a tapered candle, a light bulb, or otherwise. Candle 4700 can include an outer housing 4701 and an inner housing 4702 comprising a left side 4702A and a right side 4702B, which can optionally be coupled together using crush pins, adhesive, or other commercially suitable fastener.

A flame piece 4704 can be coupled to the housing 4702 or candle body via support member 4705, such that the flame piece 4704 can pivot about the support member 4705 and thereby vary its position with respect to housing 4702. Flame piece 4704 preferably includes upper and lower portions, with the upper portion disposed above where the support member 4705 passes through the flame element 4704, and the lower portion disposed below that point. The upper portion can include a concave surface defining a face of the flame piece onto which light can be emitted by light source 4708. Of course, planar and other dimensional surfaces could alternatively be used without departing from the scope of the invention. The light source 4708 can emit light through lens 4742, which advantageously focuses the light on to the flame element 4704.

Although not shown, it is alternatively contemplated that the flame piece 4704 could be fixed in position relative to the housing 4702, and in some embodiments, could be affixed directly to the housing 4702 or even be unitary with the housing 4702.

Candle 4700 can further include a circuit board 4709 (controller) that fits within the housing 4702. Preferably, where the flame element 4704 moves with respect to the housing 4702, the circuit board 4709 can control a drive mechanism, which could be an electromagnet, a fan, or other component that creates kinetic motion of the flame element. Candle 4700 is preferably battery-powered and comprises a battery compartment 4703 that includes a cavity that can receive one or more batteries.

It is especially preferred that the outer housing 4701 can comprise a plastic material and more preferably a thermoplastic elastomer, and be co-injection molded with a wax substitute, which advantageously eliminates the need to dip the housing 4701 in wax to provide a wax effect on the finished device.

The various embodiments of flame simulating devices described herein could be utilized within the artificial candle shown in FIGS. 44A-45 and/or FIG. 47. In fact, it is contemplated that various combinations of components from different embodiments and Figures could be utilized together without departing from the scope of the invention. For example, different components of used to support or suspend the flame piece could be used with various components that are configured to cause movement of the flame piece. Many, if not all, of the drive mechanism described herein could be used with the various structures that support the flame piece.

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including <address EPO technical effects>.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An electric lighting device, comprising:
- a candle body;
- a flame-shaped piece coupled to the candle body such that the flame-shaped piece configured to move in at least two dimensions;
- a light source disposed with respect to the candle body such that light is emitted on the flame-shaped piece;
- an agitator disposed within the candle body and configured to cause movement of the flame-shaped piece with respect to the candle body;
- wherein the flame-shaped piece comprises a lower portion having a hollow interior, and wherein a lower portion of a support member is configured to extend upwardly within the hollow interior of the portion; and
- wherein the lower portion of the flame-shaped piece comprises a cone-shaped section coupled to a flame-shaped section, and wherein the hollow interior is at least partially defined by the cone-shaped section.

2. The device of claim 1, wherein the flame-shaped piece is coupled to the candle body such that the flame-shaped piece configured to move in three dimensions.

3. The device of claim 1, further comprising a magnet coupled to the cone-shaped section, and wherein the agitator comprises an electromagnet disposed to interact with the magnet.

4. The device of claim 3, wherein the electromagnet is disposed about the support member, such that the support member passes through the electromagnet, and wherein the electromagnet is configured to generate a magnetic field that interacts with the magnet.

5. The device of claim 1, wherein the cone-shaped section comprises an opening at a bottom and wherein the support member is configured to extend upwardly through the opening at the bottom.

6. The device of claim 1, wherein the lower portion of the flame-shaped piece having the hollow interior comprises a cone-shaped section coupled to a flame-shaped section, and wherein the flame-shaped piece comprises an aperture that extends from an outer surface of the flame-shaped piece to the hollow interior.

7. The device of claim 6, wherein the support member comprises a source of light at a first end of the support member, and wherein the first end is disposed near the aperture, such that light from the support member may illuminate the flame-shaped piece.

8. The device of claim 1, wherein a portion of the flame-shaped piece is clear such that at least some of the support member is viewable through the clear portion of the flame-shaped piece, and wherein the visible portion of the support member is configured to resemble a wick when viewed through the flame-shaped piece.

9. An electric lighting device, comprising:
- a candle body;
- a flame-shaped piece coupled to the candle body such that the flame-shaped piece configured to move in at least two dimensions, wherein the flame-shaped piece comprise a flame-shaped portion and lower portion having a hollow interior, and wherein the flame-shaped piece further comprises a support hole on one side of the flame-shaped piece;
- a light source disposed with respect to the candle body such that light is emitted on the flame-shaped piece;
- a support member configured to extend through the support hole into the hollow interior portion of the flame-shaped piece, thereby suspending at least a portion of the flame-shaped piece within the candle body;
- wherein the flame-shaped piece comprises a protrusion that extends from a perimeter of the support hole toward a center of the support hole; and an agitator configured to cause movement of the flame-shaped piece with respect to the support member.

10. The device of claim 9, wherein the protrusion extends upwardly toward the center of the support hole.

11. The device of claim 10, wherein the protrusion is parallel to an outer surface plane of the flame-shaped piece at the support hole.

12. The device of claim 10, wherein the support member comprises a cup portion at a first end, and wherein the first end is configured to extend through the support hole, and wherein the flame-shaped piece comprises a downwardly-extending projection configured to rest in the cup portion.

13. The device of claim 9, wherein the support member comprises a cup portion at a first end, and wherein the first end is configured to extend through the support hole, and wherein the flame-shaped piece comprises a downwardly-extending projection configured to rest in the cup portion.

14. The device of claim 9, wherein the flame-shaped piece is coupled to the support member such that the flame-shaped piece configured to move in three dimensions.

15. The device of claim 9, wherein the lower portion comprises a cone-shaped section that at least partially defines the hollow interior.

16. The device of claim 9, further comprising a magnet coupled to the flame-shaped, and wherein the agitator comprises an electromagnet disposed to interact with the magnet.

17. The device of claim 9, wherein the agitator comprises a fan disposed beneath the flame-shaped piece, such that air from the fan causes movement of the flame-shaped piece.

18. An electric lighting device, comprising:

a candle body having an inner housing;

a flame-shaped piece coupled to the inner housing via a support member that is insertable into a side of the flame-shaped piece;

a light source disposed with respect to the candle body such that light is emitted on the flame-shaped piece;

wherein the support member comprises a cup portion at a first end, and wherein the first end extends from the inner housing into a hollow interior of the flame-shaped piece, such that the cup portion is disposed within the flame-shaped piece in the hollow interior;

wherein the flame-shaped piece comprises a projection that extends downwardly within the hollow interior, and wherein the projection rests within the cup portion when the first end of the support member is inserted within the flame-shaped piece; and an agitator disposed within the candle body and configured to cause movement of the flame-shaped piece with respect to the candle body.

19. The device of claim 18, wherein the flame-shaped piece is coupled to the support member such that the flame-shaped piece configured to move in three dimensions.

20. The device of claim 18, further comprising a magnet coupled to the flame-shaped, and wherein the agitator comprises an electromagnet disposed to interact with the magnet.

* * * * *